(12) United States Patent
Lee et al.

(10) Patent No.: US 10,824,291 B2
(45) Date of Patent: Nov. 3, 2020

(54) DEVICE AND METHOD OF DISPLAYING WINDOWS BY USING WORK GROUP

(71) Applicant: SAMSUNG ELECTRONICS CO., LTD., Suwon-si (KR)

(72) Inventors: Sang-chul Lee, Suwon-si (KR); Jong-hyuk Choi, Seongnam-si (KR); Nam-suk Lee, Suwon-si (KR); Hak-su Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 14/792,697

(22) Filed: Jul. 7, 2015

(65) Prior Publication Data

US 2016/0034145 A1 Feb. 4, 2016

(30) Foreign Application Priority Data

Jul. 31, 2014 (KR) .................. 10-2014-0098644
Dec. 15, 2014 (KR) .................. 10-2014-0180502

(51) Int. Cl.
*G06F 3/048* (2013.01)
*G06F 3/0481* (2013.01)
*G06F 3/0482* (2013.01)

(52) U.S. Cl.
CPC .......... *G06F 3/0481* (2013.01); *G06F 3/0482* (2013.01); *G06F 3/04817* (2013.01)

(58) Field of Classification Search
CPC .... G06F 3/048; G06F 3/0481; G06F 3/04817; G06F 3/0482
See application file for complete search history.

(56) References Cited

U.S. PATENT DOCUMENTS

| | | | |
|---|---|---|---|
| 7,581,192 B2 | 8/2009 | Stabb et al. | |
| 8,276,095 B2 | 9/2012 | Cutler et al. | |
| 8,396,907 B2 | 3/2013 | Park | |
| 8,656,294 B2 | 2/2014 | Wassingbo | |
| 2005/0125736 A1 | 6/2005 | Ferri et al. | |
| 2005/0216918 A1 | 9/2005 | Kuraishi | |
| 2006/0200778 A1 | 9/2006 | Gritzman et al. | |
| 2006/0224991 A1 | 10/2006 | Stabb et al. | |
| 2009/0327174 A1 | 12/2009 | Honkala | |

(Continued)

FOREIGN PATENT DOCUMENTS

| | | |
|---|---|---|
| CN | 102597940 A | 7/2012 |
| CN | 103069376 A | 4/2013 |

(Continued)

OTHER PUBLICATIONS

Communication dated Sep. 24, 2015, issued by the International Searching Authority in counterpart International Application No. PCT/KR2015/007031 (PCT/ISA/220, PCT/ISA/210, PCT/ISA/237).

(Continued)

*Primary Examiner* — Xuyang Xia
(74) *Attorney, Agent, or Firm* — Sughrue Mion, PLLC

(57) ABSTRACT

A device is provided. The device includes a display, a storage configured to store a work group including a plurality of jobs that are selected by a user, and a controller configured to control the display to display a window corresponding to at least one job included in the work group and display at least one object representing another job included in the work group on the displayed window.

18 Claims, 58 Drawing Sheets

(56) References Cited

U.S. PATENT DOCUMENTS

| | | |
|---|---|---|
| 2011/0109938 A1 | 5/2011 | Refstrup |
| 2011/0313805 A1 | 12/2011 | Heydemann et al. |
| 2011/0320977 A1* | 12/2011 | Bahn .................... G06F 3/0481 715/810 |
| 2012/0084713 A1 | 4/2012 | Desai et al. |
| 2012/0096392 A1 | 4/2012 | Ording et al. |
| 2012/0096395 A1 | 4/2012 | Ording et al. |
| 2012/0139945 A1* | 6/2012 | Choi .................... G06F 3/0346 345/660 |
| 2012/0174021 A1* | 7/2012 | Dharawat ............... G06F 9/451 715/779 |
| 2012/0185796 A1 | 7/2012 | Tanaka |
| 2012/0246596 A1* | 9/2012 | Ording ................. G06F 3/0481 715/799 |
| 2013/0290886 A1* | 10/2013 | Chen .................... G06F 3/0482 715/768 |
| 2013/0339876 A1 | 12/2013 | Fujitsuka et al. |
| 2014/0132535 A1* | 5/2014 | Kim .................... G06F 3/04883 345/173 |

FOREIGN PATENT DOCUMENTS

| | | |
|---|---|---|
| JP | 2001-060134 A | 3/2001 |
| KR | 10-2008-0001706 A | 1/2008 |
| KR | 101038536 B1 | 6/2011 |
| RU | 2 345 425 C2 | 1/2009 |
| WO | 2012/054620 A1 | 4/2012 |

OTHER PUBLICATIONS

Communication dated Oct. 28, 2015, issued by the European Patent Office in counterpart European Application No. 15178700.9.

"Ribbon (WPF)", Retrieved from <https://msdn.microsoft.com/KO- KR/LIBRARY/FF799534(d=printer,v=vs.IIO)> on Dec. 10, 2015, 4 pages total.

Communication dated Jul. 26, 2018, issued by the European Patent Office in counterpart European Application No. 15178700.9.

Communication dated Jan. 19, 2019 issued by the Taiwan Intellectual Property Office in counterpart Taiwan Application No. 104123003.

Communication dated Feb. 19, 2019 issued by the Russian Intellectual Property Office in counterpart Russian Application No. 2017106085.

Communication dated Aug. 16, 2019 issued by the State Intellectual Property Office of P.R. China in counterpart Chinese Application No. 201510441050.8.

Communication dated Apr. 16, 2020 issued by the Australia Intellectual Property Office in counterpart Australian Patent Application No. 2015297290.

* cited by examiner

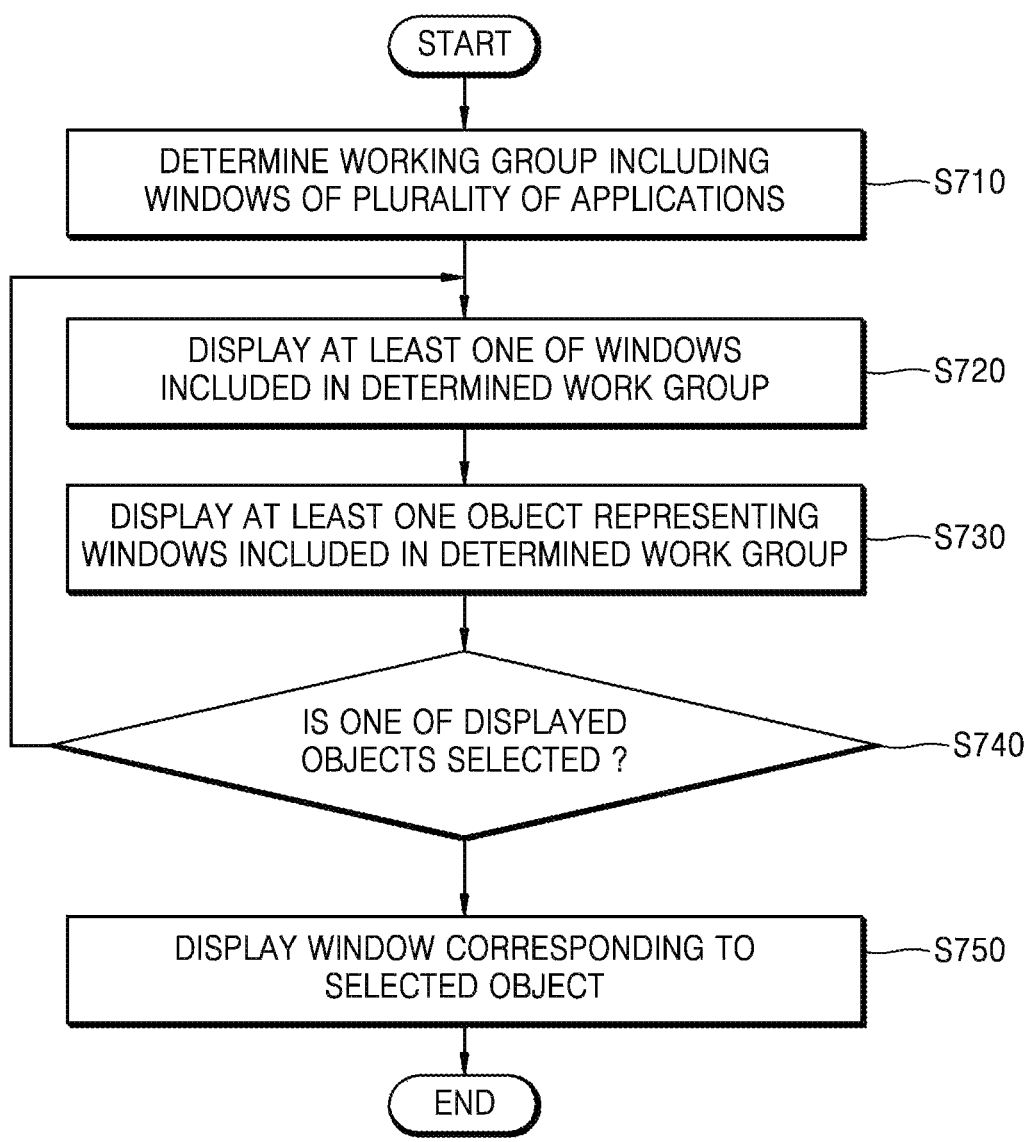

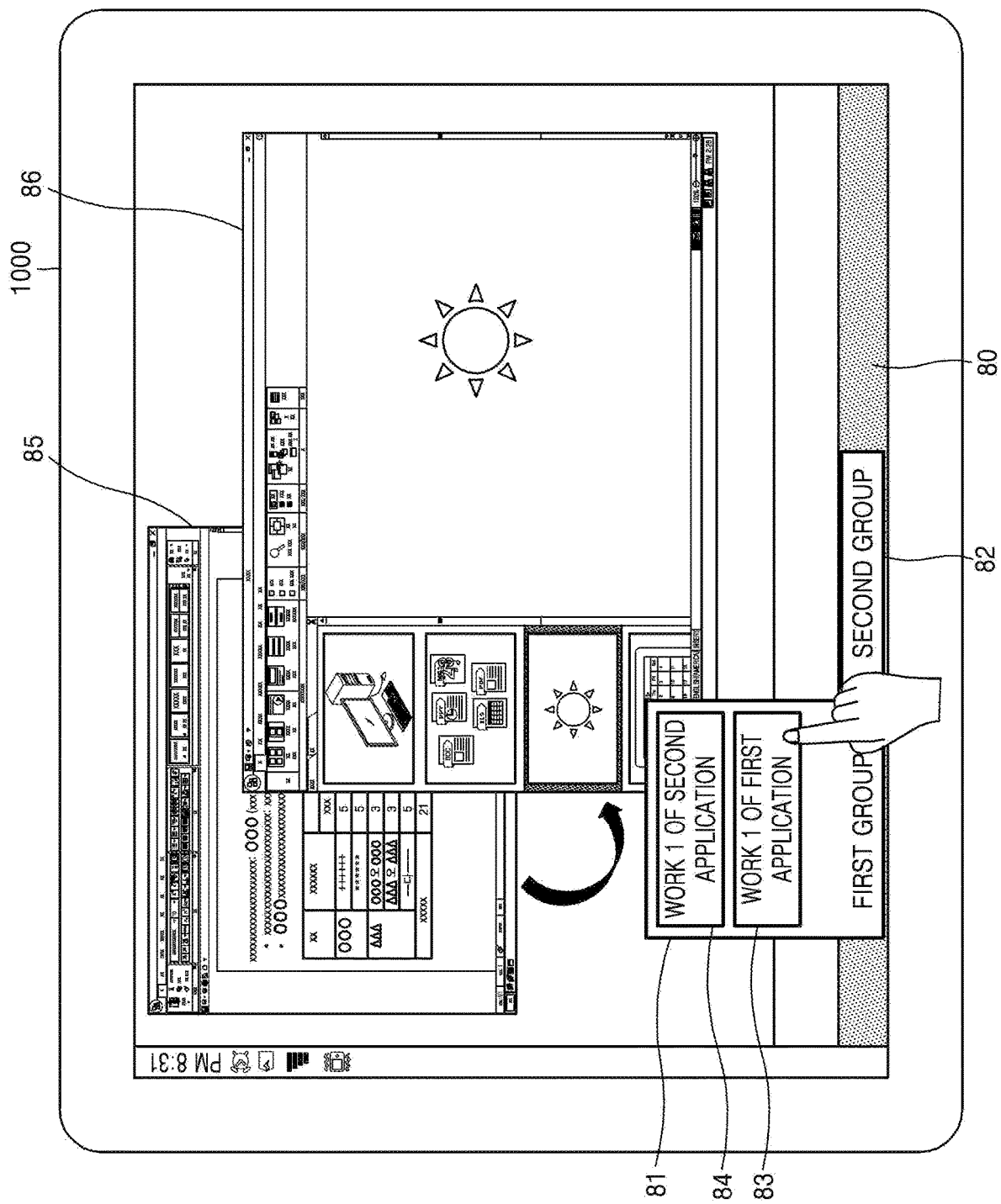

FIG. 11
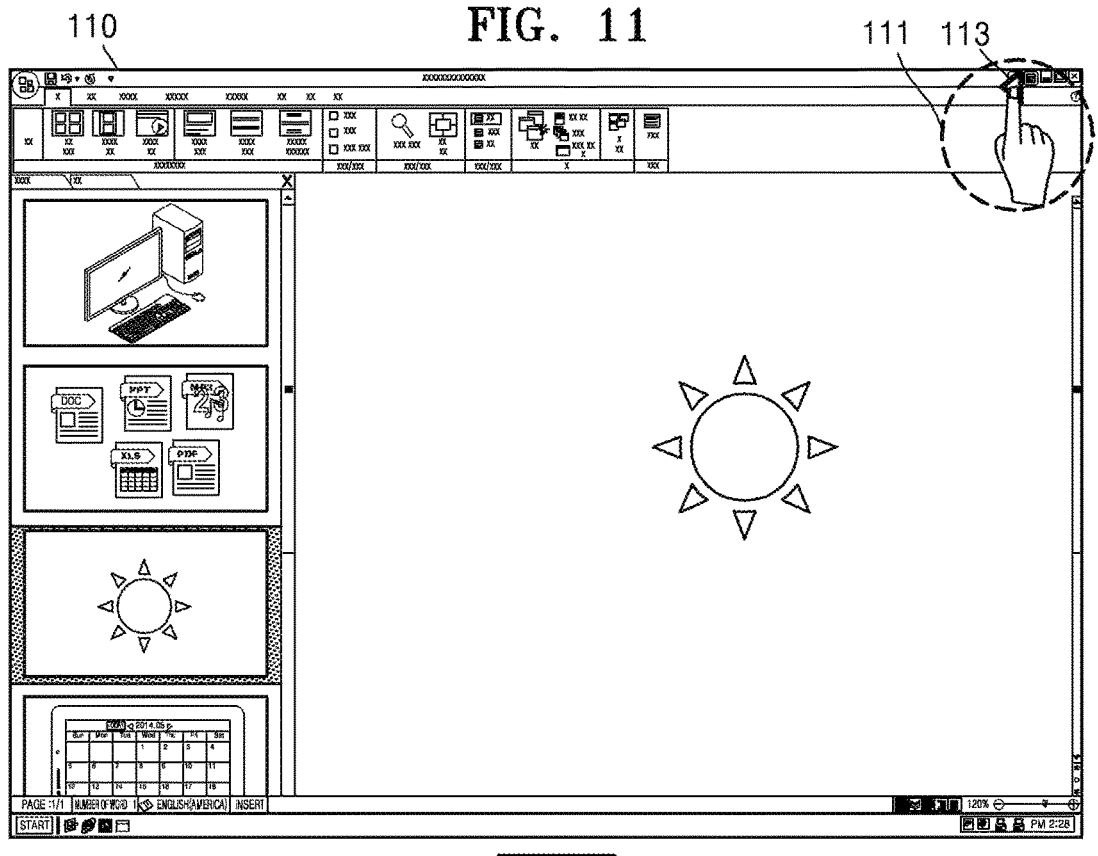
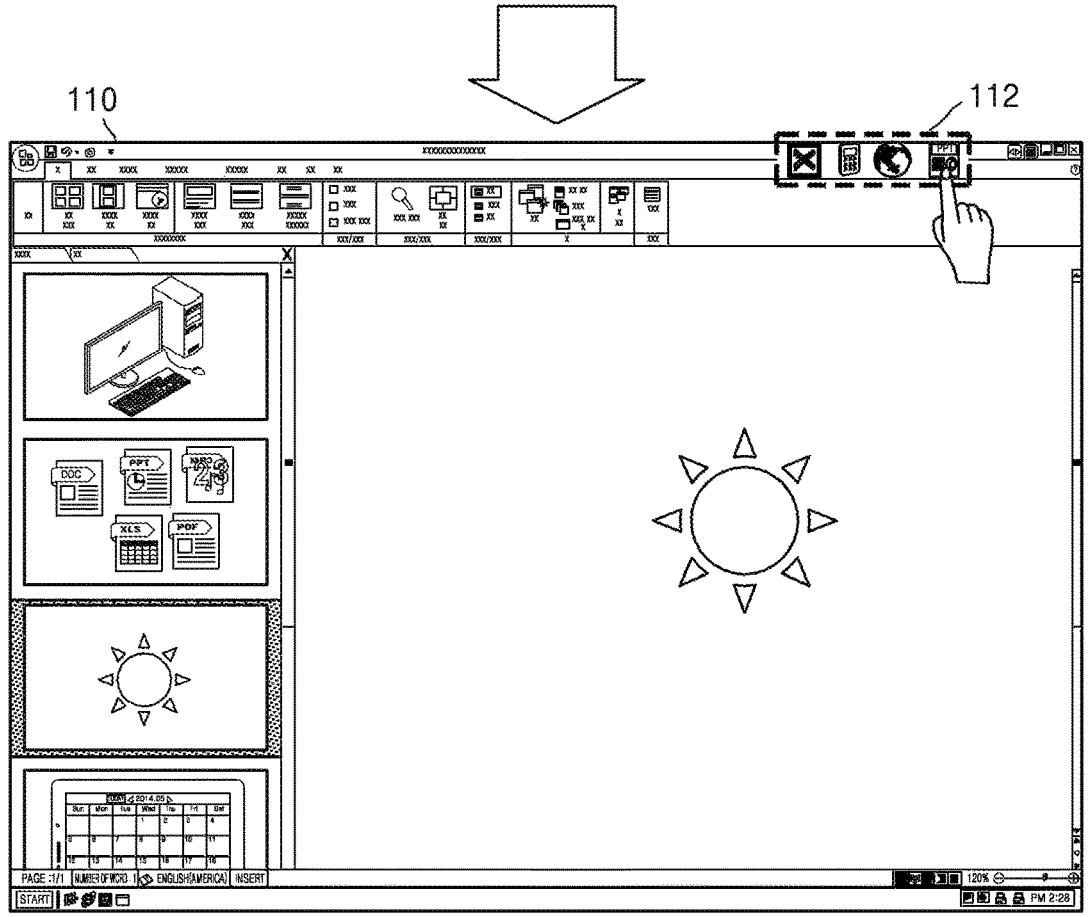

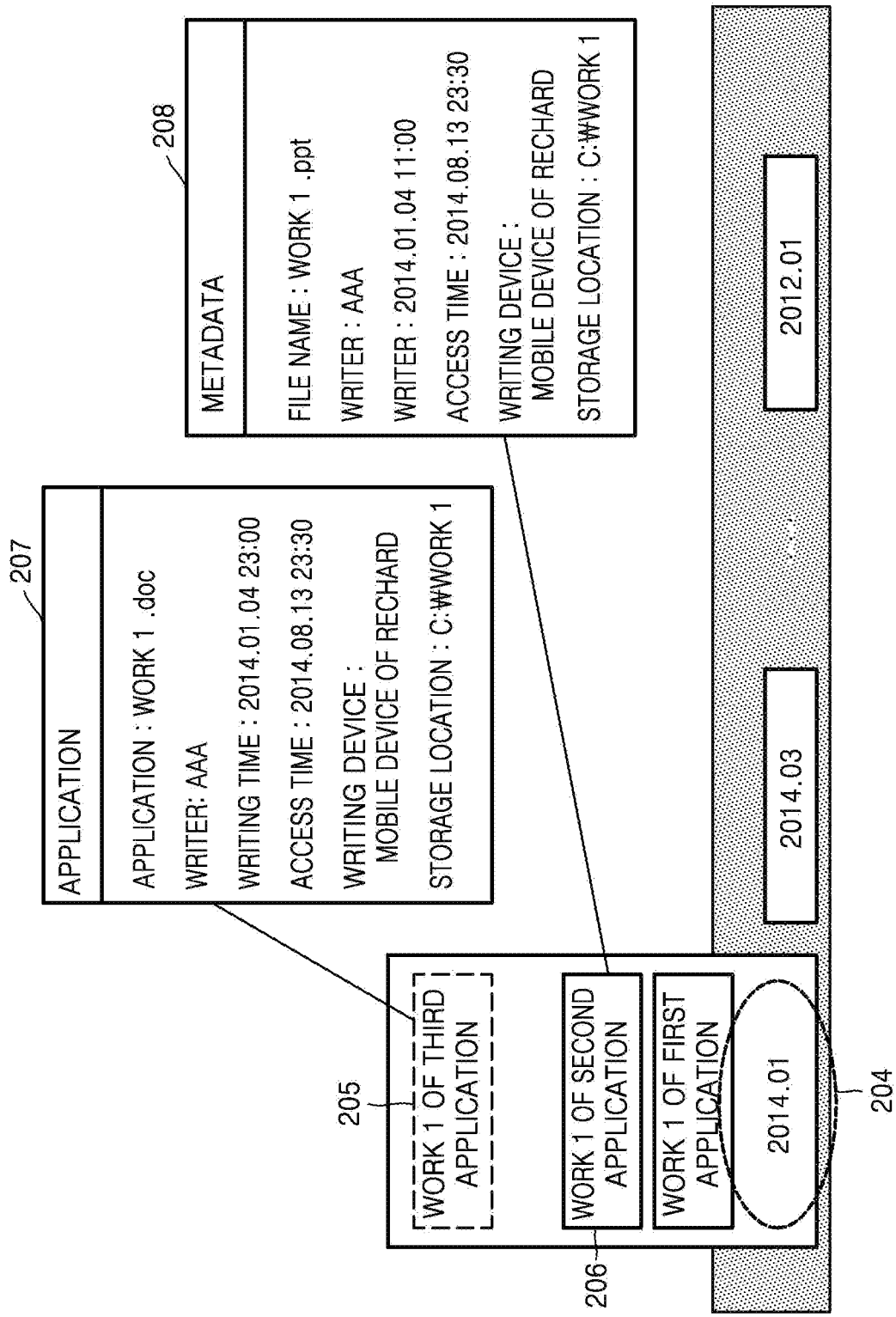

DEVICE AND METHOD OF DISPLAYING WINDOWS BY USING WORK GROUP

CROSS-REFERENCE TO RELATED PATENT APPLICATION

This application claims priority from Korean Patent Application No. 10-2014-0098644, filed on Jul. 31, 2014, and Korean Patent Application No. 10-2014-0180502, filed on Dec. 15, 2014, in the Korean Intellectual Property Office, the disclosures of which are incorporated herein in their entireties by reference.

BACKGROUND

1. Field

Apparatuses and methods consistent with one or more exemplary embodiments relate to a device and method of displaying a window by using a work group. More particularly, apparatuses and methods consistent with one or more exemplary embodiments relate to a device and method of grouping windows and switching between grouped windows.

2. Description of the Related Art

Operating systems (OSs) in a multi-window environment may execute several jobs for each application, and a window corresponding to each of the jobs may be displayed. For example, a user may open a plurality of windows in order to perform a plurality of types of projects (e.g., project A and project B). In this case, if a first window of a first application and a first window of a second application are necessary for project A and a second window of the first application, a first window of a third application, and a first window of a fourth application are necessary for project B, when a user wants to switch a screen image between the windows necessary for performing project A (i.e., the first window of the first application and the first window of the second application), the user needs to individually check a plurality of windows displayed by an OS and search for the necessary windows in order to display the windows and work with them. Thus, as the number of windows displayed by an OS increases, it may take more time to find windows necessary for performing a desired job.

To reduce the time taken to switch between windows, there is a demand for a method of grouping windows regardless of applications and providing a user with grouped windows.

SUMMARY

In a window displaying method using a work group according to an exemplary embodiment, windows of a plurality of applications are set as a group. When at least one window included in the work group is displayed, objects representing the other windows included in the work group may also be displayed on the displayed window. Thus, a user may easily view and work with the windows belonging to determined work groups.

Moreover, by selecting objects representing the windows included in a work group based on a user input, a window corresponding to the selected window may be activated and displayed on the screen. Accordingly, a user may conveniently perform a screen image switch between the windows included in a work group.

Additional aspects will be set forth in part in the description which follows and, in part, will be apparent from the description, or may be learned by practice of the presented exemplary embodiments.

According to an aspect of an exemplary embodiment, there is provided a device including: a display; a storage configured to store a work group including a plurality of jobs; and a controller configured to control the display to display a window corresponding to at least one job included in the work group and display at least one object representing another job included in the work group on the displayed window.

The device may further include a user input configured to receive an input of a user. In response to an object from among the at least one object displayed within the window being selected by the input of the user, the controller may control the display to display a window corresponding to the selected object.

The controller may control the display to display the at least one object representing the other job included in the work group on a frame of the displayed window.

The controller may control the display to display one or more objects representing one or more jobs other than the at least one job corresponding to the displayed window from among the plurality of jobs included in the work group.

In response to a certain text within the window being copied, the controller may control the display to display an object representing at least one window to which the copied text is to be pasted.

The device may further include a user input configured to receive a user input. In response to a work group area representing the work group being displayed on display, the controller may select at least one window based on the user input, and determine the work group by adding an object representing the selected at least one window to the work group area.

The controller may set an attribute that is common to windows corresponding to the at least one job included in the work group.

The common attribute may include information about a connected external device.

The controller may select a job of an application that is not being executed, and add the selected job to the work group.

The controller may acquire attribute information of at least one job from among the plurality of jobs included in the work group, and add at least one job currently being executed via another application to the work group, based on the acquired attribute information.

According to an aspect of another exemplary embodiment, a window displaying method using a work group includes: determining a work group including a plurality of jobs selected by a user; displaying a window corresponding to at least one job included in the work group; and displaying at least one object representing another job included in the work group on the displayed window.

As a specific object displayed within the window is selected, the method may include displaying a window corresponding to the selected object.

The displaying of the object may include displaying the at least one object representing the other job included in the work group on a frame of the displayed window.

The displaying of the object may include displaying one or more objects representing one or more jobs other than the at least one job corresponding to the displayed window from among the plurality of jobs included in the work group.

The displaying of the object may further include, as a certain text within the window is copied, displaying an object representing at least one window to which the copied text is to be pasted.

The determining of the work group may include displaying a work group area representing the work group; selecting at least one window based on a user input; and adding an object representing the selected window to the work group area.

The method may further include setting an attribute that is common to windows corresponding to the at least one job included in the work group.

The determining of the work group may include selecting a job of an application that is not being executed, and adding the selected job to the work group.

The determining of the work group may include acquiring attribute information of at least one job from among the plurality of jobs included in the work group; and adding at least one job that is being executed via another application to the work group, based on the acquired attribute information.

The other methods for implementing the disclosure, a system for implementing the disclosure, and a non-transitory computer-readable recording medium having recorded thereon a computer program, which, when executed by a computer, performs the above-described method are further provided.

According to an aspect of another exemplary embodiment, a device is provided. The device includes a storage configured to store a work group including a plurality of jobs; and a controller configured to control to display a window corresponding to at least one job included in the work group and to display at least one object representing another job included in the work group on the displayed window.

The device may further include: a user input configured to receive an input of a user, and in response to an object from among the at least one object displayed within the window being selected based on the input of the user, the controller may be configured to control to display a window corresponding to the selected object.

The controller may be configured to acquire attribute information of each of a plurality of jobs, and to selectively add each of the plurality of jobs to the work group based on respective attribute information of each of the plurality jobs.

BRIEF DESCRIPTION OF THE DRAWINGS

These and/or other aspects will become apparent and more readily appreciated from the following description of exemplary embodiments, taken in conjunction with the accompanying drawings in which:

FIG. 7 is a flowchart of a method of switching between windows included in a work group, according to an exemplary embodiment;

FIG. 8A shows an example of a method of switching between windows within a work group, according to an exemplary embodiment;

FIG. 11 shows an example of displaying objects representing windows included in a work group during execution of a certain function, according to an exemplary embodiment;

FIG. 20C illustrates another example of a method of determining a work group name, according to an exemplary embodiment;

DETAILED DESCRIPTION

Figure 1:
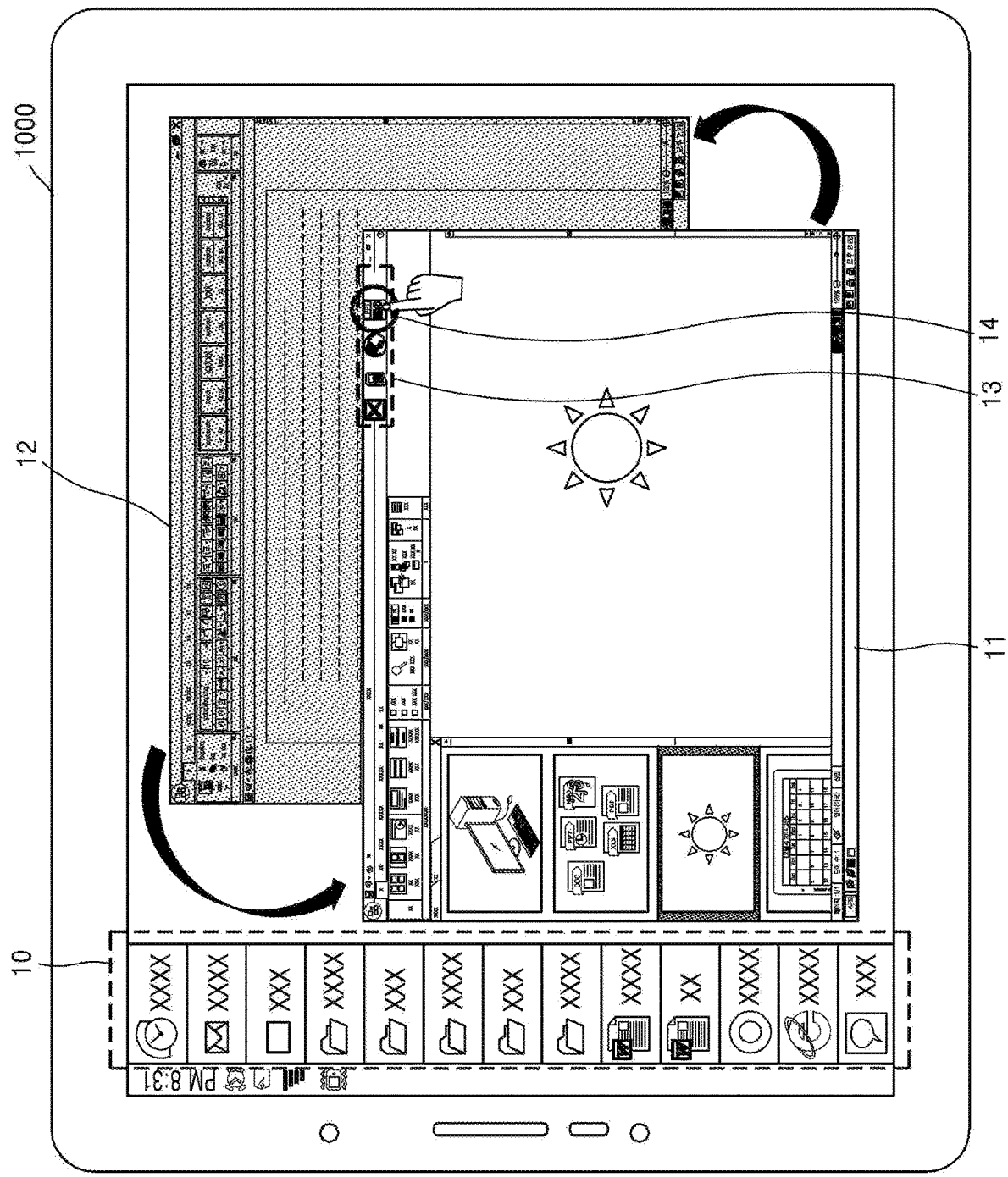
FIG. 1 illustrates an example of displaying one or more work groups including one or more jobs according to an exemplary embodiment.

The above-described objectives, features, and merits will be more apparent via the following detailed description in connection with the accompanying drawings. As the inventive concept allows for various changes and numerous exemplary embodiments, particular exemplary embodiments will be illustrated in the drawings and described in detail in the written description. Like reference numerals in the drawings basically denote like elements. In the description, certain detailed explanations of related-art functions or structures are omitted when it is deemed that they may unnecessarily obscure the essence of the inventive concept. While such terms as "first," "second," etc., may be used to describe various components, such components must not be limited to the above terms. The above terms are used only to distinguish one component from another.

Electronic devices associated with this disclosure will now be described in more detail with reference to the accompanying drawings. Terms such as " . . . unit" and " . . . module," are used in the following description in consideration of only ease of drafting of the specification, and thus do not have distinct meanings or roles in themselves.

Herein, "an exemplary embodiment" of the principles of the present inventive concept indicates a specific feature, structure, and characteristic described together with an exemplary embodiment included in at least one exemplary embodiment of the principles of the present inventive concept. Thus, the expression "according to an exemplary embodiment" used in the entire specification does not necessarily indicate the same exemplary embodiment.

Examples of a device described in the specification may include, but are not limited to, a personal computer (PC), a smart television (TV), a mobile phone, a smartphone, a laptop computer, a digital broadcasting terminal, a personal digital assistant (PDA), a portable multimedia player (PMP), a navigation, and a wearable device.

An application described in the specification denotes application software, and may be a program for allowing a computer to actually perform a task according to use purposes. The application may mean software that is executed in an operating system (OS) provided in a device, in a broad sense. Accordingly, the application may be software such as a word processor, a spreadsheet, or a web browser, and may also be a compiler, a linker, or the like. The application is shortened to be referred to as an app.

A window is not limited to this structure, and it may be easily understood by one of ordinary skill in the art to which the disclosure pertains that the window may include several types of user interfaces (UIs) via which works performed via an application can be provided to a user.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Throughout the specification, the terms "job" and "work" may be used interchangeably to mean an action performed by a computer.

The disclosure will now be described more fully with reference to the accompanying drawings, in which exemplary embodiments are shown.

FIG. 1 illustrates an example of displaying one or more work groups including one or more jobs according to an exemplary embodiment.

Referring to FIG. 1, a device 1000 according to an exemplary embodiment may execute at least one job for each application by using an OS in a multi-window environment, and each job is displayed via a window corresponding thereto. The job is a form of the application being executed, and the application may be executed as a plurality of jobs. The job may be executed as a process or a thread, which is a form in which an application program executing code is stored in a storage unit and is executed via a controller. The window may be a rectangular area that includes a work execution status of the application and a control UI. For example, a window may be a rectangular area that is adjustable in size and movable based on a user input, within the screen of a device. The device 1000 may display only some windows 11 and 12 on the screen thereof.

First, the device 1000 may provide a plurality of windows in order to perform various projects (e.g., project A and project B). A project denotes a group of a plurality of jobs necessary for producing a result desired by a user. For example, a job of writing a first document via a word processor, a job of writing a second document via a spreadsheet, and a job of browsing a specific website via a web browser may be defined as jobs included in a project.

In another example, it is assumed that project A includes a work that is executed via a first application, a work that is executed via a second application, and a work that is executed via a third application. It is also assumed that project B includes a work that uses the first application, and a work that uses a fourth application. In this case, the device 1000 may provide a first window of the first application, a first window of the second application, and a first window of the third application to perform project A, and provide a second window of the first application and a first window of the fourth application to perform project B.

For example, the device 1000 may provide a user with a first window of a search application for a data collecting work, a first window of a word processor for arranging collected data, and a first window of an application for writing presentation material in order to perform a project of writing presentation material. At the same time, the device 1000 may provide the user with a second window of the search application for a data collecting work and a first window of a statistical data writing application in order to perform a project of writing a statistical analysis.

However, when the user wants to switch a screen image between the windows necessary for performing project A (i.e., the first windows of the first, second, and third applications), the user may generally select necessary windows (for example, the windows 11 and 12) by using an application 10 for managing the plurality of windows provided by the device 1000. However, the application 10 for managing the plurality of windows executed by the device 1000 includes objects representing not only the windows necessary for performing project A but also windows unnecessary for performing project A. In other words, the application 10 for managing windows simultaneously provides objects representing all of the windows that are executed by an OS. Accordingly, when many projects are being executed by an OS, it may take long time to find the windows necessary for performing project A. When the user wants to first perform project A and then perform project B, it takes long time to search for windows associated with project B from among the many windows that are currently being executed.

Accordingly, the device 1000 may provide the windows associated with project A to a work group A. A work group may denote a group of windows associated with a certain project. Thus, the work group may include at least one window. As at least one window 11 is displayed from among the windows included in the work group A, the device 1000 may provide at least one object 13 representing the other windows included in the work group A to the displayed window 11. The device 1000 may receive a command selecting one from among the at least one object 13 provided to the displayed window 11, and display the window 12 corresponding to a selected object 14 on the screen.

In other words, the device 1000 may determine the windows associated with a specific project as a work group and display the at least one object 13 representing the windows included in the determined work group on the window 11. Thus, the user may easily recognize the windows included in the work group and easily switch between the windows included in the work group.

The work group is not limited to including windows, and may be understood as including works that are executed by an application corresponding to a specific window. In other words, a work selected from works being currently executed in the device 1000 may be included in a work group in units of windows. Accordingly, the above-described object representing a window may correspond to an object representing a work included in a work group, and, when a specific object is selected, a window corresponding to a work represented by the selected object may be displayed on the screen.

When an application being currently executed in the device 1000, such as a mobile terminal, provides only a single window, the work group may denote a group of applications.

Thus, the expression "inclusion of a window in a work group" in the following description may be understood as meaning that a work group includes a job or application that is being displayed on a specific window.

A method of displaying a window by using a work group, according to an exemplary embodiment, will now be described in detail with reference to FIGS. 2-46.

Figure 2:
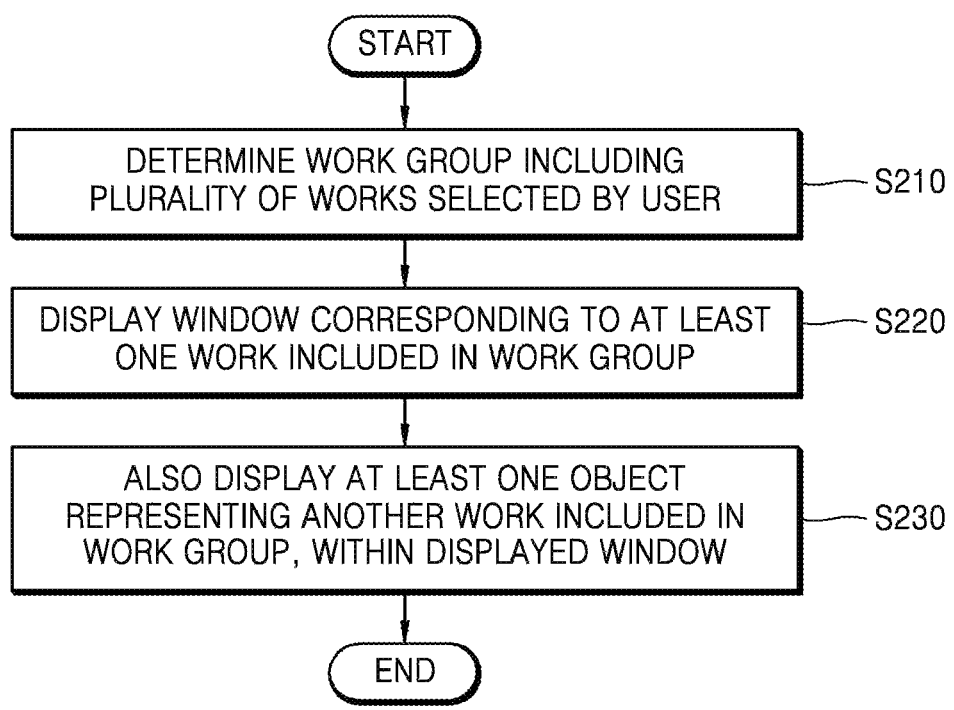
FIG. 2 is a flowchart of a window displaying method according to an exemplary embodiment.

FIG. 2 is a flowchart of a window displaying method according to an exemplary embodiment.

Referring to FIG. 2, in operation S210, the device 1000 may store a work group including a plurality of works selected by a user. The plurality of works may be executed via different applications. The device 1000 may be executing a window corresponding to each operation.

Figure 3:
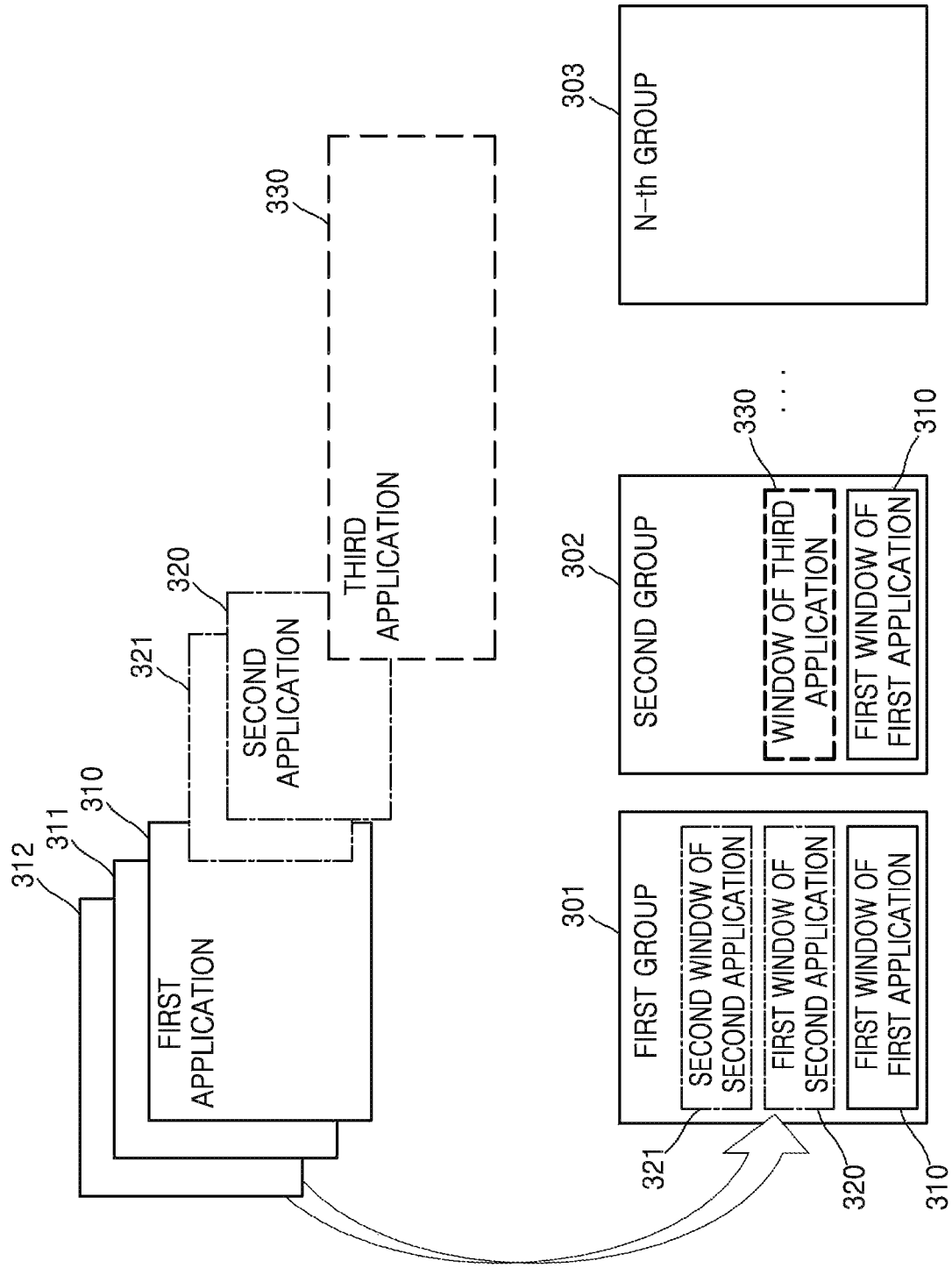
FIG. 3 illustrates an example of a method of determining a work group, according to an exemplary embodiment.

For example, FIG. 3 illustrates an example of a method of determining a work group, according to an exemplary embodiment.

Referring to FIG. 3, a first application is executing windows 310, 311, and 312 corresponding to three works, a second application is executing windows 320 and 321 corresponding to two works, and a third application is executing a window 330 corresponding to one work. First through N-th groups 301 through 303 are work groups each including windows respectively corresponding to works.

The device 1000 may determine the first window 310 of the first application and the second window 320 of the second application from among windows corresponding to works that are being executed in different applications, as the first group 301. The device 1000 may also determine the first window 310 of the first application and the window 330 of the third application as the second group 302. A work group may not necessarily include only windows corresponding to works that are being executed in different applications. Moreover, a work group is not limited to including only windows corresponding to works that are currently being executed via an application. Accordingly, the second window 321 of the second application may also be determined as the first group 301. In another example, the window 330 of the third application corresponding to a work of the third application that is not being currently executed may be included in the second group 302.

Windows included in a specific work group may be determined based on a user input or may be automatically determined based on attribute information of a work window. Exemplary embodiments of selecting a work group will be described in detail with reference to FIGS. 19-39.

Referring back to FIG. 2, in operation S220, the device 1000 may display a window corresponding to at least one work included in the work group.

In operation S230, the device 1000 may also display at least one object representing another work included in the work group, within the displayed window.

For example, when one of the windows included in the determined work group is displayed, the device 1000 may also display at least one object representing another work included in the determined work group within the displayed window, in order to switch between windows included in the determined work group.

An object representing a work included in a work group may be an object representing a window corresponding to the work included in the work group. Accordingly, when a specific object displayed within the window is selected, the device 1000 may display a window corresponding to the selected object. The operation of displaying the window corresponding to the selected object may include an operation of switching a current window to the window corresponding to the selected object, or an operation of refreshing work contents displayed on the current window with work contents corresponding to the selected object. The switch between windows may denote an operation of deactivating a window being currently displayed on the device 1000 and activating the window corresponding to the selected object to thereby display the activated window on the device 1000. The deactivated state of a window may denote a state in which a work corresponding to the window is not displayed on the screen but is operating in the background.

The device 1000 may give a special effect to an object corresponding to a currently-being-displayed window so that a user may conveniently identify the object. Alternatively, the device 1000 may display only objects representing work windows other than the currently-being displayed work window from among the work windows included in the work group.

In another example, an object representing a window included in a work group may be an object representing the work group. Accordingly, when an object that is displayed within the window and represents a work group is selected, the device 1000 may display all of the windows included in the work group. Screen image switching between work groups may be performed via objects representing the work groups. An operation of the device 1000 that is performed when an object representing a work group is selected is not limited thereto, and the device 1000 may perform an operation that is preset for user convenience. For example, when an object representing a displayed work group is selected, the device 1000 may switch a current window to a window that has recently been displayed from among the windows included in the work group.

According to an exemplary embodiment, an object representing a window included in a work group may be displayed on a frame of a currently-being-executed window. In another example, an object representing a window included in a working group may be displayed on the window displayed by the device 1000, in a tab form.

According to an exemplary embodiment, when one or more of the windows of the work group are displayed in response to the selecting of the object representing the one or more windows of the work, the one or more of the windows of the work group are displayed according to a location and a layout that is set by the user, a location and a layout in which the one or more of the windows of the work group were most recently displayed, a layout and a location that is determined by the OS.

Examples in which the device 1000 displays an object representing windows included in a work group within a window will now be described with reference to FIGS. 4A-6.

Figure 4A:
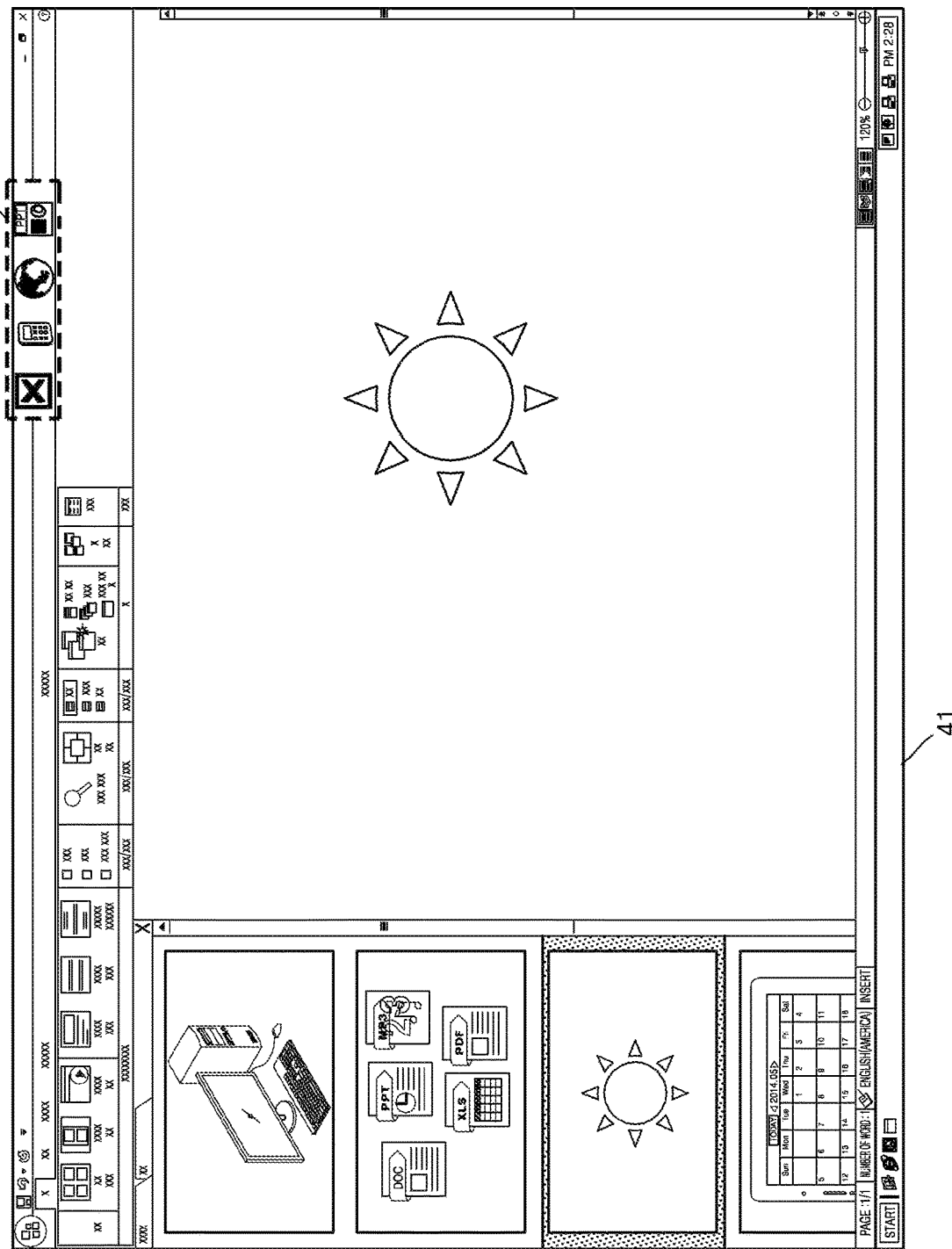
FIGS. 4A and 4B illustrate an example of displaying objects representing windows included in a work group on a window frame, according to an exemplary embodiment.
Figure 4B:
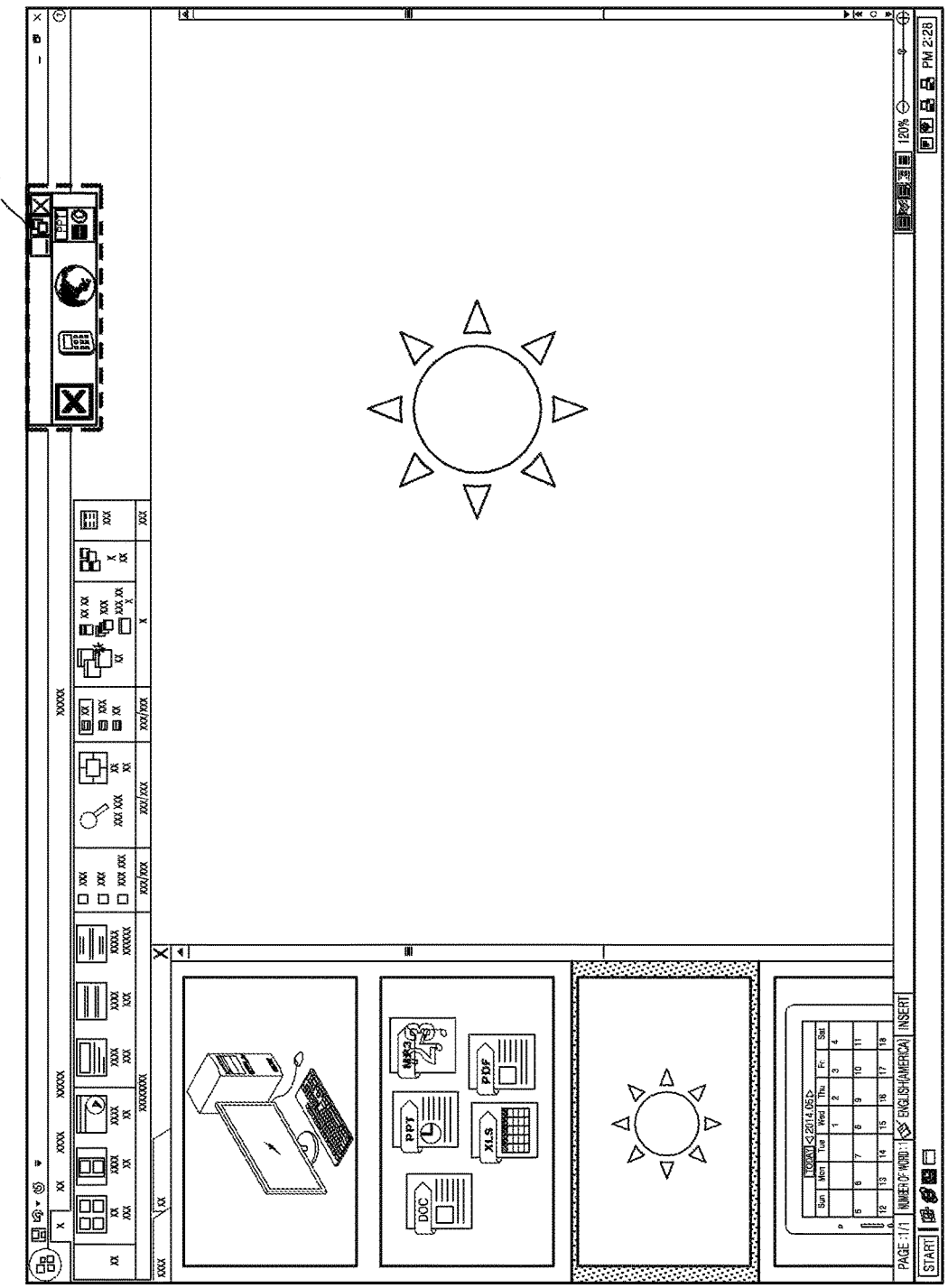
Figure 5:
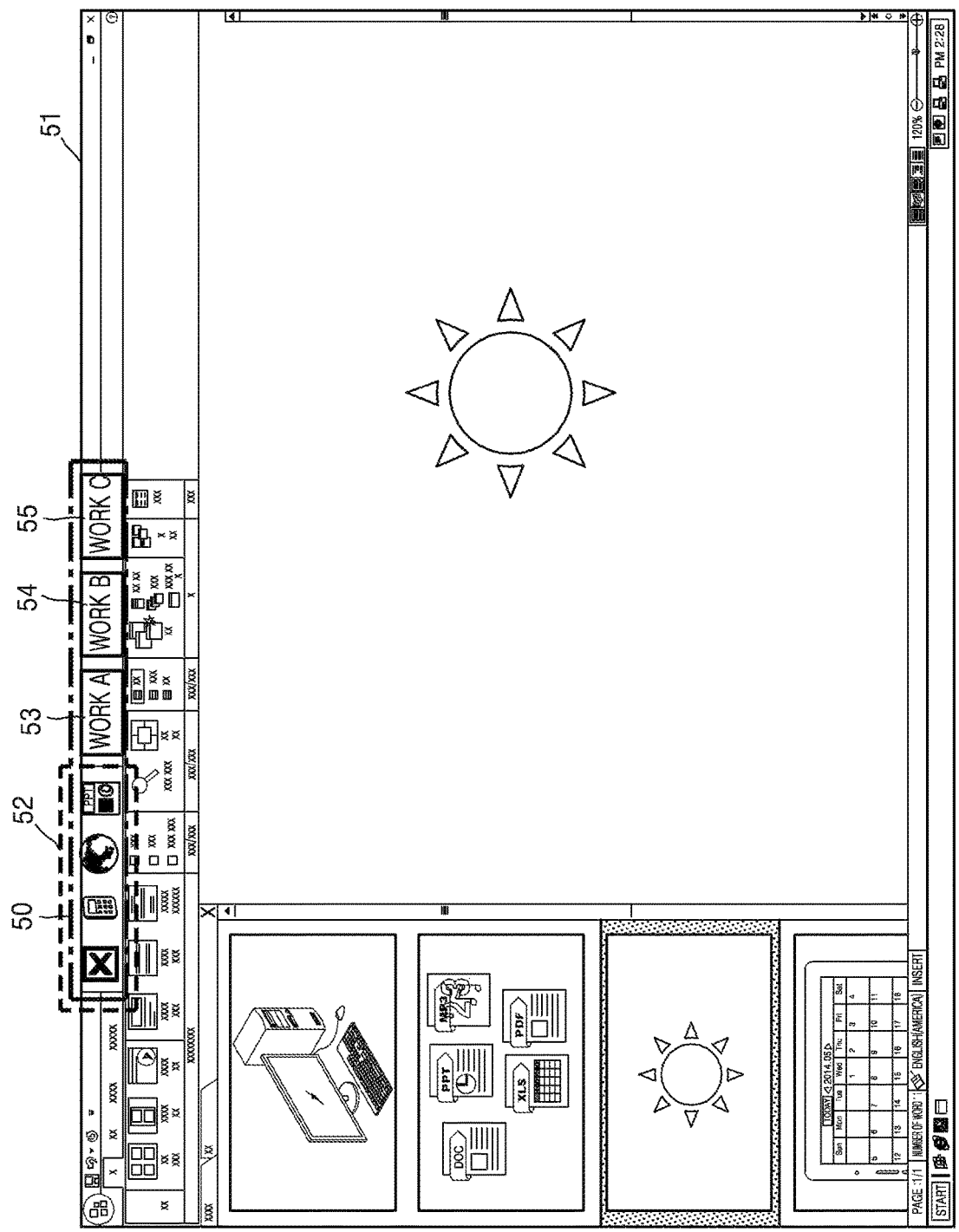
FIG. 5 illustrates another example of displaying objects representing windows included in a work group on a window frame, according to an exemplary embodiment.

FIGS. 4A-5 illustrate examples of displaying an object representing windows included in a work group on a window frame, according to an exemplary embodiment.

Referring to FIG. 4A, the device 1000 may display an object 40 representing windows included in a work group, on an upper frame of a window 41. The object 40 representing windows may include icons, names, or thumbnails representing the windows included in the work group. The object 40 representing windows is not limited thereto, and the object 40 may include certain types of images that are displayed on the screen of the device 1000 to represent the windows included in the work group. In another example, the device 1000 may display the object 40 representing the windows included in the work group, on a lower frame of the window 41. Exemplary embodiments of the disclosure are not limited thereto, and the object 40 may be displayed on a left or right frame of the window 41 or on a certain area within the window 41.

According to an exemplary embodiment, the device 1000 may use a ribbon and/or object linking and embedding (OLE) in order to display the object 40 representing the windows included in the work group on the upper frame of the window 41. The ribbon is a UI for constructing additional menus within a window frame by using an OS. The ribbon may provide functions of an application as a command collection formed of a series of tabs. OLE is a technology of linking different applications, and allows an application to perform an operation of another application.

Referring to FIG. 4B, according to another exemplary embodiment, the device 1000 may set a work group of windows by using a special application. A special application for setting and displaying a window work group (hereinafter, a work group management application) may be implemented independently from an OS of the device 1000, or may be additionally implemented via a module having a management function, such as production, deletion, or switching of a window, within the OS.

The device 1000 may display a window 43 corresponding to the work group management application on a window 42 included in the work group such that window 43 is displayed on top of or overlaps with window 42. Thus, at least one object representing the windows included in the work group may be displayed on the window 43 corresponding to the work group management application. When one of the displayed objects is selected, a window corresponding to the selected object may be displayed on the screen.

Referring to FIG. 5, the device 1000 may display an object 50 representing windows included in a work group, on an upper frame of a window 51. The object 50 representing windows may include an object 52 corresponding to each window included in a work group, and objects 53, 54, and 55 respectively representing work groups.

When the objects 53, 54, and 55, which represent work groups and are displayed within a window, are selected, the device 1000 may display all of the windows included in each of the work groups. When the objects 53, 54, and 55 representing work groups are selected, objects representing windows included in the selected work groups may be displayed.

For example, when a work group including the currently-displayed window 51 is a work group A 53, the device 1000 may display the object 52 representing the windows included in the work group A 53. When the objects 54 and 55 representing the work groups other than the work group A 53 are selected, objects representing the windows included in the other work groups may be displayed within the window 51. In another example, when the objects 54 and 55 respectively representing the work groups other than the work group A are selected, at least one of the windows included in the work group B 54 and the work group C 55 may be displayed on the screen.

In another example, when the object 53, 54, and 55 representing work groups are selected, the device 1000 may perform an operation that is preset for convenience of a user. For example, when one of the objects 53, 54, and 55 displayed on the screen of the device 1000 is selected, a window that has been the most recently displayed from among the windows included in the selected work group may be activated and displayed on the screen.

In another example, when a current work group is switched to another work group, the device 1000 may store a layout of windows displayed on the screen for the current work group. Accordingly, when the device 1000 switches back to the previous current work group from the other work group and displays the windows included in the current work group, the device 1000 may restore the stored layout.

The device 1000 may store not only a state of a work group but also a current work state of a window that is deactivated during switching between windows included in the work group. For example, when a specific window is deactivated for switch between windows included in a work group, the work group management application may store a current state (e.g., a scroll location and a cursor location) of the deactivated window and restore the stored current state when the window is activated later.

Although the objects 40 and 50 are displayed as icons corresponding to the windows included in each work group in FIG. 4A-5, the objects 40 and 50 may be displayed as texts and thumbnails representing the windows. Exemplary embodiments of the disclosure are limited thereto, and objects displayed by the device 1000 may have any form as long as it enables a user to recognize what window a displayed object corresponds to.

Figure 6A:
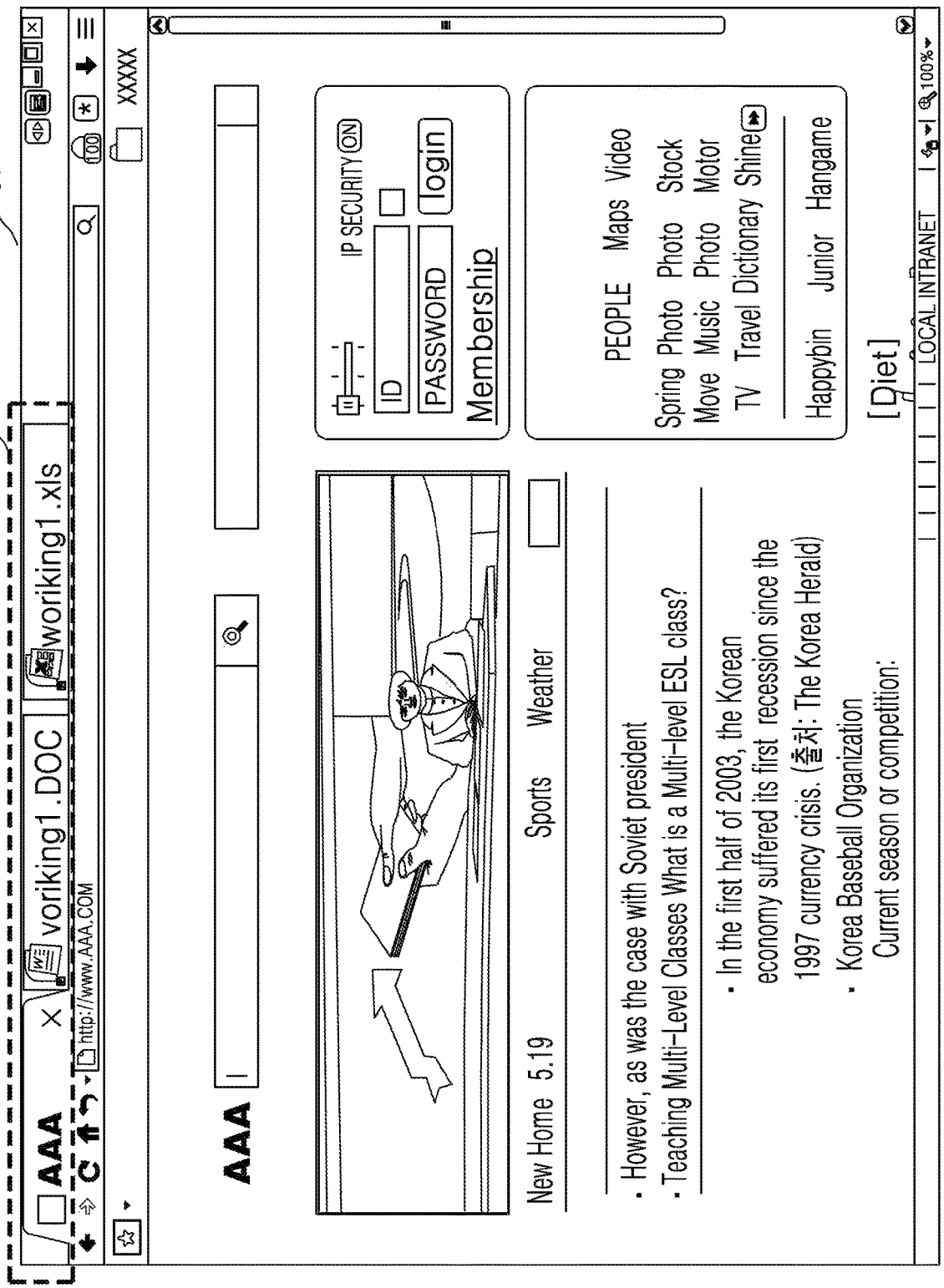
FIG. 6A illustrates an example of displaying objects representing windows included in a work group in the form of tabs, according to an exemplary embodiment.

FIG. 6A illustrates an example of displaying objects representing the windows included in a work group in the form of tabs, according to an exemplary embodiment.

Referring to FIG. 6A, the device 1000 may display at least one object 60 representing the windows included in a work group, in the form of a tab on a window 61. Accordingly, the device 1000 is able to switch a screen image between windows corresponding to works that are executed via an application, by using the tabs, and is also able to switch a screen image between windows corresponding to works that are executed via different applications included in a work group by using tabs.

The method of setting and displaying a window work group described above with reference to FIGS. 4A-6A may be provided via an OS or via a work group management application. Whether a work group is used, whether a work group is automatically produced, whether work groups are automatically arranged, a work group displaying method, the maximum number of work groups which are to be used, and the like may be set according to an input of a user.

Figure 6B:
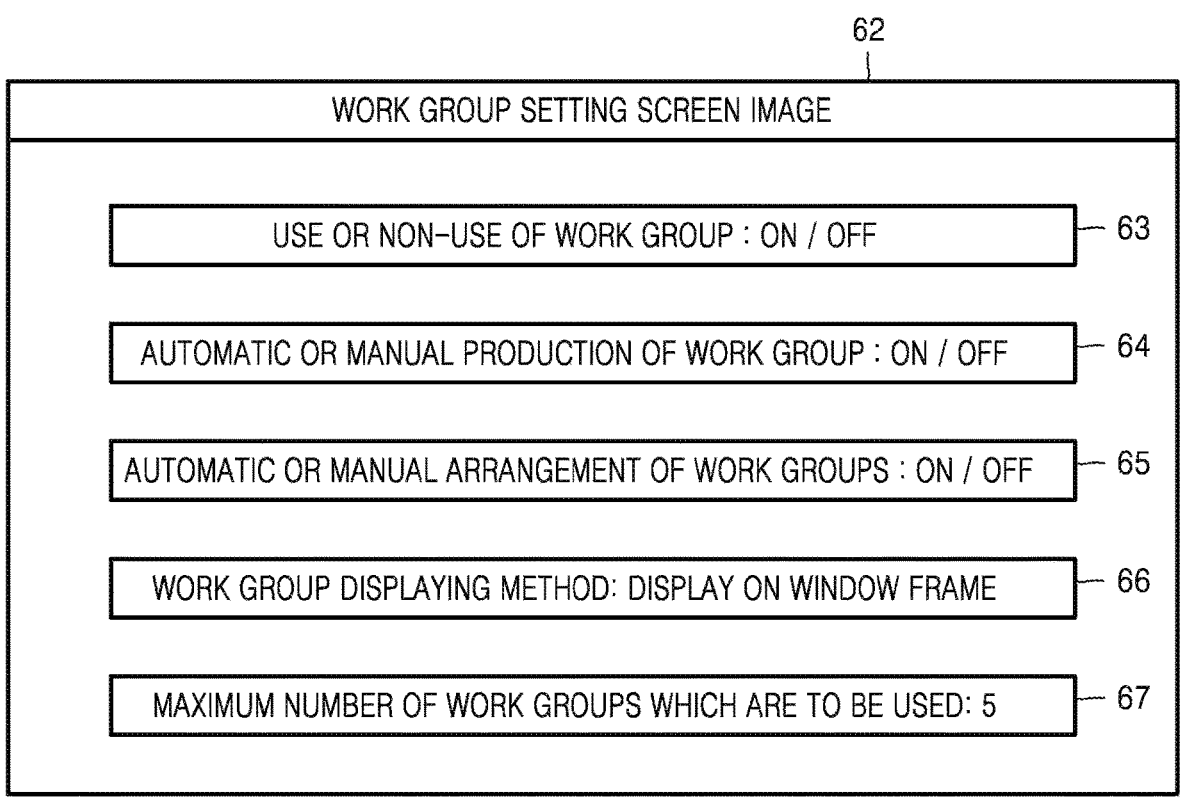
FIG. 6B illustrates a work group setting screen image according to an exemplary embodiment.

For example, FIG. 6B illustrates a work group setting screen image 62 according to an exemplary embodiment.

For example, the work group setting screen image 62 may include a menu 63 for determining use or non-use of a work group, a menu 64 for determining automatic or manual production of a work group, a menu 65 for determining automatic or manual arrangement of work groups, a menu 66 for determining a work group displaying method, and a menu 67 for determining the maximum number of work groups which are to be used.

The device 1000 may receive a setting of whether to use a work group, via the menu 63 for determining use or non-use of a work group. When the setting of whether to use a work group is set as ON, an object representing the work group may be displayed on a window frame.

The device 1000 may receive a setting of whether to automatically produce a work group, via the menu 64 for determining whether to automatically produce a work group. When the setting of whether to automatically produce a work group is set as ON, windows may be classified based on the attributes of the windows and the classified windows may be automatically determined as predetermined work groups, as will be described later with reference to FIGS. 26-39. A criterion for classifying the windows into the predetermined work groups may be set.

The device 1000 may determine whether to automatically arrange work groups in an ascending or descending order, via the menu 65 for determining whether to automatically arrange work groups.

The device 1000 may receive setting of an area on the screen on which a work group is to be displayed and a manner in which the work group is to be displayed, via the menu 66 for determining a method of displaying a work group. For example, it may be determined whether to display a work group within a window frame or a special area.

The device 1000 may receive setting of the maximum number of work groups which are to be used, via the menu 67 for determining the maximum number of work groups.

Although an object corresponding to a work group is displayed within a window in FIGS. 2-6B, exemplary embodiments of the disclosure are not limited thereto.

A method of switching displays of windows included in a work group by selecting an object representing a window included in the work group on a certain area of the device 1000 will now be described in detail with reference to FIGS. 7-9.

FIG. 7 is a flowchart of a method of switching between windows included in a work group, according to an exemplary embodiment.

Since operations S710 through S730 are the same as operations S210 through S230 of FIG. 2, only differences between the method of FIG. 7 and the method of FIG. 2 will be described here below.

Referring to FIG. 7, in operation S710, the device 1000 may determine a working group including windows of a plurality of applications.

In operation S720, the device 1000 may display at least one of the windows included in the determined work group.

In operation S730, the device 1000 may display at least one object representing the windows included in the determined work group. The object representing the windows included in the determined working group may be displayed on a certain area on the upper, lower, left, or right side of the screen of the device 1000. For example, the at least one object representing the windows included in the determined work group may be displayed on a tray window of an OS installed in the device 1000.

In operation S740, the device 1000 determines whether one of the displayed objects is selected. If one of the displayed objects is selected, the method proceeds to operation S750. Otherwise, the method is fed back to operation S720 to continuously display the current window.

In operation S750, the device 1000 may display a window corresponding to the selected object.

Accordingly, when a specific object corresponding to a window included in a work group is selected, the device 1000 may switch a current window to a window corresponding to the selected object.

FIG. 8A shows an example of a method of switching between windows within a work group, according to an exemplary embodiment.

According to an exemplary embodiment, the device 1000 may display, on an area on the screen thereof, objects 81 and 82 respectively representing work groups, and at least one of objects 83 and 84 representing a window included in a work group.

For example, referring to FIG. 8A, the device 1000 may display the objects 81 and 82 respectively representing first and second groups on a tray window 80 on the screen. When a user selects the first group, the objects 83 and 84 representing the windows of the first group may be further displayed. When the object 83 is selected from the objects 83 and 84, a currently-displayed window 86 may be switched to a window 85 corresponding to the selected object 83.

Thus, the device 1000 may classify objects representing the windows included in work groups and provide the classified objects to a user, via the tray window 80, and thus the user may easily switch between the windows classified into the work groups.

In another example, when the object 83 is selected from the objects 83 and 84, the currently-displayed window 86 may be maintained, and only the contents of the work displayed on the window 86 may be refreshed with a screen image corresponding to the selected object 83.

Figure 8B:
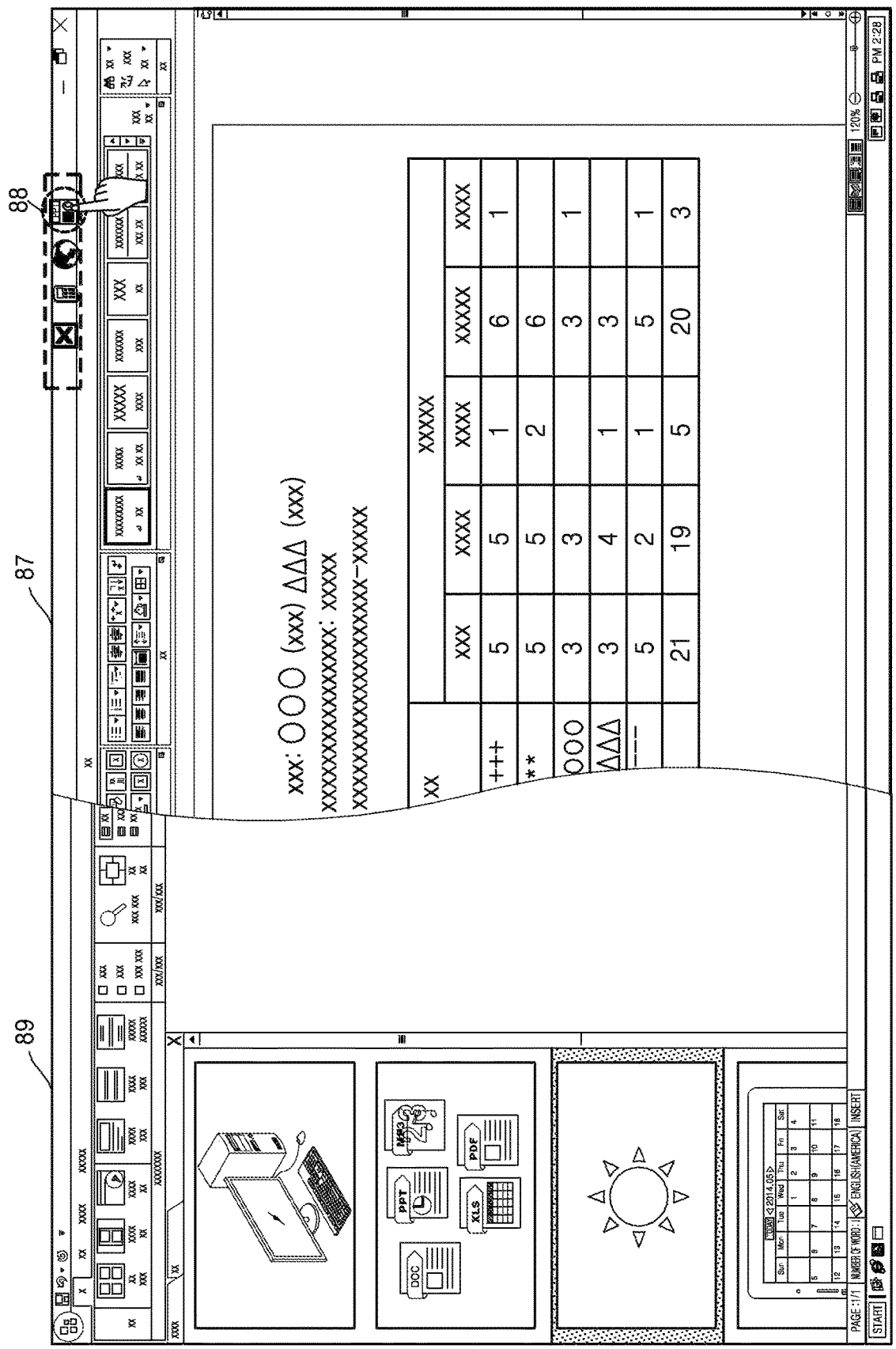
FIG. 8B shows another example of a method of switching between windows within a work group, according to an exemplary embodiment.

For example, FIG. 8B shows another example of a method of switching between windows within a work group, according to an exemplary embodiment.

Referring to FIG. 8B, the device 1000 may display, on a displayed window 87, at least one object 88 representing the other windows included in a work group. When at least one of the displayed objects 88 is selected, a screen image within the window 87 currently being displayed on the device 1000 may be refreshed with a screen image 89 representing a work corresponding to the selected object.

Figure 9:
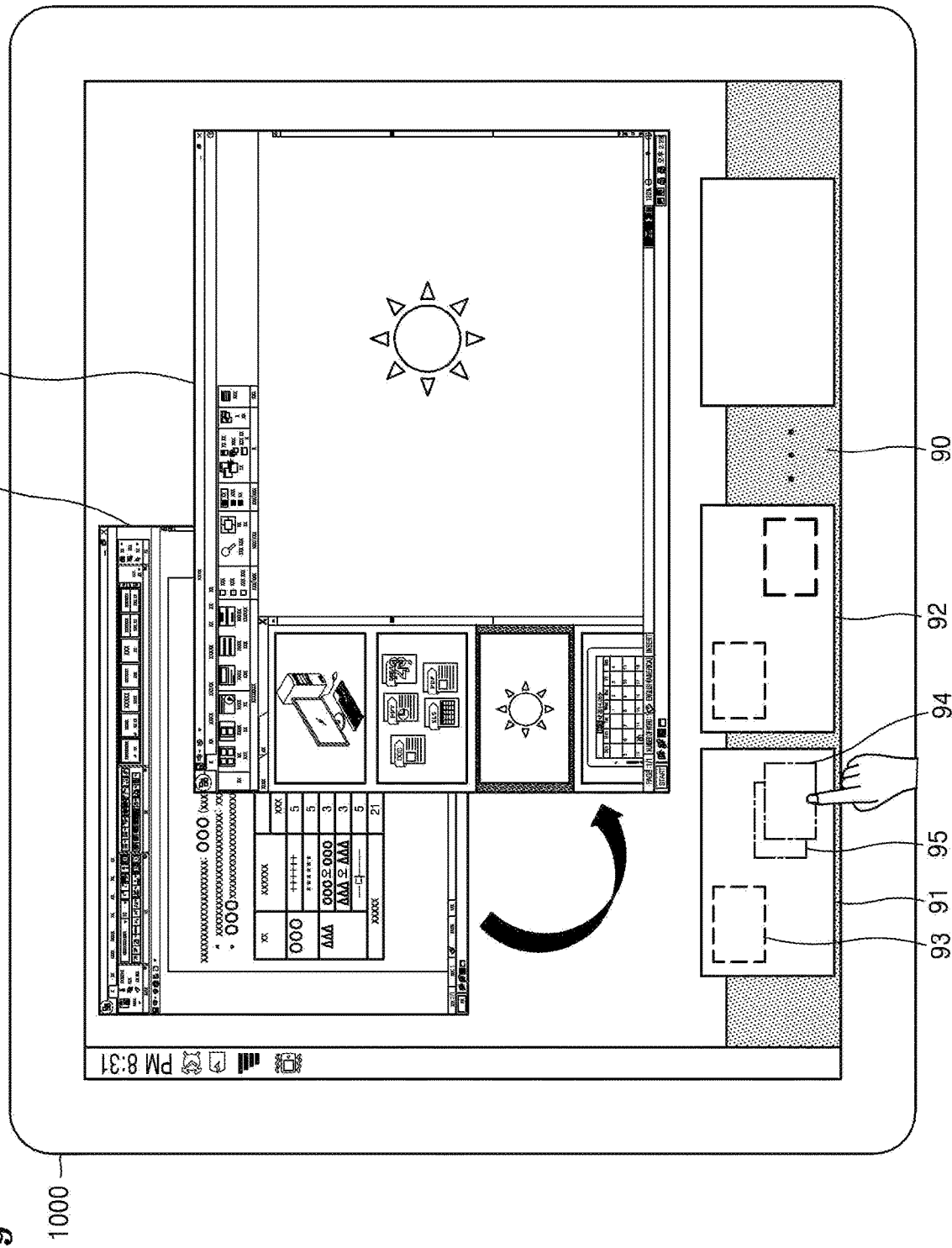
FIG. 9 shows another example of a method of switching between windows within a work group, according to an exemplary embodiment.

FIG. 9 shows another example of a method of switching between windows within a work group, according to an exemplary embodiment.

Referring to FIG. 9, the device 1000 may display objects 91 and 92 representing work groups (e.g., first and second groups), in the form of thumbnails on a tray window 90 on the screen. A thumbnail used herein may denote a reduced-size version of a screen image on which a window is activated and displayed. For example, in FIG. 8A, the objects 81 and 82 representing the work groups and the objects 83 and 84 representing the windows included in a work group are displayed in a text form. However, referring to FIG. 9, the device 1000 may display objects 93, 94, and 95 corresponding to the windows included in the first work group, as thumbnails of the windows. Accordingly, a user may intuitively select windows 96 and 97 included in a work group and switch them.

Although an object representing a work group is displayed on a tray window on the screen of the device 1000 in FIGS. 8A-9, exemplary embodiments of the disclosure are not limited thereto, and the object representing a work group may be displayed on an area within the screen of the device 1000 in the form of a popup window. For example, the object representing the work group may be displayed on a certain area within a window, as illustrated in FIGS. 4A-6.

Figure 10:
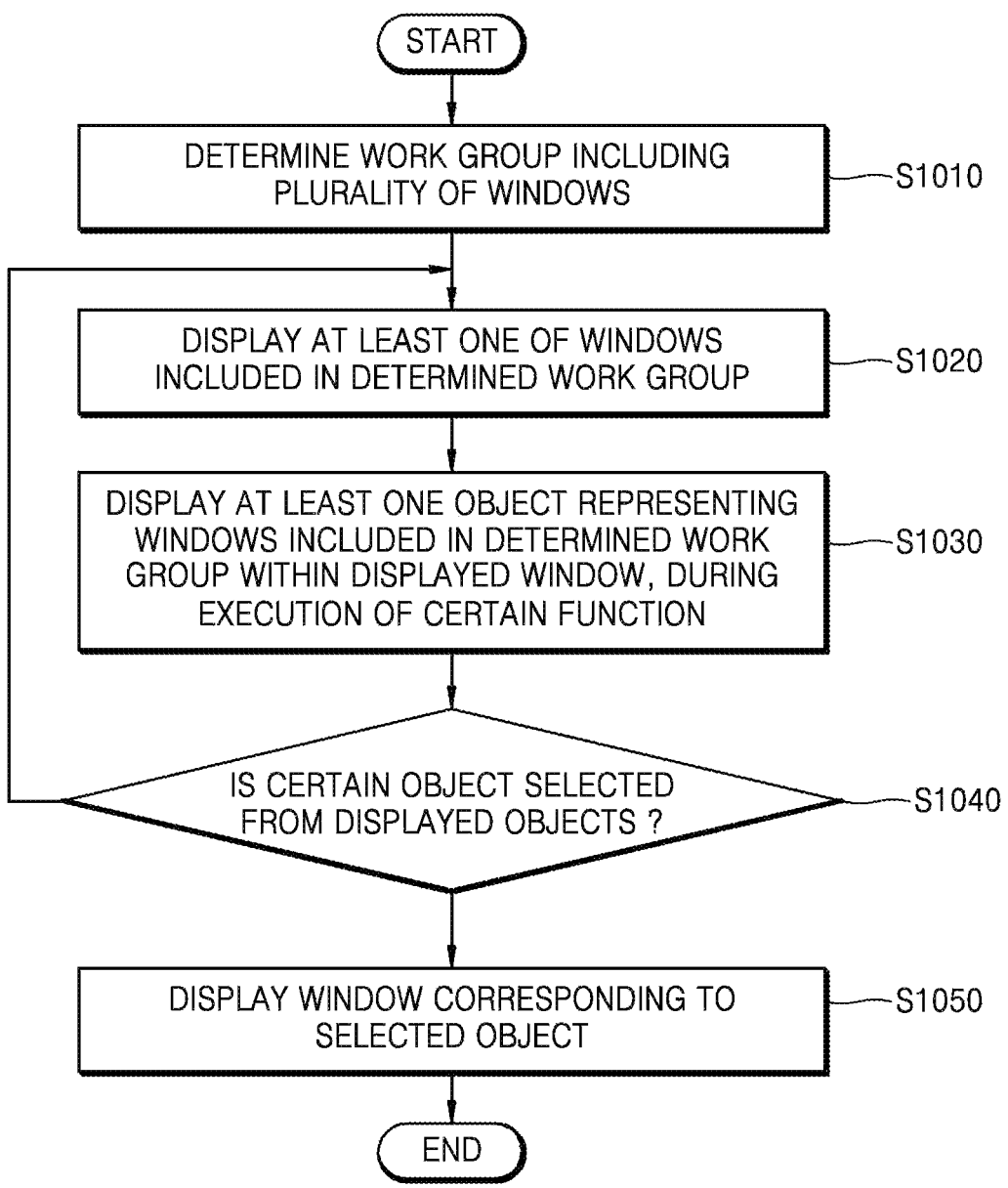
FIG. 10 is a flowchart of a method of displaying objects representing windows included in a work group during execution of a certain function, according to an exemplary embodiment.

FIG. 10 is a flowchart of a method of displaying objects representing windows included in a work group during execution of a certain function, according to an exemplary embodiment.

Since descriptions of operations S1010 through S1050 are similar to the descriptions given above with reference to FIGS. 2 and 7, only matters of the method of FIG. 10 different from the methods of FIGS. 2 and 7 will now be described herein.

In operation S1010, the device 1000 according to an exemplary embodiment may determine a work group including a plurality of windows.

In operation S1020, the device 1000 may display at least one of the windows included in the determined work group.

In operation S1030, the device 1000 may display at least one object representing the windows included in the determined work group within the displayed window, during execution of a certain function. The certain function may denote a text edition command within a window, such as moving of a cursor, inputting of a command for a screen image switch, copying, cutting, or pasting. Exemplary embodiments of the disclosure are not limited thereto, and the certain function may denote a preset operation or conditions for displaying objects representing windows.

In operation S1040, as the at least one object representing the windows included in the determined work group is displayed, the device 1000 may determine whether a certain object is selected from the displayed objects. When a certain object is selected from the displayed objects, the device 1000 may display a window corresponding to the selected object, in operation S1050. On the other hand, when a certain object is not selected from the displayed objects, the method is fed back to operation S1020, and thus the device 1000 may continuously display the current window.

A method of displaying objects representing windows included in a work group during execution of a certain function will now be described in detail with reference to FIGS. 11 and 14.

FIG. 11 shows an example of displaying objects representing windows included in a work group during execution of a certain function, according to an exemplary embodiment.

Referring to FIG. 11, the device 1000 may display an object 112 representing the windows included in a work group, when a mouse cursor which moves based on a user input is moved to a certain location 111 on a displayed window 110. The particular location 111 may be on an upper or lower frame of the window 110.

In another example, the device 1000 may display the window 110 and an object 113 representing that the object 112 representing the windows included in the work group is hidden. Only when the mouse cursor selects, based on a user input, the object 113 representing that the object 112 representing the windows included in the work group is hidden, the device 1000 may display the object 112 representing the windows included in the work group.

Figure 12:
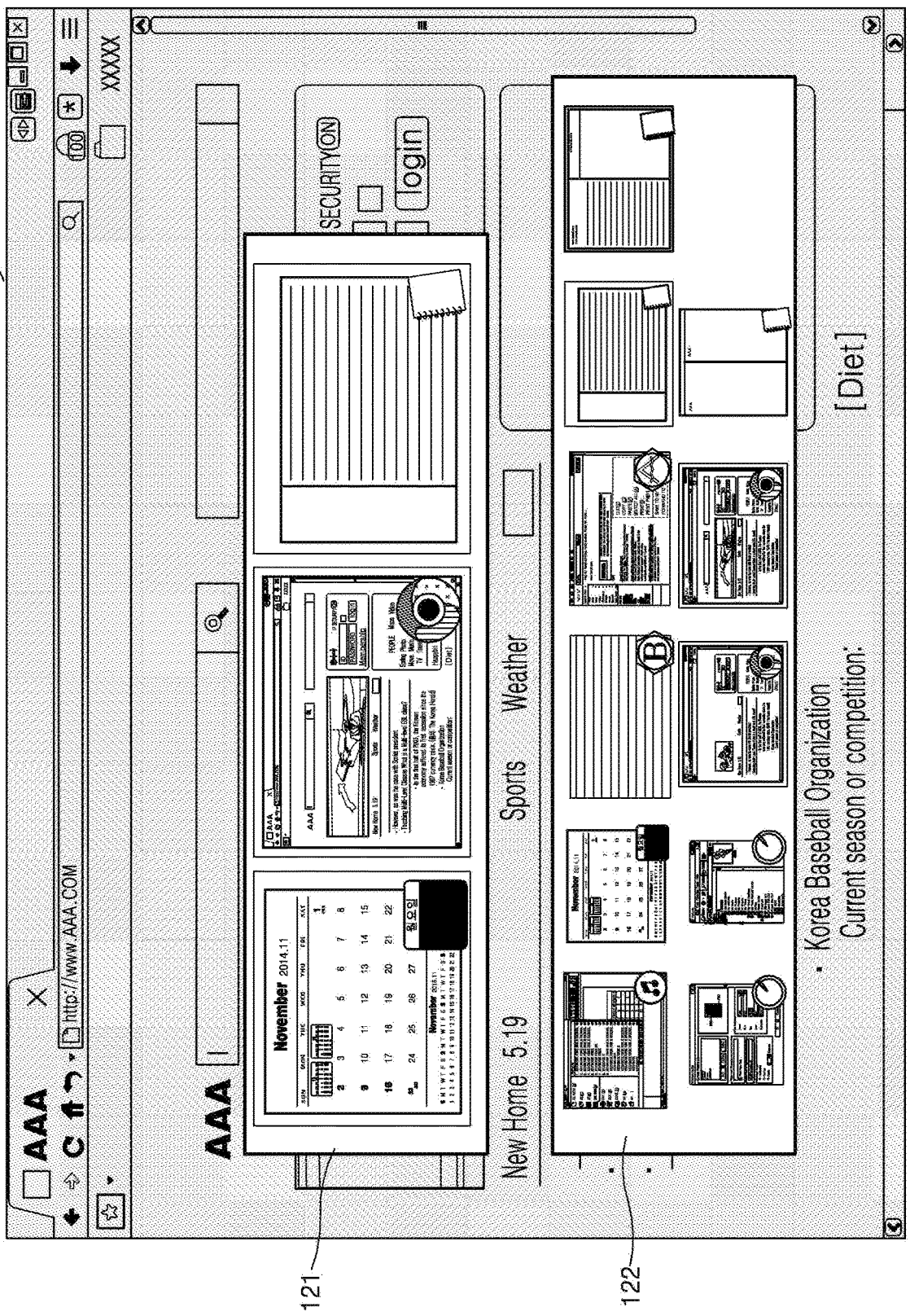
FIG. 12 shows another example of displaying objects representing windows included in a work group during execution of a certain function, according to an exemplary embodiment.

FIG. 12 shows another example of displaying objects representing windows included in a work group during execution of a certain function, according to an exemplary embodiment.

Referring to FIG. 12, in response to a command for a screen image switch, the device 1000 may display an object 121 representing windows included in a work group, on a certain area of the screen thereof. The displayed object 121 may represent the windows included in a work group to which a currently-displayed window 120 belongs. The device 1000 may shade and display the currently-displayed window 120 when the object 121 is displayed.

In another example, in response to a command for a screen image switch, the device 1000 may display the object 121 representing the windows included in a work group, and an object 122 representing all windows that are currently being executed in the device 1000.

Accordingly, a user may select not only a window included in a work group to which a currently-displayed window belongs, but also one of the windows currently being executed in the device 1000.

Figure 13:
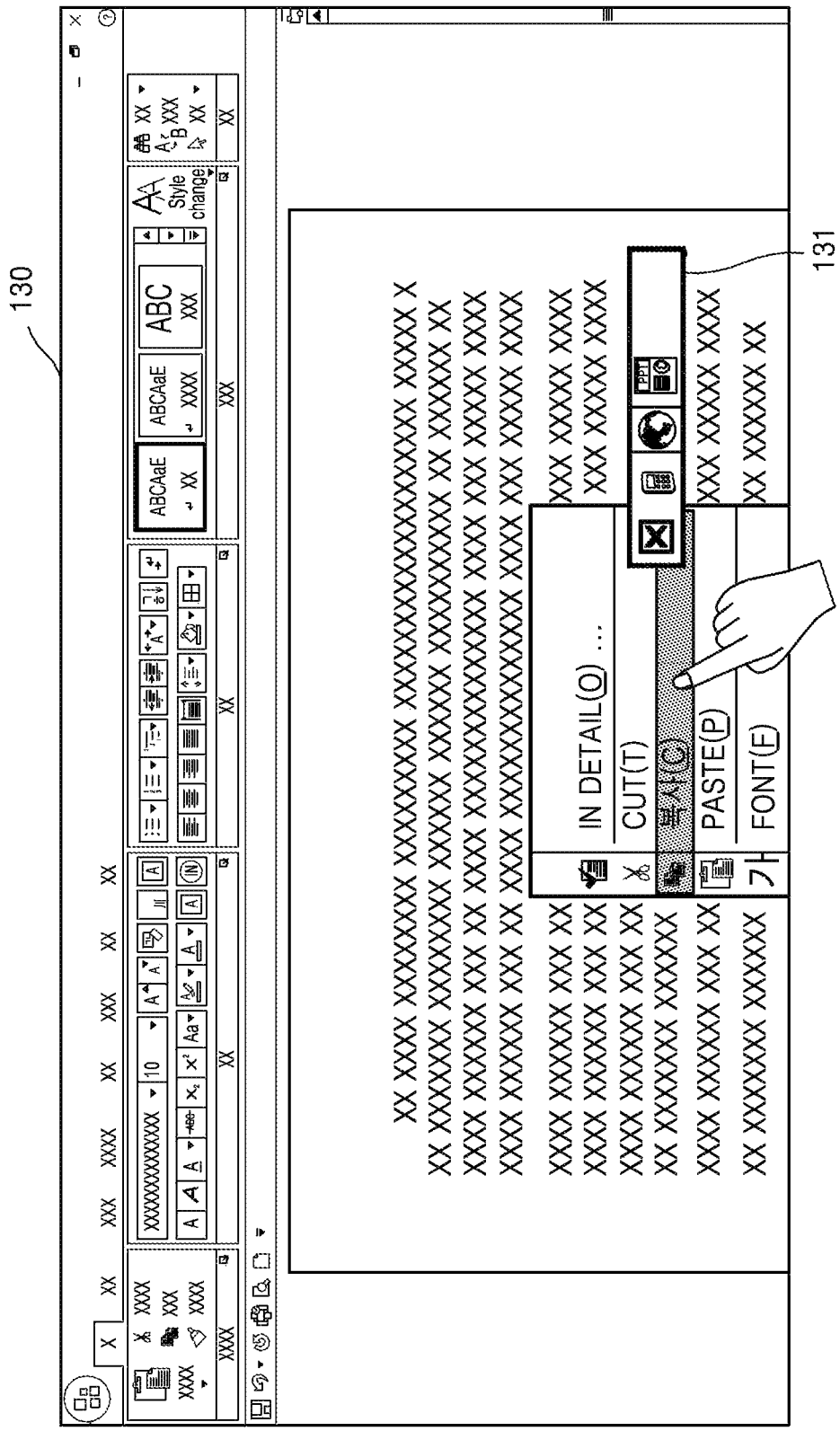
FIG. 13 shows another example of displaying objects representing windows included in a work group during execution of a certain function, according to an exemplary embodiment.

FIG. 13 shows another example of displaying objects representing windows included in a work group during execution of a certain function, according to an exemplary embodiment.

For example, referring to FIG. 13, when a specific text within a displayed window 130 is copied, the device 1000 may display a recommendation list 131 of at least one work to which the copied text is to be moved. The recommendation list 131 may include an object corresponding to at least one of the windows included in the work group.

Accordingly, when a specific object is selected from the objects displayed on the recommendation list 131, the device 1000 may display a window corresponding to the selected object so that the copied text may be immediately pasted to the window. FIG. 13 describes only a case of copying a text, but exemplary embodiments of the disclosure may be applied to a case of copying and cutting an image.

Figure 14:
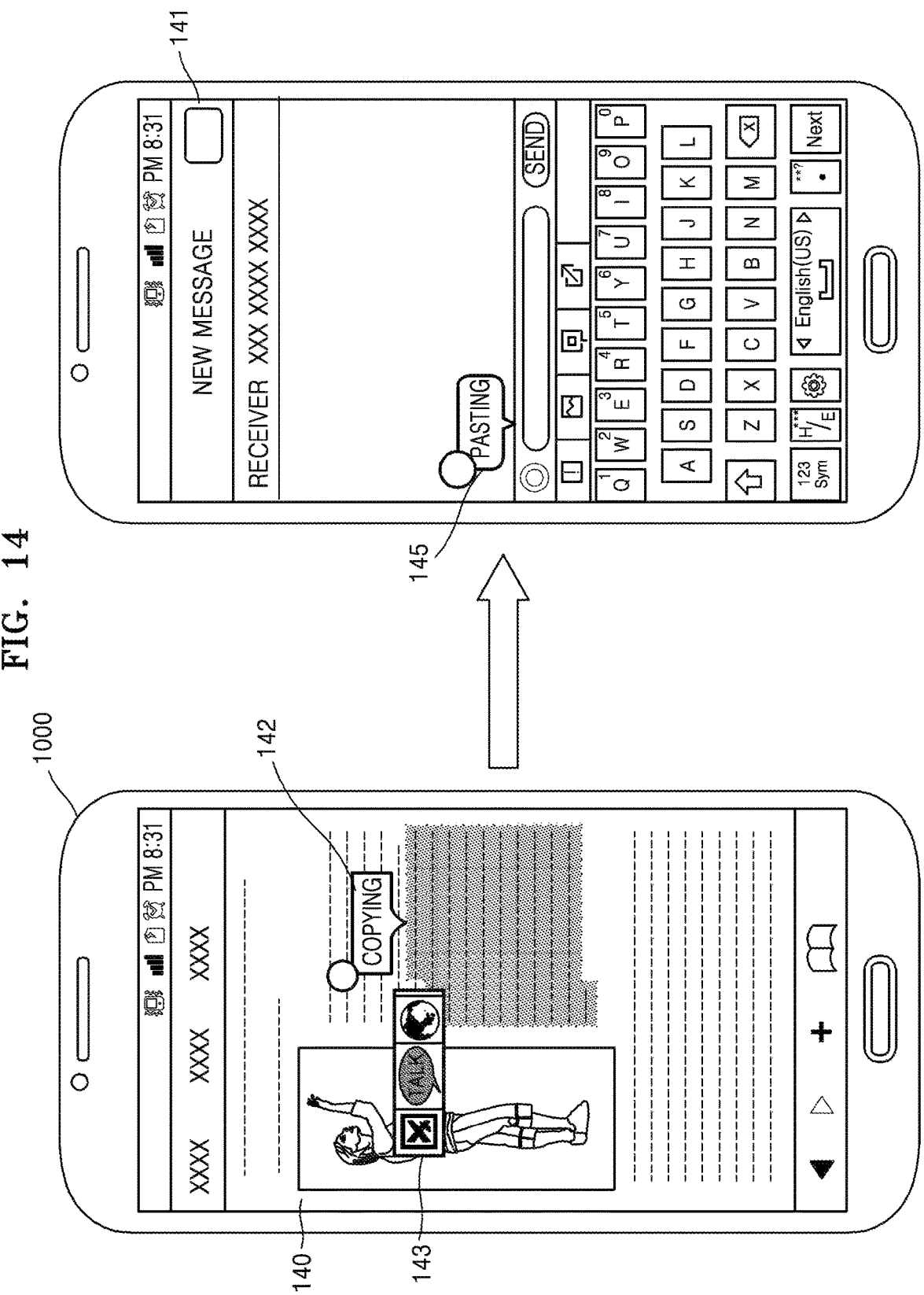
FIG. 14 shows another example of displaying objects representing windows included in a work group during execution of a certain function, according to an exemplary embodiment.

FIG. 14 shows another example of displaying objects representing windows included in a work group during execution of a certain function, according to an exemplary embodiment.

Referring to FIG. 14, even when the device 1000 is a mobile terminal, the above-described method of FIG. 13 may also be applied. In other words, when a specific text included in a window 140 of the device 1000 is copied, the device 1000 may display a recommendation list 143 of at least one work group to which the copied text is to be moved, within the window 140. The recommendation list 143 may include an object corresponding to at least one of the windows included in the work group. Accordingly, when a specific object is selected from the objects displayed on the recommendation list 143, the device 1000 may display a window 141 corresponding to the selected object so that the copied text may be pasted to the displayed window 141.

According to the above-described exemplary embodiments, a single window corresponding to a selected object is displayed. However, exemplary embodiments of the disclosure are not limited thereto, and all of the windows included in a selected work group may be displayed at a time.

An example of simultaneously displaying all of the windows included in a work group will now be described with reference to FIGS. 15-18.

Figure 15:
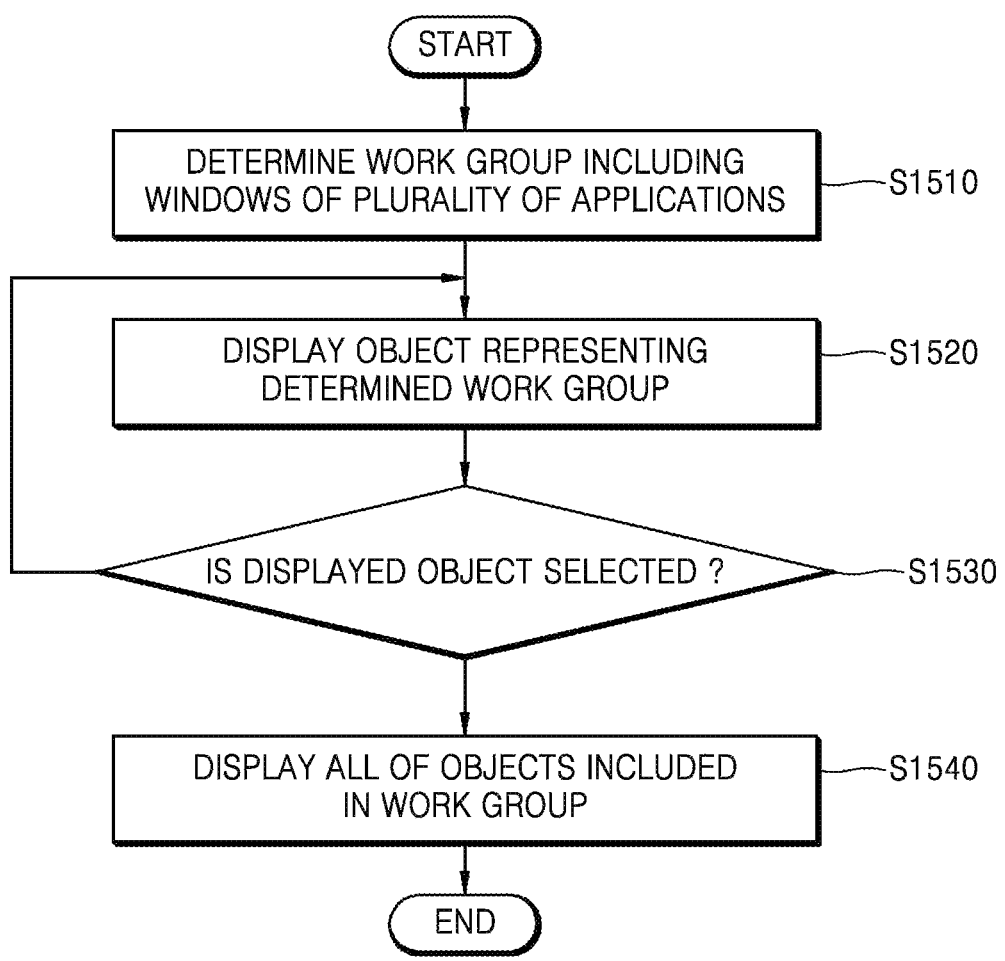
FIG. 15 is a flowchart of a method of displaying all of the windows included in a work group, according to an exemplary embodiment.

FIG. 15 is a flowchart of a method of displaying all of the windows included in a work group, according to an exemplary embodiment.

Since descriptions of operations S1510 through S1540 are similar to the descriptions of operations S1010 through S1050 of FIG. 10, only matters of the method of FIG. 15 different from the method of FIG. 10 will now be described herein.

In operation S1510, the device 1000 according to an exemplary embodiment may determine a work group including windows of a plurality of applications.

In operation S1520, the device 1000 may display an object representing the determined work group. The object representing the determined work group may include a plurality of objects representing the windows included in the determined work group.

In operation S1530, as the object representing the determined work group is displayed, the device 1000 may determine whether the displayed object is selected. When the object representing the determined work group is selected, the method proceeds to operation S1540 to display all of the objects included in the work group. On the other hand, when the object representing the determined work group is not selected, the method returns to operation S1520, and thus the device 1000 may continuously display the object representing the determined work group.

A method of displaying all of the windows included in a work group as an object representing the work group is selected will now be described in detail with reference to FIGS. 16-18.

Figure 16:
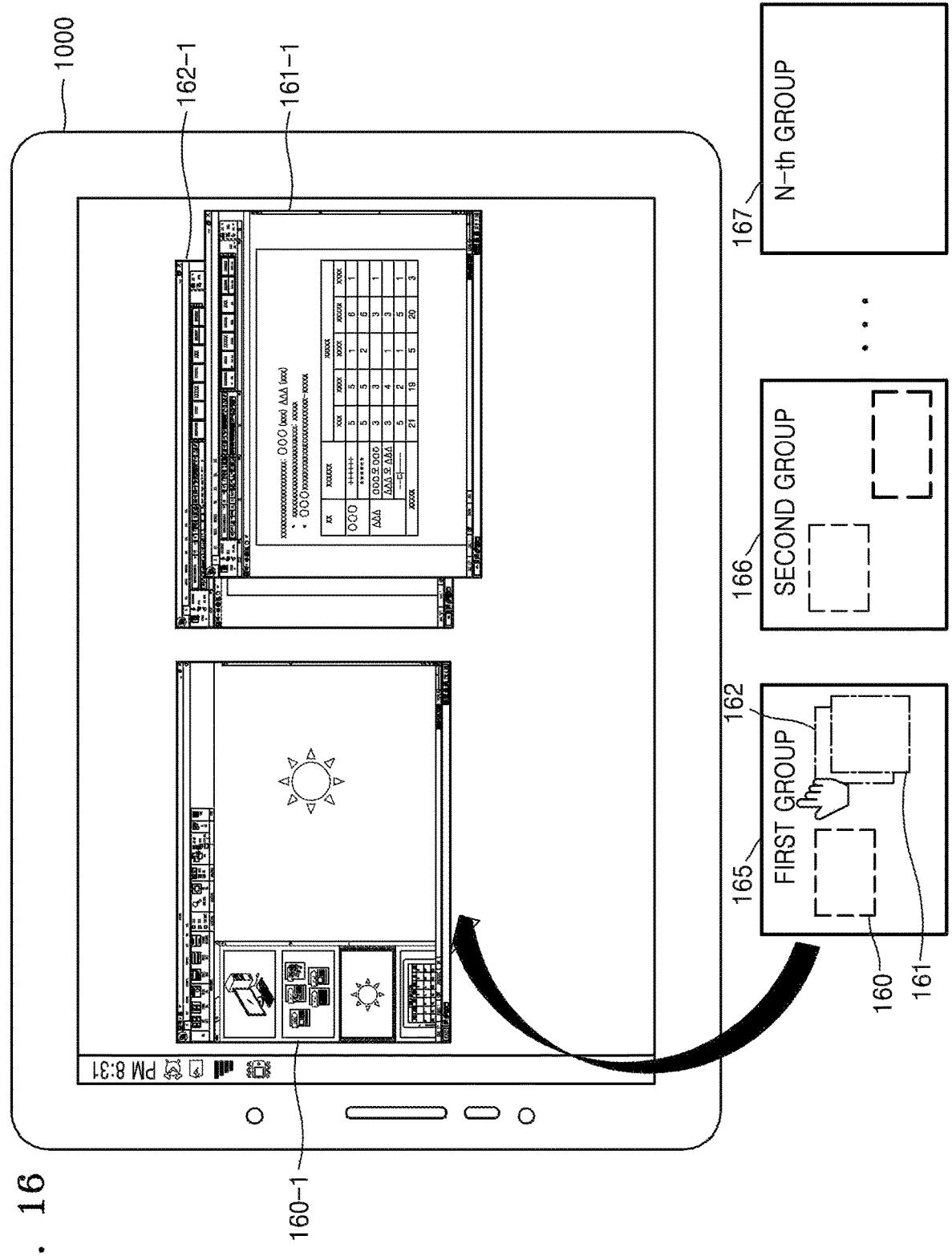
FIG. 16 shows an example of displaying all of the windows included in a work group, according to an exemplary embodiment.

FIG. 16 shows an example of displaying all of the windows included in a work group, according to an exemplary embodiment.

Referring to FIG. 16, the device 1000 according to an exemplary embodiment may display objects 165, 166, and 167 representing determined work groups. The objects 165, 166, and 167 representing the determined work groups may be displayed on an area on the screen or displayed together within a displayed window. In another example, the objects 165, 166, and 167 may be displayed while a certain function is being executed.

The objects 165, 166, and 167 representing workgroups may include objects 160, 161, and 162 representing the windows included in the work groups. For example, the object 165 representing a first work group may include the object 160 representing a first window 160-1 of a first application and the objects 161 and 162 representing windows 161-1 and 162-1 of a second application.

Thus, when the object 165 representing the first work group is selected based on a user input, the device 1000 may display all of the windows 160-1, 161-1 and 162-1 included in the object 165 representing the first group.

Referring to FIG. 16, the device 1000 according to an exemplary embodiment may display the object 165 representing the first work group, as a thumbnail of a screen image on which all of the windows included in the first work group are displayed. In other words, the device 1000 may set all of the windows displayed on a current screen image as a work group while a layout of the windows is maintained, and display the set work group as an object representing the work group. Thus, when an object representing a work group is selected and the windows included in the work group are displayed, a layout of the windows when the work group is set may be restored. Exemplary embodiments of the disclosure are not limited thereto, and, when the windows included in a work group are displayed, the windows may be arranged in a preset manner. When the device 1000 displays the windows as thumbnails, not only the layout of the windows but also statuses of works (e.g., a page which is being edited) executed in the windows may be stored, and the stored statuses of the works may be retrieved when an object corresponding to the windows is selected and the windows corresponding to the selected object are displayed, and thus a user may continuously perform a work.

Figure 17:
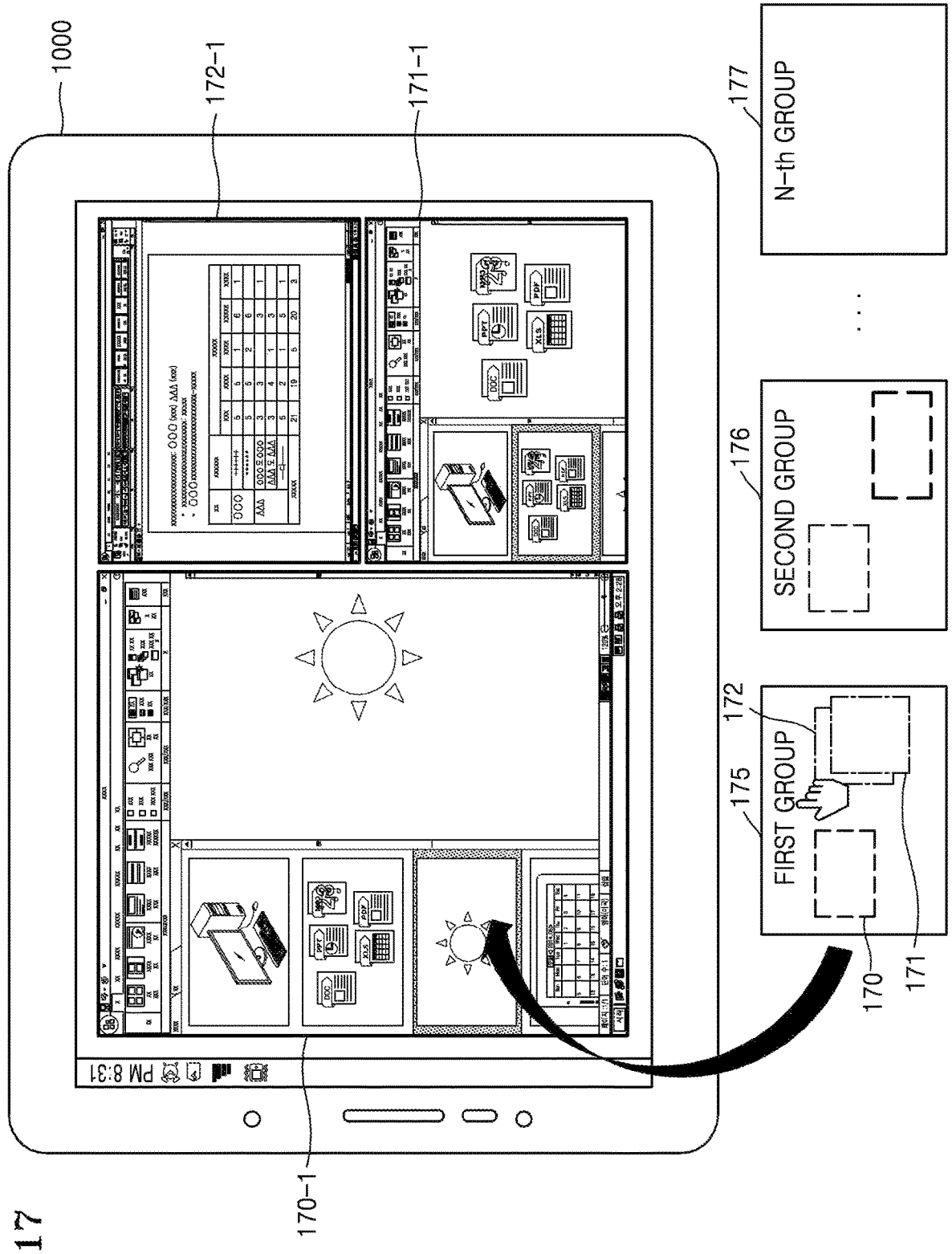
FIG. 17 shows another example of displaying all of the windows included in a work group, according to an exemplary embodiment.

FIG. 17 shows another example of displaying all of the windows included in a work group, according to an exemplary embodiment.

Referring to FIG. 17, the device 1000 according to an exemplary embodiment may display objects 175, 176, and 177 representing determined work groups, similar to FIG. 16. The objects 175, 176, and 177 representing working groups may include objects 170, 171, and 172 representing the windows 170-1, 171-1 and 172-1 included in the work groups.

When the object 175 representing a first work group is selected based on a user input, the device 1000 may arrange the windows 170-1, 171-1, and 172-1 included in the first group in a predetermined manner and display the arranged windows 170-1, 171-1, and 172-1 on the screen thereof.

For example, the device 1000 may divide the screen thereof in a certain ratio and display all of the windows included in a work group on the divided screen. The certain ratio may be determined according to the sizes of contents included in the windows or according to the number of windows included in the work group.

Figure 18:
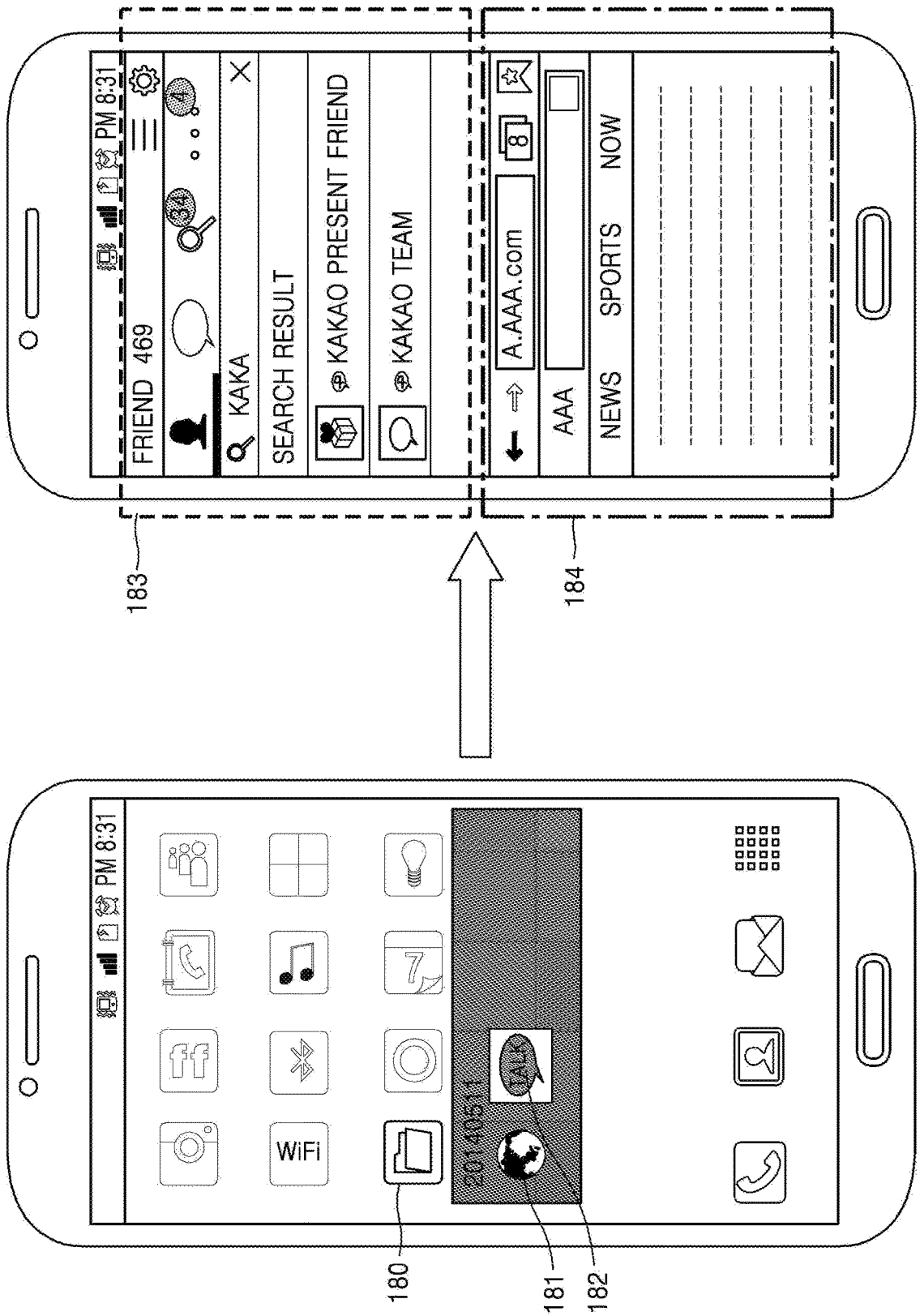
FIG. 18 shows an example in which a mobile terminal according to an exemplary embodiment manages each work group in the form of a folder.

FIG. 18 shows an example in which a mobile terminal according to an exemplary embodiment manages each work group in the form of a folder.

Referring to FIG. 18, in a device such as a mobile terminal, one application provides only one window, and thus a work group may denote an application group.

The device 1000 according to an exemplary embodiment may manage each work group in the form of a folder. The folder is a box which stores a program or a file on a GUI, and thus may denote an object displayed on the screen as an icon having the same shape as an actual file folder. For example, a folder may be used to schematically manage several programs or files stored in a memory and thus may serve as a directory. When a certain folder is selected, the selected folder is opened, and a file list contained in the folder may be displayed.

For example, objects 181 and 182 representing at least one work which is to be executed in the device 1000 may be included in a folder-shaped work group to thereby determine a work group. When an object 180 representing a work group displayed as a folder is selected based on a user input, the device 1000 may display the objects 181 and 182 representing the works included in the work group. When the object 180 representing a work group is selected in a particular manner (e.g., double click or long click), the device 1000 may arrange all of works included in the work group on the screen thereof in a preset manner and display the works. For example, as illustrated in FIG. 18, the device 1000 may equally divide the screen thereof and arrange the windows 183 and 184 on the divided screen.

As described above, a user may easily display the windows included in a work group on the screen.

Exemplary embodiments of selecting a working group will now be described in detail with reference to FIGS. 19-39.

Figure 19:
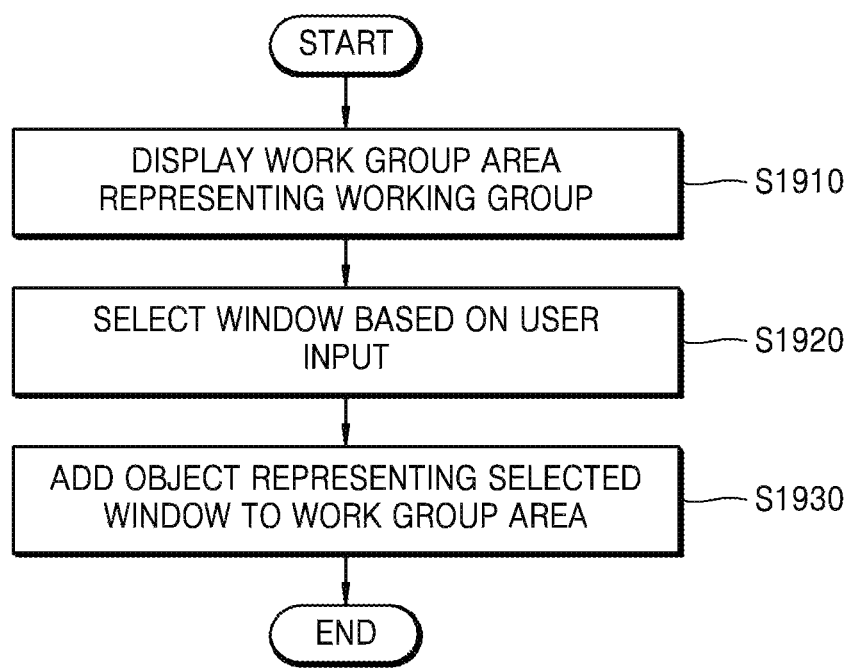
FIG. 19 is a flowchart of a method of determining a work group based on a user input, according to an exemplary embodiment.

FIG. 19 is a flowchart of a method of determining a work group based on a user input, according to an exemplary embodiment.

Referring to FIG. 19, in operation S1910, the device 1000 may display a work group area representing a working group. For example, the work group area may be displayed on a certain area on the screen of the device 1000. In another example the work group area may be displayed on a window that is currently being displayed on the screen.

In operation S1920, the device 1000 may select a window based on a user input. A window corresponding to a work that is being executed via an application may be displayed on the screen of the device 1000 or may be deactivated and displayed on one side of the screen as an object corresponding to the window. Examples of the user input may include a cursor movement via a mouse or a touch input, drag & drop, and a swipe. Exemplary embodiments of the disclosure are not limited thereto, and the user input may be any input enabling a user to control the device 1000. Thus, a gesture, an eye movement, and voice recognition may also be a user input.

In operation S1930, the device 1000 may add an object representing the selected window to the work group area.

For example, based on a user input, the object representing the selected window may be dragged and dropped to be added to the displayed work group area. In another example, based on a user input, a window displayed on the device 1000 may be dragged and dropped to be added to the work group area, or an object representing a window may be added to the work group area by setting each window such that the attributes thereof correspond to a certain work group.

A method of determining a work group based on a user input will now be described in detail with reference to FIGS. 20A-25B.

Figure 20A:
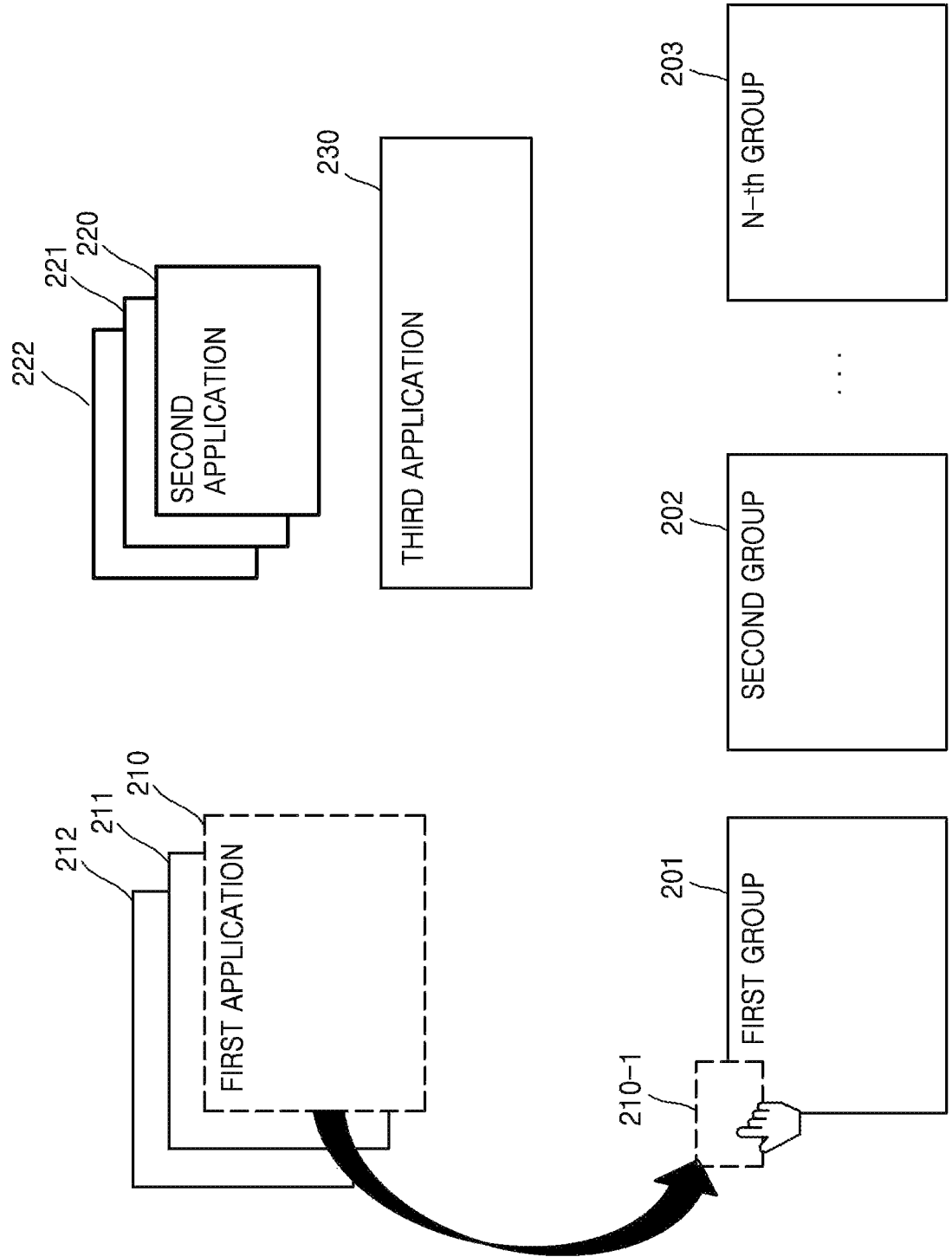
FIG. 20A shows an example of a method of determining a work group based on a user input, according to an exemplary embodiment.

FIG. 20A shows an example of a method of determining a work group based on a user input, according to an exemplary embodiment.

FIG. 20A illustrates a case in which three windows 210, 211, and 212 are being executed via a first application, three windows 220, 221, and 222 are being executed via a second application, and one window 230 is being executed via a third application. First through N-th groups 201 through 203 represent working groups.

The device 1000 according to an exemplary embodiment may determine a work group by adding, to a work group area, at least one from among a plurality of windows that are currently being executed via different applications. For example, based on a user input, an object 210-1 representing the first window 210 of the first application is moved to an area of the first group 201 and is thus added to the first group 201. Similarly, one of the windows 220, 221 and 222 of the second application and the window 230 of the third application may be moved to one area of areas of the first through N-th groups 201 through 203 and thus added to a particular work group of the area. The user input to add the application or window to the word group may be one from among dragging the application to the work group, touching and holding the application and then dragging the application to the work group, double tapping the application and tapping the work group, touching the application and the work group area simultaneously for a predetermined period of time. According to an exemplary embodiment, the application may be removed from a work group by performing at least one from among dragging the application away from the work group, touching and holding the application in the work group and then dragging the application away from the work group, double tapping the application and tapping the work group, touching the application and the work group area simultaneously for a predetermined period of time.

Although work groups are named as first through N-th groups for convenience of explanation in FIG. 20A, a user may directly input names for the work groups, or the names of the work groups may be automatically set by using information about the windows included in each work group.

Figure 20B:
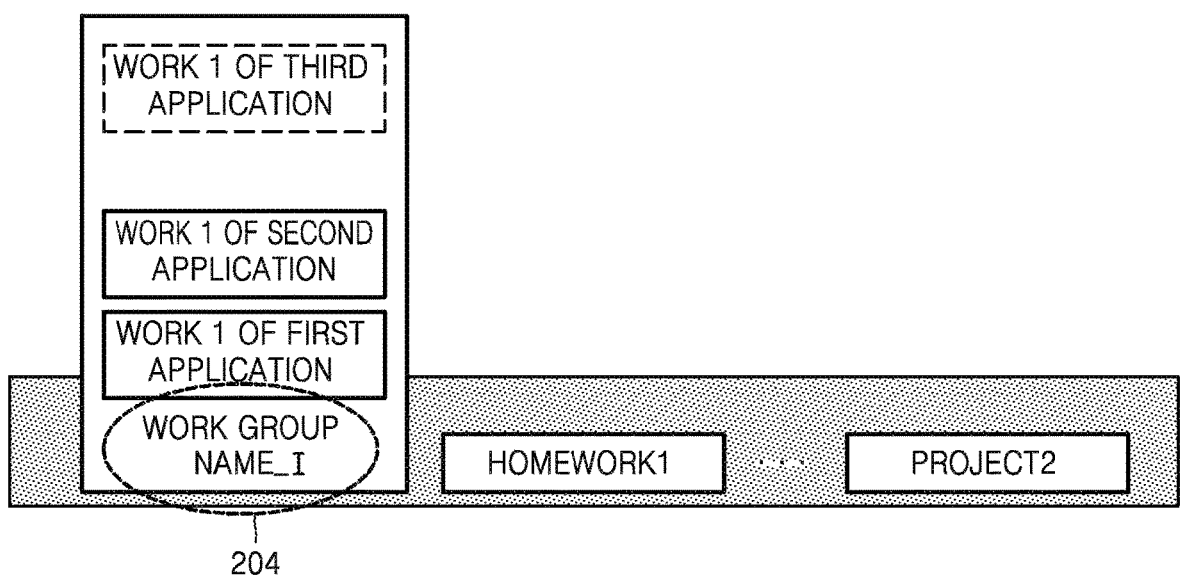
FIG. 20B illustrates an example of a method of determining a work group name, according to an exemplary embodiment.

For example, referring to FIG. 20B, the device 1000 may determine a work group name 204 as a character or a number selected by an input of a user. A previously determined work group name may be edited.

In another example, the device 1000 may determine a name of each work group, based on the attributes of works included in the work group.

Referring to FIG. 20C, a work group name 204 may be determined based on an attribute (e.g., a writing time) that is common to target files of windows 205 and 206 determined as a work group. The common attribute may be acquired from metadata 207 and 208 about the target files of the windows 205 and 206 included in the work group. Content of a target file may be displayed on a window corresponding to the target file.

Although the work group name 204 is determined based on a writing time in FIG. 20C, a work group name may be determined based on a common attribute such as a file name, a writer, an access time, a writing device, or a storage location.

As will be described later with reference to FIGS. 26-39, a work group may be automatically determined according to a particular attribute of windows. In this case, the work group name 204 may depend on the cause of automatic production of a work group.

Figure 21:
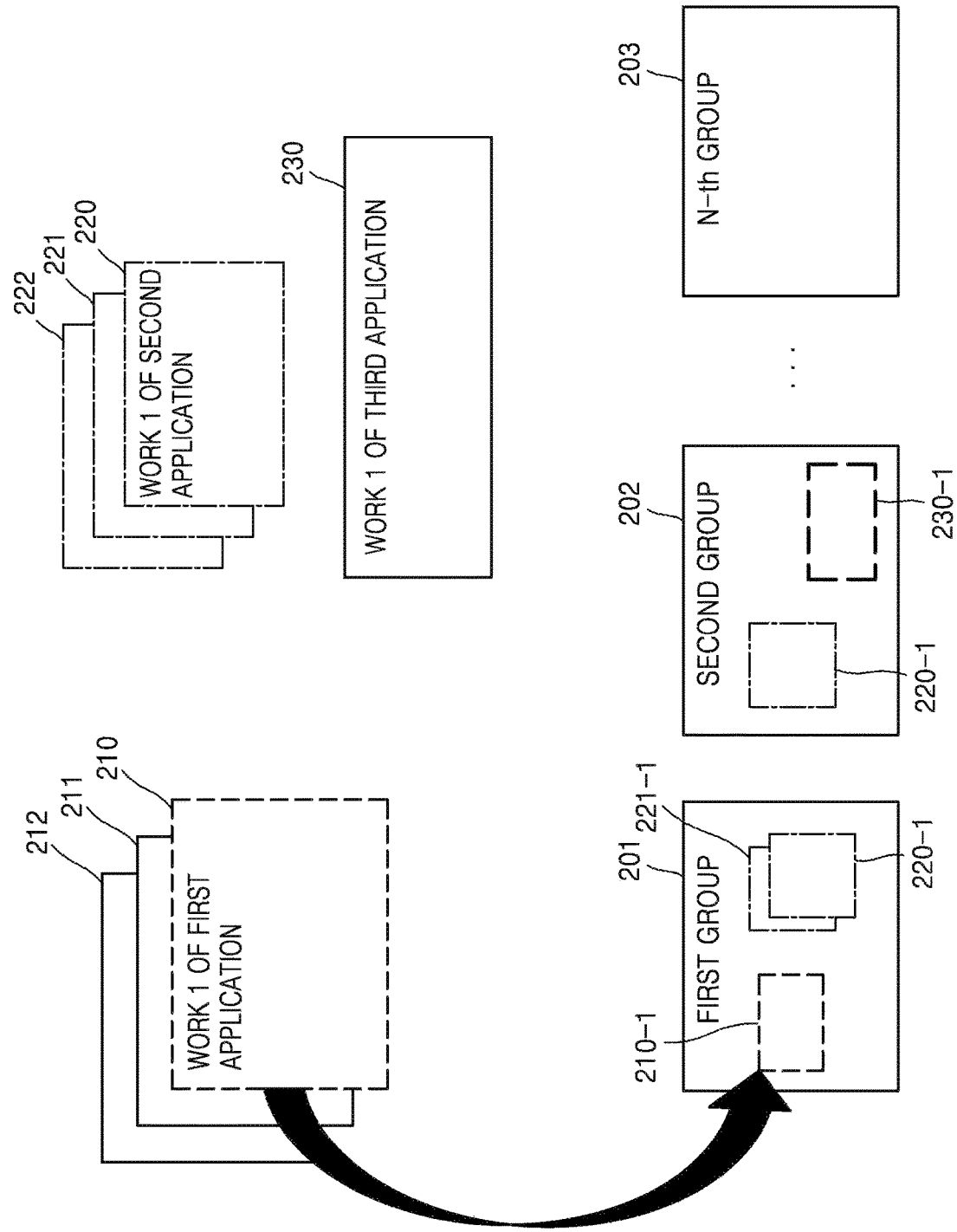
FIG. 21 shows another example of a method of determining a work group based on a user input, according to an exemplary embodiment.

FIG. 21 illustrates an example in which windows are added to a plurality of work groups, namely, first through N-th work groups 201 through 203, based on a user input.

Referring to FIG. 21, a first window 210 of a first application and a first window 220 and a second window 221 of a second application may be added to the first group 201. The first window 220 of the first application and a window 230 of a third application may be added to the second group 202. Each of the first through N-th work groups 201, 202, and 203 may include not only windows that are performed via different applications, but also include the windows 220 and 221 that are executed via an identical application but display different works. The window 220 may be included in both the first and second work groups 201 and 202.

According to an exemplary embodiment, objects representing the windows 210, 220, 221, and 230 added to the work groups 201, 202, and 203 may be displayed according to a layout of windows when the windows 210, 220, 221, and 230 are displayed on the screen of the device 1000. Accordingly, when one of the objects representing the windows 210, 220, 221, and 230 is selected, a window corresponding to the selected object may be displayed such that the location of the selected object on a work group area may correspond to the location of the window 210, 220, 221, or 230 on the screen of the device 1000. According to another exemplary embodiment, a layout of objects representing the windows 210, 220, 221, and 230 added to the work groups 201, 202, and 203 may represent a layout of windows when the windows 210, 220, 221, and 230 are displayed on the screen of the device 1000.

According to an exemplary embodiment, in FIG. 21, the windows 210, 220, 221, and 230 indicated by dashed lines may represent deactivated states. For example, the first window 210 of the first application being displayed on the screen may be deactivated while being added to the first group 201.

According to an exemplary embodiment, the windows 210, 220, 221, and 230 indicated by dashed lines in FIG. 21 may represent that the windows 210, 220, 221, and 230 are concluded. For example, when the first window 210 of the first application is a window that is being displayed to edit a document, the device 1000 may store a current state of the first window 210 and conclude the first window 210 when the first window 210 is being added to the first group 201. Later, the first window 210 may be executed when the object representing the first window 210 is selected from the first group 201. When the first window 210 is being executed, the device 1000 may retrieve the stored current state and the first window 210 may display the stored current state on the screen of the device 1000. Data related with a concluded window is preloaded to memory, and, when the concluded window is selected, the selected window may be fast executed and displayed on the screen of the device 1000.

In another example, when the first window 210 of the first application is a work window for playing back music and at least one of the windows 210, 221, and 222 included in the first group 201 is activated, the first window 210 may not be concluded and may operate (plays back music) in the background. When a window included in the second group 202 is activated, the first window 210 may store a current state thereof and be concluded (stop playing back music). When at least one of the windows 210, 221, and 222 included in the first group 201 is activated again, the device 1000 may execute the first window 210 of the first application to continuously play back the music that played back when the first window 210 was concluded.

In another example, a window that is added to a work group area may be a window of a not-yet-executed application. For example, an object representing an application may be added to a work group. Accordingly, an object representing an application within a work group area is selected, the application corresponding to the selected object may be executed and thus a window may be displayed.

Figure 22:
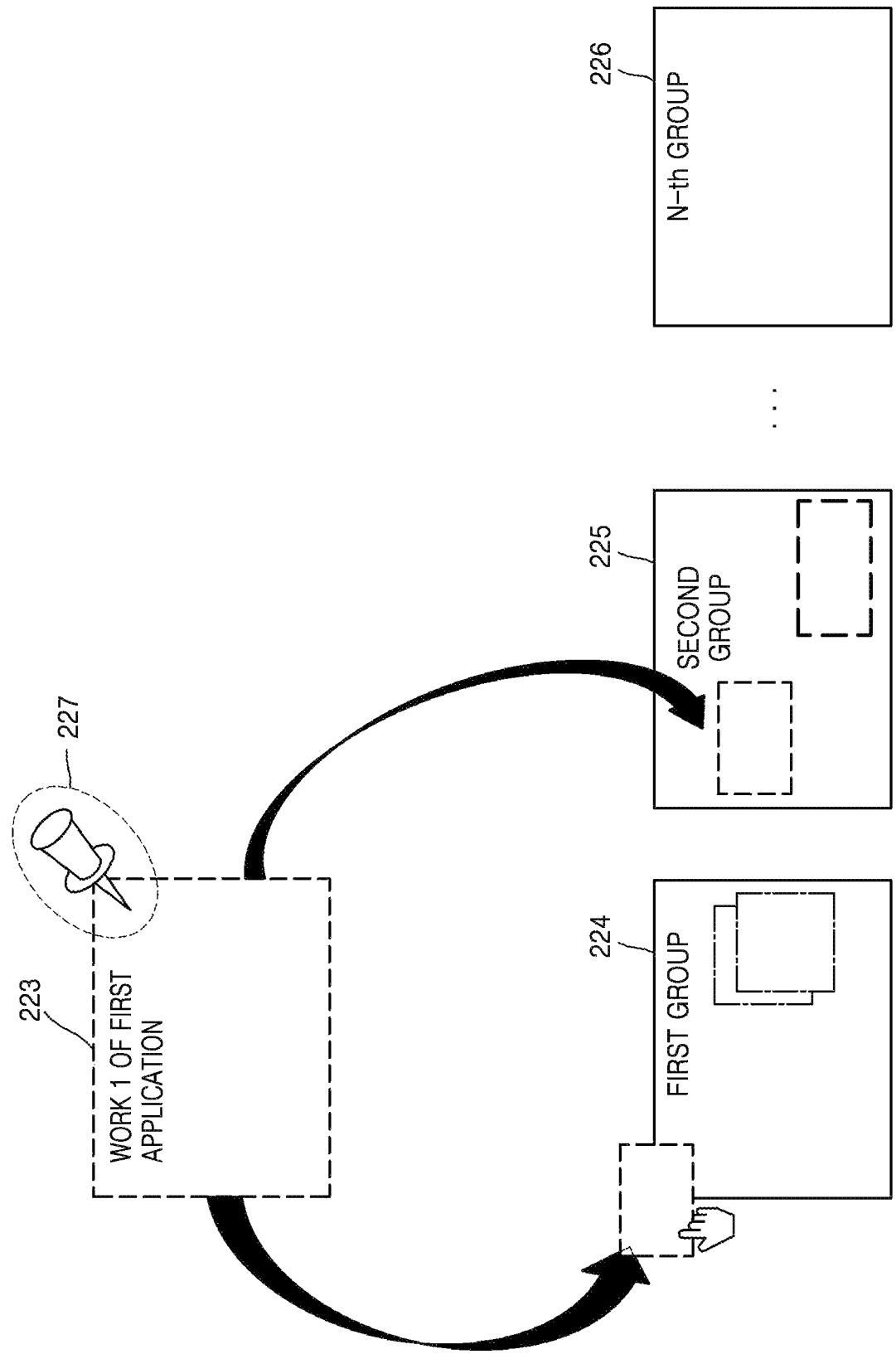
FIG. 22 shows another example of a method of determining a work group based on a user input, according to an exemplary embodiment.

FIG. 22 shows another example of a method of determining a work group based on a user input, according to an exemplary embodiment.

Referring to FIG. 22, a window 223 may be included in a plurality of work groups 224, 225 and 226.

According to an exemplary embodiment, when the window 223 displayed on the screen is added to the work group 224 based on a user input signal, the window 223 may be deactivated. However, when a work pin is used, even when the window 223 is added to the work group 224, the display status of the window 223 may be maintained. For example, when an object 227 representing a work pin is added to the window 223 currently being displayed on the screen as illustrated in FIG. 22, the window 223 may not be deactivated and may be continuously displayed on the screen of the device 1000 even when being added to the work group 224. Accordingly, the window 223 may also be added to the work group 225, based on another user input.

Figure 23:
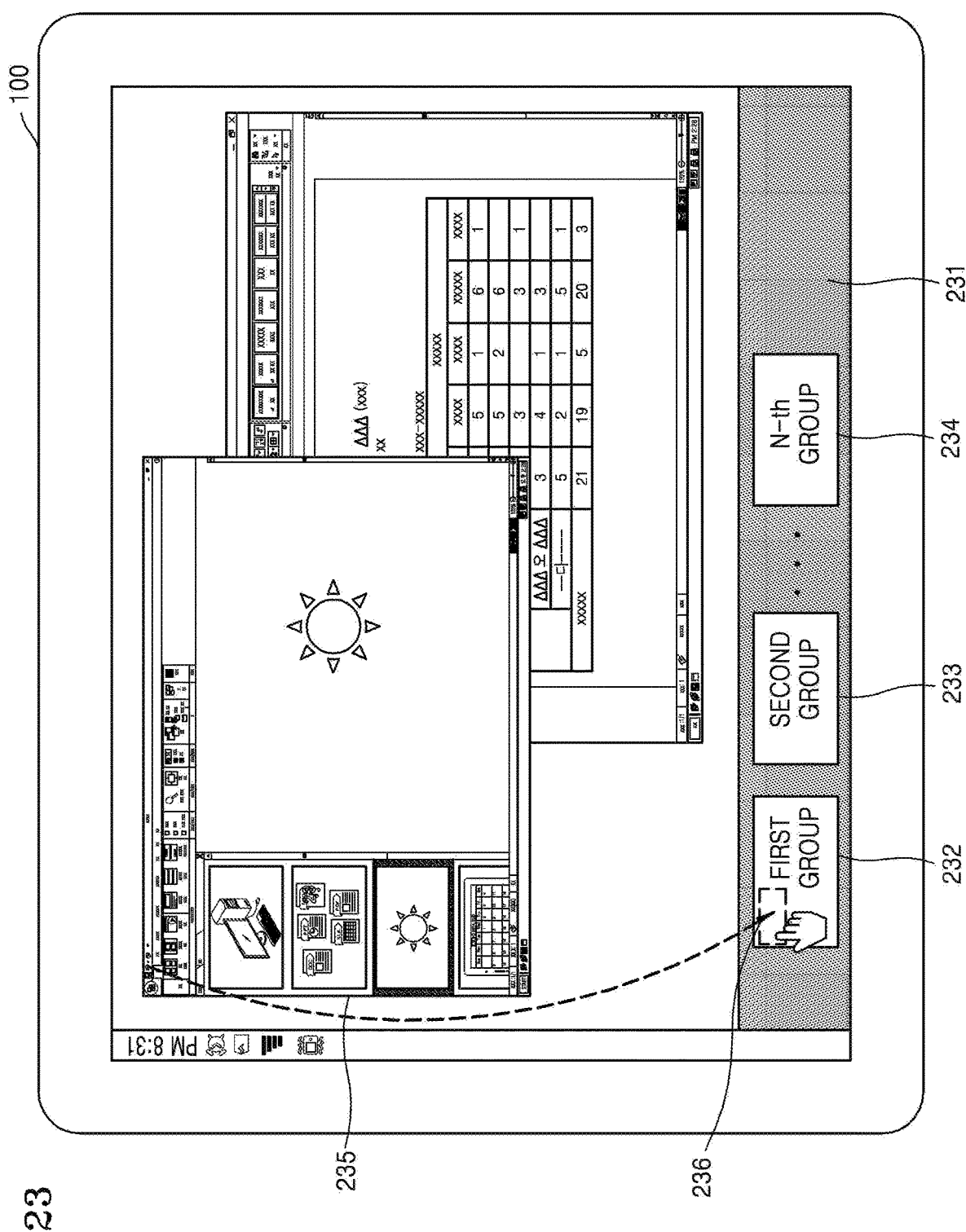
FIG. 23 shows another example of a method of determining a work group based on a user input, according to an exemplary embodiment.

FIG. 23 shows another example of a method of determining a work group based on a user input, according to an exemplary embodiment.

Referring to FIG. 23, the device 1000 may move a window 235 displayed on the screen to work group areas 232, 233, and 234 displayed on a tray window 231 to thereby determine work groups.

For example, when the device 1000 receives a user input of moving the window 235 displayed on the screen to the first work group 232 from a user, the device 1000 may add the window 235 to the first work group 232.

Although the work groups 232, 233, and 234 are positioned on a tray window of the screen of the device 1000 in FIG. 23, exemplary embodiments of the disclosure are not limited thereto. The location of the work groups 232, 233, and 234 may denote be an area on which the object 40 of FIG. 4, the object 50 of FIG. 5, the object 60 of FIG. 6, or the object 121 of FIG. 12 is displayed. When the window 235 is moved to the first work group 232 based on a user input, the window 235 may be displayed as an object 236.

In another example, when the window 235 displayed on the screen is moved to the work groups 232, 233, and 234, the device 1000 may display a popup window asking whether the window 235 is to be included in the work group 232. Accordingly, the window 235 may be added to the work group 232, based on another user input.

Figure 24A:
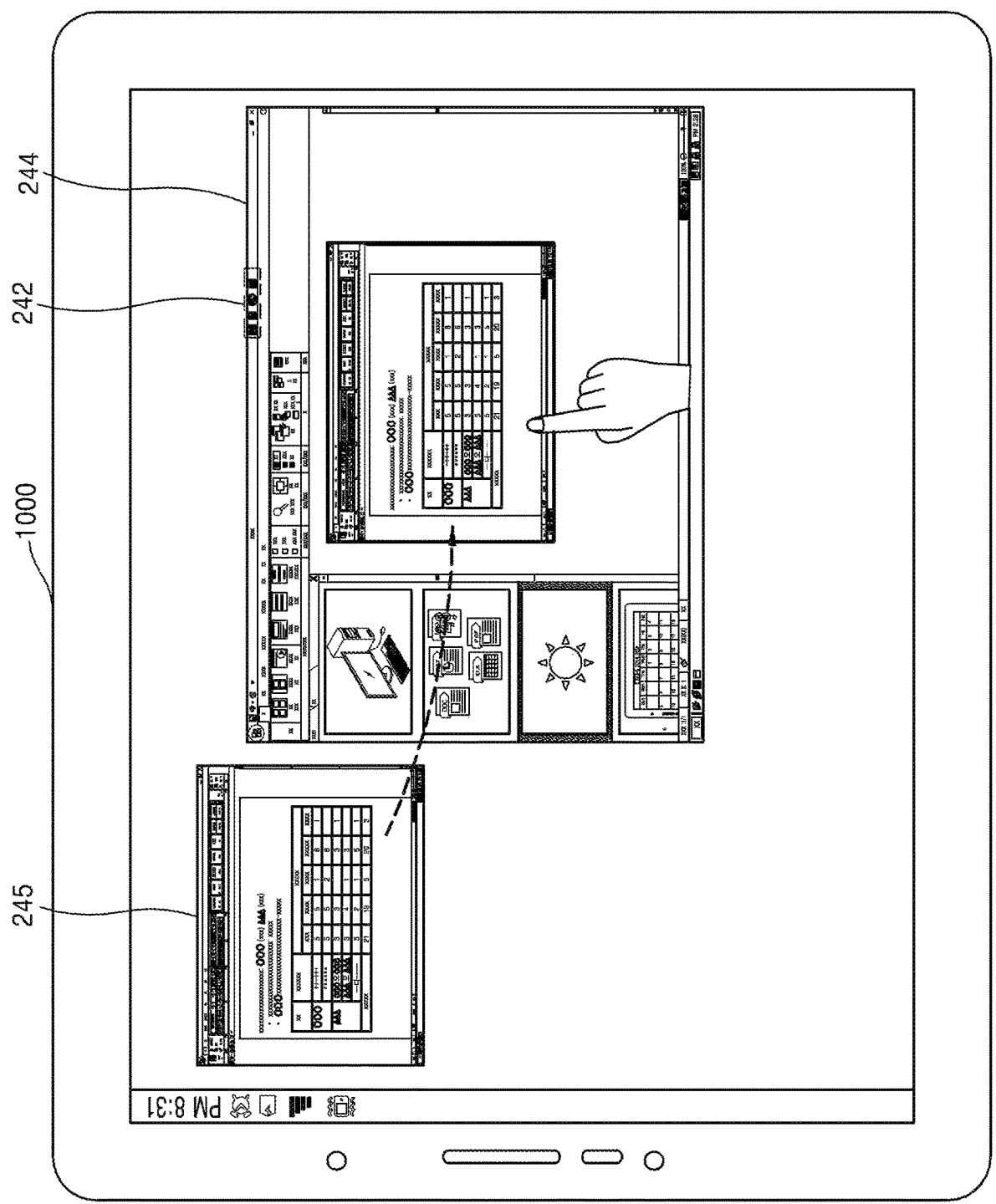
FIGS. 24A and 24B show another example of a method of determining a work group based on a user input, according to an exemplary embodiment.
Figure 24B:
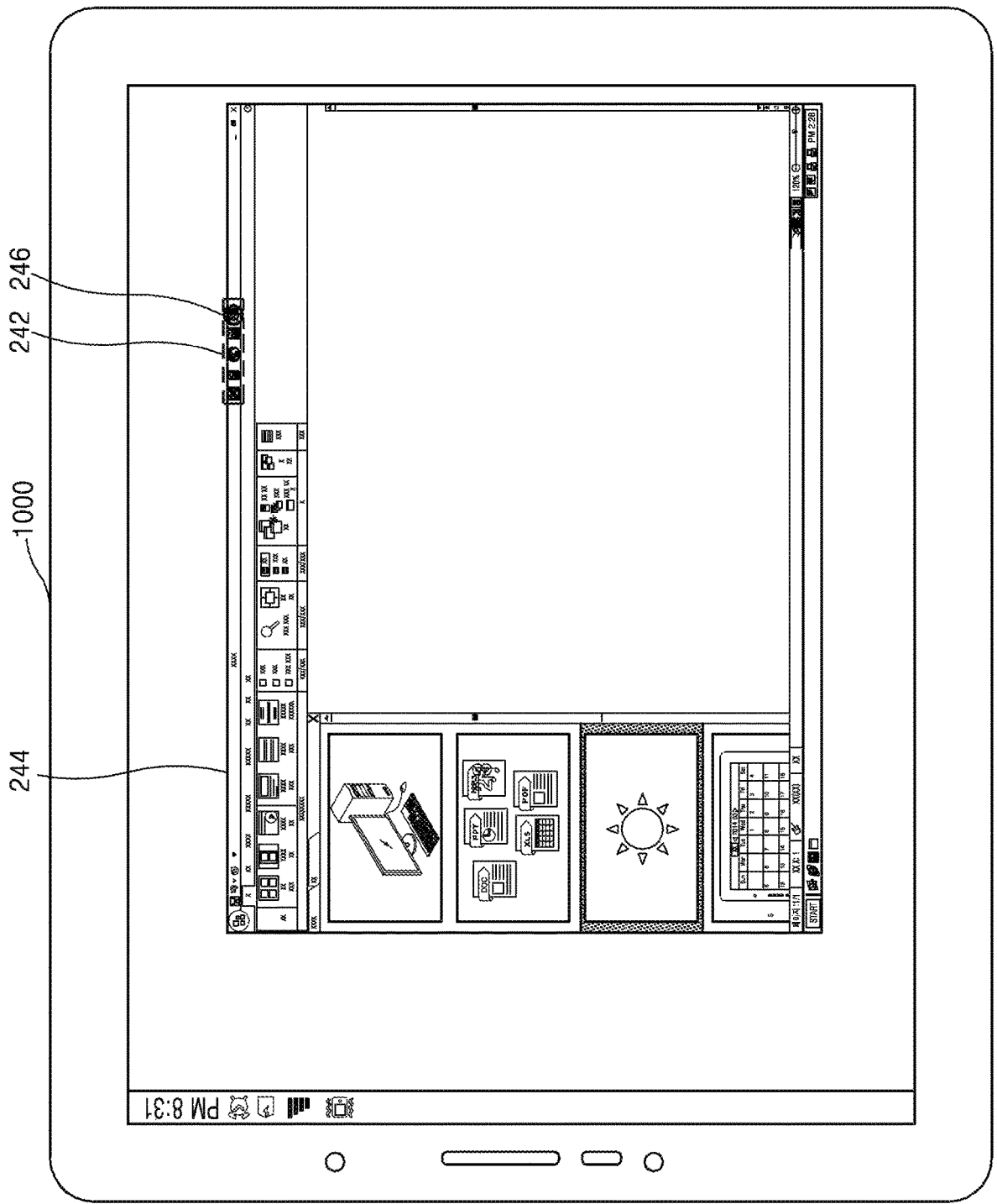

FIGS. 24A and 24B show another example of a method of determining a work group based on a user input, according to an exemplary embodiment.

Referring to FIG. 24A, the device 1000 may determine a work group 242 by moving a first window 245 displayed on the screen to an area of a second window 244.

For example, in response to an input of moving the first window 245 to the area of the second window 244, the device 1000 may add the first window 245 to the work group 242 including the second window 244.

Accordingly, referring to FIG. 24B, an object 246 representing the first window 245 may be added to the work group 242 including the second window 244.

Before the second window 244 is determined to be included in the work group 242, the device 1000 may produce a new work group and add the first window 245 and the second window 244 to the new work group.

In another example, in response to an input of moving the first window 245 to the area of the second window 244 (e.g., a drag-and-drop action), the device 1000 may display a popup window asking whether to add the first window 245 to the work group 242 including the second window 244. When an option for adding the first window 245 to the work group 242 is selected from the displayed popup window based on a user input, the object 246 representing the first window 245 may be added to the work group 242 including the second window 244, as illustrated in FIG. 24B.

Figure 25A:
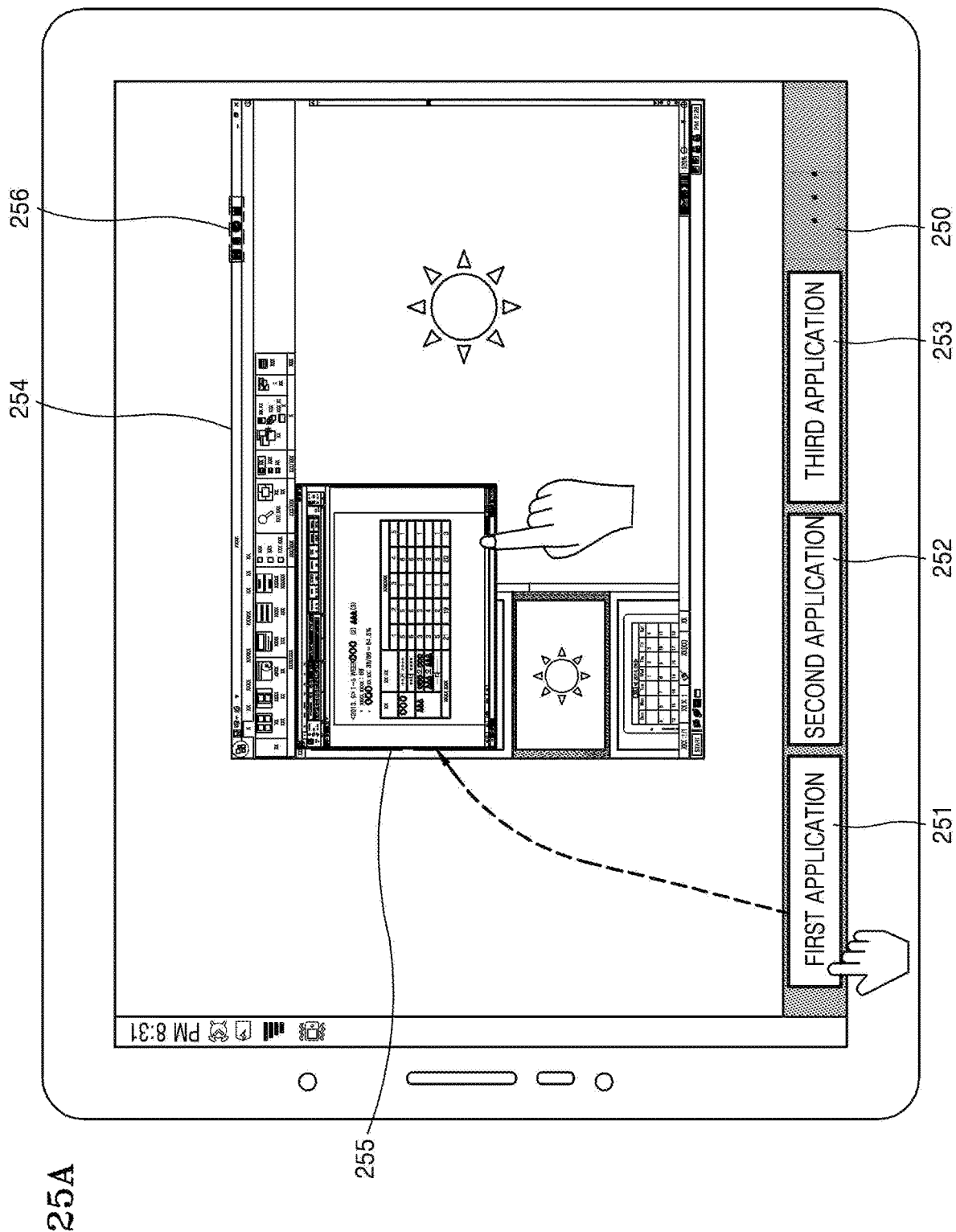
FIGS. 25A and 25B show another example of a method of determining a work group based on a user input, according to an exemplary embodiment.
Figure 25B:
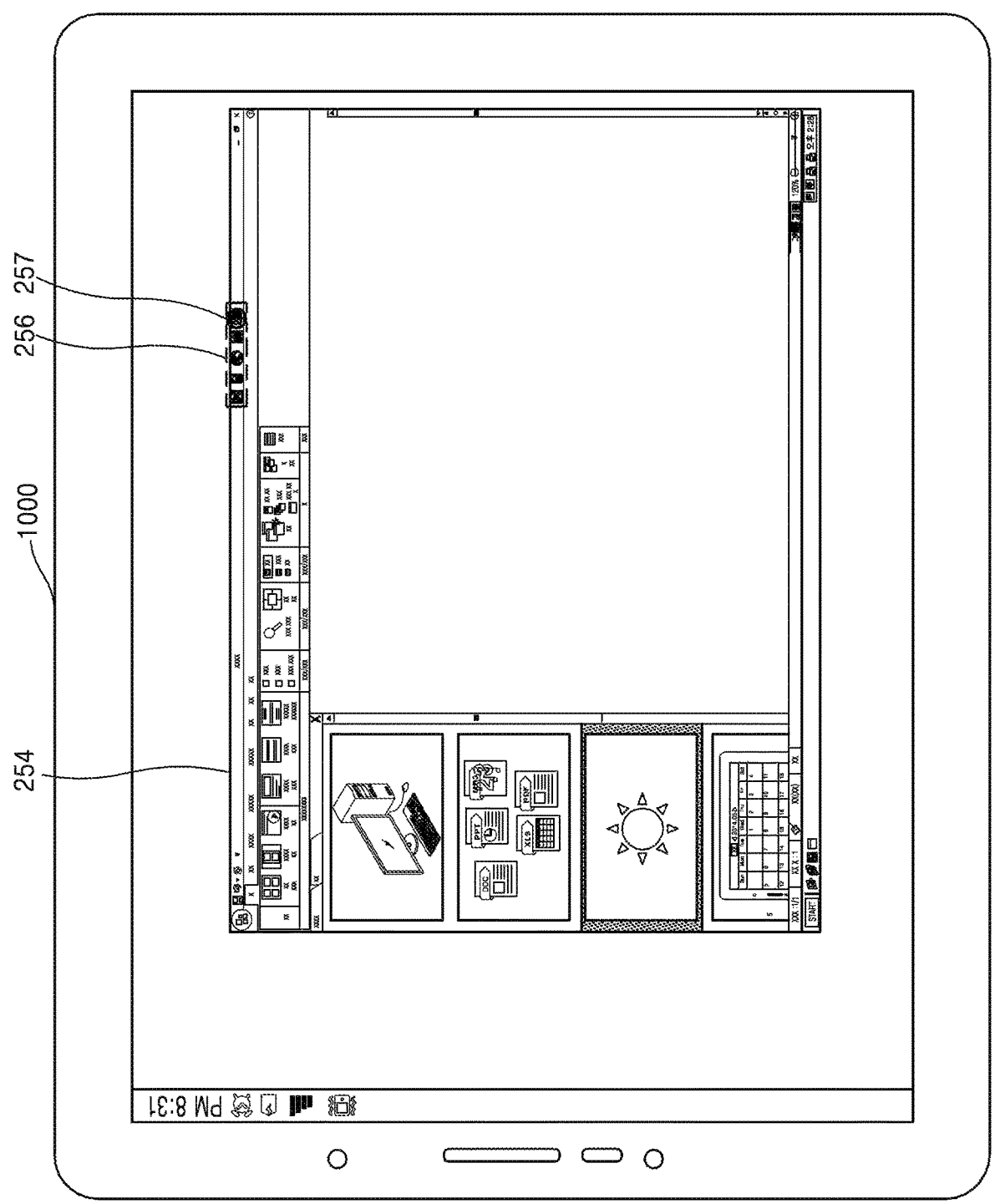

FIGS. 25A and 25B show another example of a method of determining a work group based on a user input, according to an exemplary embodiment.

Referring to FIG. 25A, the device 1000 may display objects 251, 252, and 253 representing the windows of currently-executed applications on an area 250 of the screen.

The device 1000 may determine a work group by moving the objects 251, 252, and 253, which represent the windows of the currently-executed application and are displayed on the area 250, to an area of a window 254.

The device 1000 may move the object 251 representing the windows of a first application to an area on which the window 254 of a second application is displayed, based on a user input, thereby adding a window 255 of the first application to a work group 256 to which the window 254 of the second application belongs.

For example, referring to FIG. 25B, the device 1000 may add an object 257 representing the windows of the first application to the work group 256 to which the window 254 of the second application belongs, by moving (e.g., dragging-and-dropping) the object 251 representing the windows of the first application to the area on which the window 254 of the second application is displayed. In other words, the window 255 of the first application may be added to the work group 256 to which the window 254 of the second application belongs.

Before the window 254 of the second application is included in the work group 256, the device 1000 may produce a new work group and add the window 255 of the first application to the new work group.

In another example, in response to an input of moving the window 255 of the first application to the area of the window 254 of the second application, the device 1000 may display a popup window asking whether to add the window 255 of the first application to the work group 256 including the window 254 of the second application. When an option for adding the window 255 of the first application to the work group 256 is selected from the displayed popup window based on a user input, the device 1000 may add the object 257 representing the windows of the first application to the work group 256 including the window 254 of the second application, as illustrated in FIG. 25B.

A method of determining a work group based on attribute information of windows will now be described in detail with reference to FIGS. 26-37.

Figure 26:
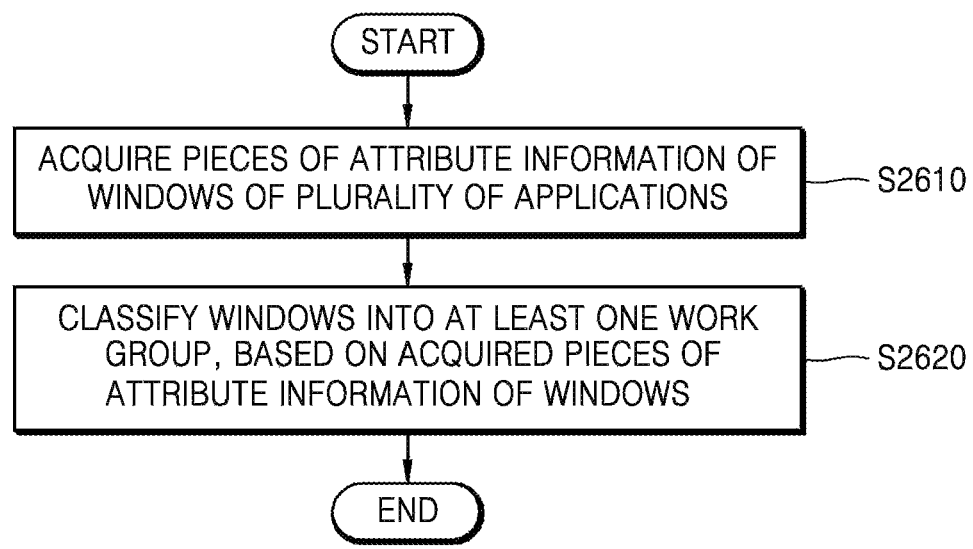
FIG. 26 is a flowchart of a method of determining a work group based on attribute information of windows, according to an exemplary embodiment.

FIG. 26 is a flowchart of a method of determining a work group based on attribute information of windows, according to an exemplary embodiment.

Referring to FIG. 26, in operation S2610, the device 1000 may acquire pieces of attribute information of the windows of a plurality of applications. The pieces of attribute information of the windows may include file names, writing times, writing devices, or storage locations of files associated with the windows. Alternatively, the pieces of attribute information of the windows may include a window access time or the number of times a window switch is performed. The pieces of attribute information may include the windows, applications, or jobs from which the window has received information (e.g., copied text, copied link, etc.) or to which the window has sent information (e.g., copied text, copied link, etc.).

In operation S2620, the device 1000 may classify the windows into at least one work group, based on the acquired pieces of attribute information of the windows. For example, in a mode of automatically determining a work group, the device 1000 may acquire the attributes of a plurality of currently-executed windows and classify the windows into a predetermined number of groups based on the acquired attributes of the windows. The maximum number of groups into which the windows are classified may be limited.

Figure 27:
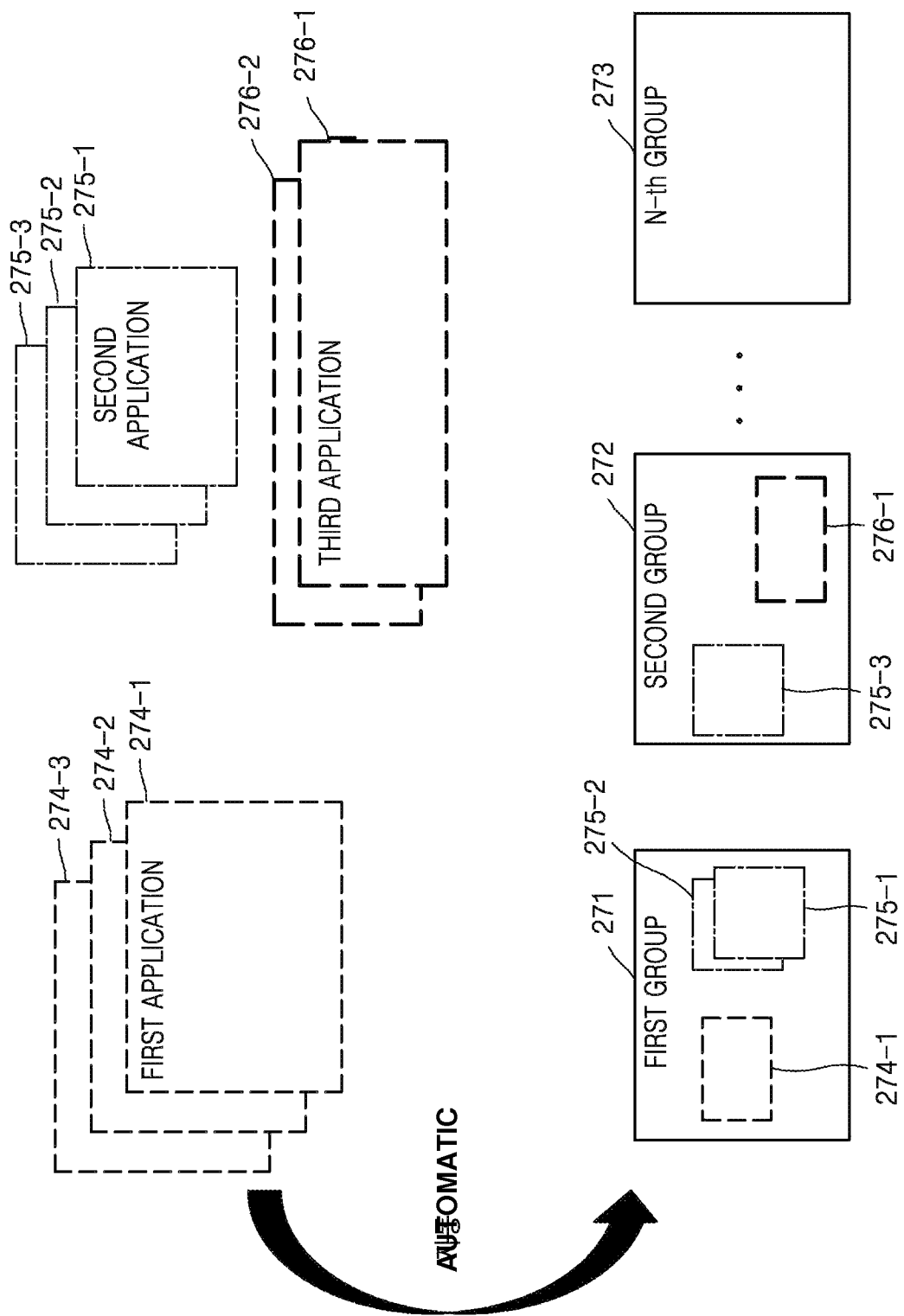
FIG. 27 shows a method of determining a work group based on attribute information of windows, according to an exemplary embodiment.

FIG. 27 shows a method of determining a work group based on attribute information of windows, according to an exemplary embodiment.

FIG. 27 illustrates a case in which three windows 274-1, 274-2, and 274-3 are being executed via a first application, three windows 275-1, 275-2, and 275-3 are being executed via a second application, and two windows 276-1 and 276-2 are being executed via a third application.

According to an exemplary embodiment, the device 1000 may acquire pieces of attribute information of currently-executed windows and arbitrarily produce first through N-th groups 271 through 273 based on the pieces of attribute information. The device 1000 may add the first window 274-1 of the first application and the first window 275-1 and the second window 275-2 of the second application to the first group 271 produced based on the acquired pieces of attribute information. The device 1000 may add the third window 275-3 of the second application and the first window 276-1 of the third application to the second group 272.

Accordingly, the device 1000 may classify, into a specific work group, windows which are determined to be highly relevant to one another based on the pieces of attribute information of the windows, thereby increasing the convenience of users.

An exemplary embodiment of determining a work group based on attribute information of windows will now be described in detail with reference to FIGS. 28-35.

Figure 28:
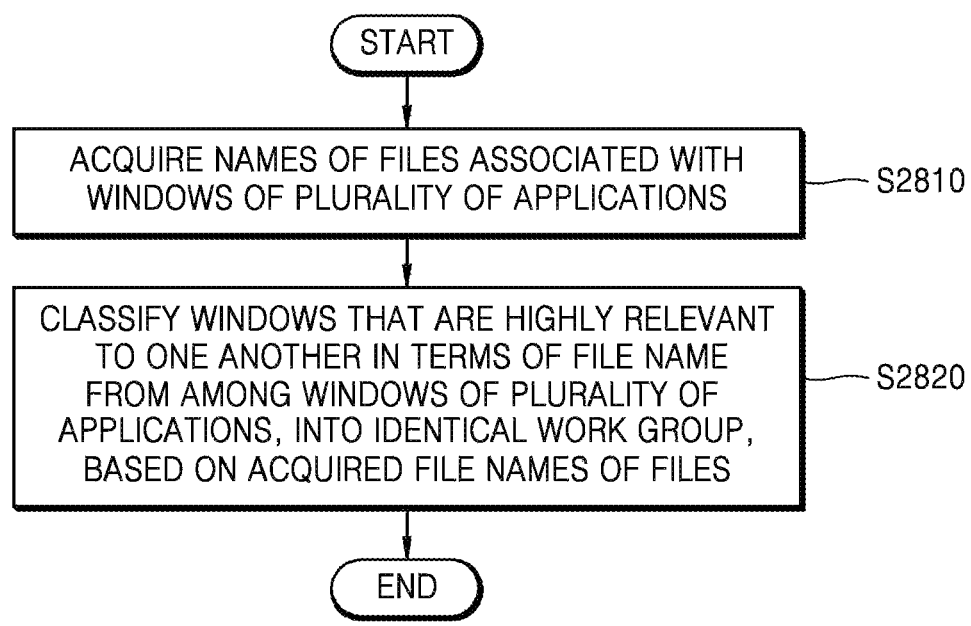
FIG. 28 is a flowchart of a method of determining a work group based on names of files associated with windows, according to an exemplary embodiment.

FIG. 28 is a flowchart of a method of determining a work group based on the names of files associated with windows, according to an exemplary embodiment.

Referring to FIG. 28, in operation S2810, the device 1000 may acquire the names of files associated with the windows of a plurality of applications. For example, the device 1000 may write and edit document files with a title including a specific word, such as "2014 business report", via a plurality of application work windows, in order to perform work A. The document files with a title including a specific word may be written and edited via windows of different applications according to use purposes thereof.

In operation S2820, the device 1000 may classify windows that are highly relevant to one another in terms of file name from among the windows of the plurality of applications, into an identical work group, based on the acquired file names of the files.

For example, the device 1000 may determine windows corresponding to files having names including the word "2014 business report", regardless of the types of applications, from among currently-executed windows to be mutually relevant to one another, and thus classify the windows corresponding to the mutually relevant files into a certain group.

Figure 29:
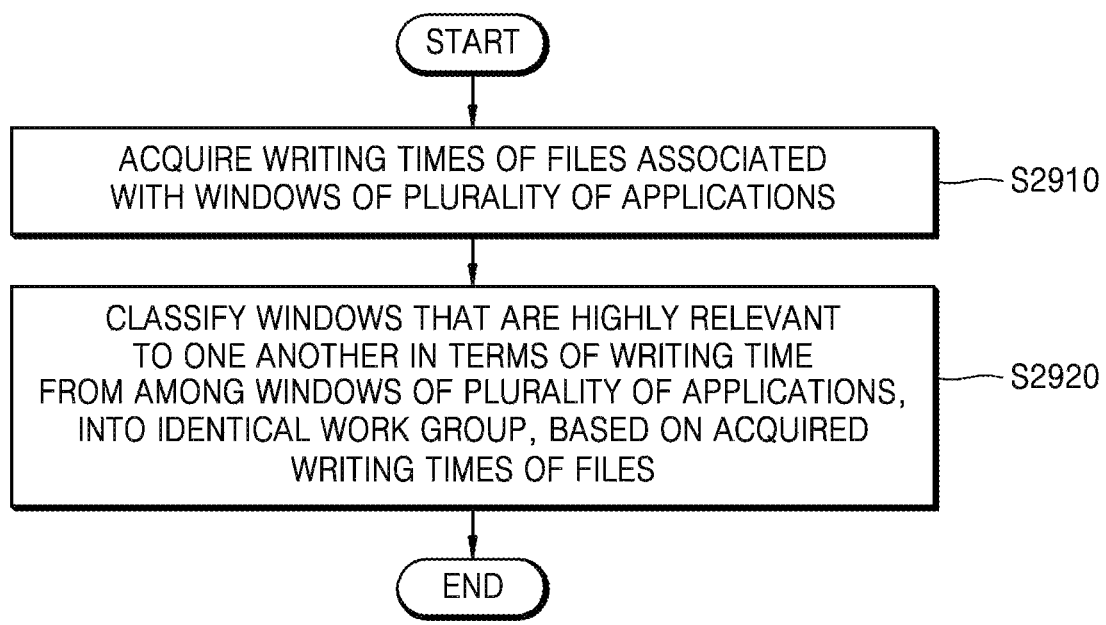
FIG. 29 is a flowchart of a method of determining a work group based on writing times of files associated with windows, according to an exemplary embodiment.

FIG. 29 is a flowchart of a method of determining a work group based on the writing times of files associated with windows, according to an exemplary embodiment.

Referring to FIG. 29, in operation S2910, the device 1000 may acquire writing times of files associated with the windows of a plurality of applications. For example, a writing time of a currently-written file may be acquired from a window of a document writing application.

In operation S2920, the device 1000 may classify windows that are highly relevant to one another in terms of writing time from among the windows of the plurality of applications, into an identical work group, based on the acquired writing times of the files.

For example, the device 1000 may classify windows associated with files that were written within a predetermined time range, regardless of the types of applications, from among currently executed windows, into a certain group.

Figure 30:
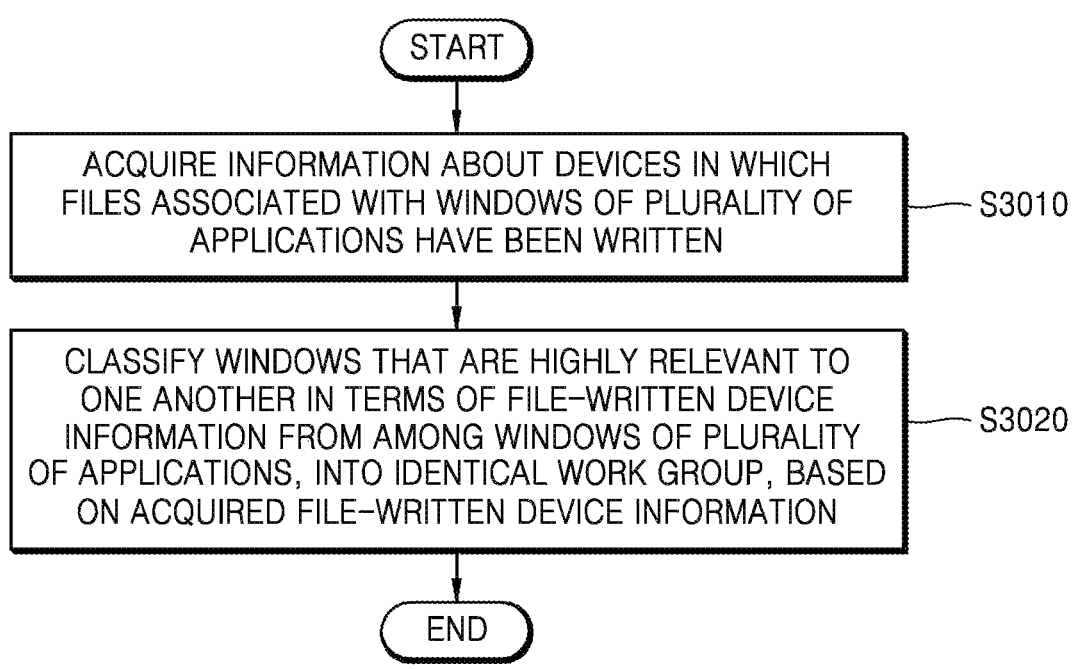
FIG. 30 is a flowchart of a method of determining a work group based on devices in which files associated with windows are written, according to an exemplary embodiment.

FIG. 30 is a flowchart of a method of determining a work group based on devices in which files associated with windows are written, according to an exemplary embodiment.

Referring to FIG. 30, in operation S3010, the device 1000 may acquire information about devices in which files associated with the windows of a plurality of applications have been written. For example, information about a device in which a file has been initially currently written may be acquired from a window of a document writing application.

In operation S3020, the device 1000 may classify windows that are highly relevant to one another in terms of file-written device information from among the windows of the plurality of applications, into an identical work group, based on the acquired file-written device information.

For example, the device 1000 may classify windows associated with files that have been written by an identical device regardless of the types of applications from among currently-executed windows, into a certain group.

Figure 31:
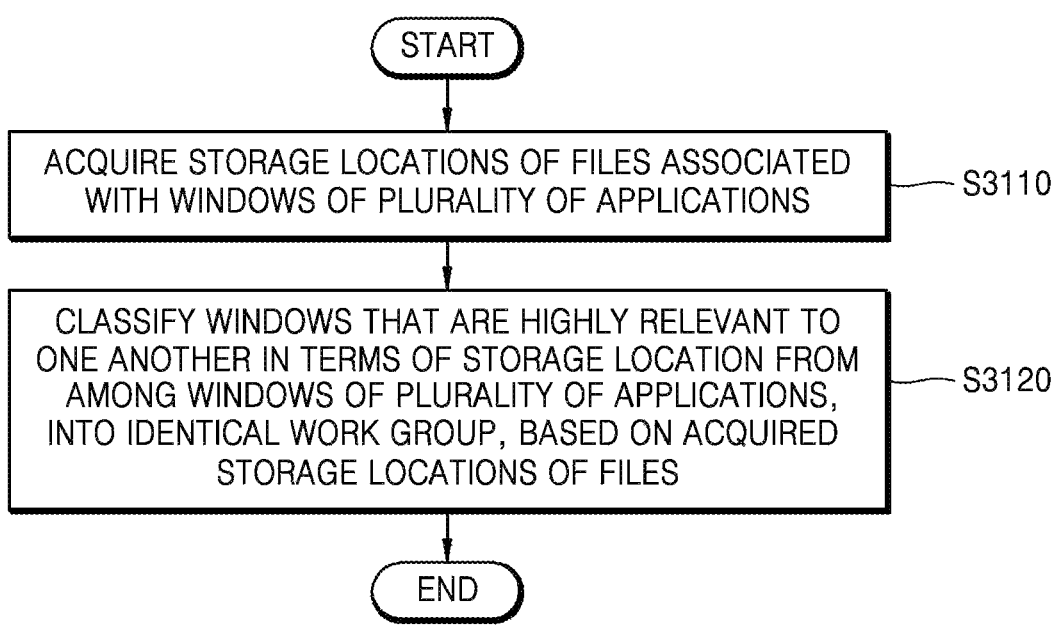
FIG. 31 is a flowchart of a method of determining a work group based on storage locations of files associated with windows, according to an exemplary embodiment.

FIG. 31 is a flowchart of a method of determining a work group based on storage locations of files associated with windows, according to an exemplary embodiment.

Referring to FIG. 31, in operation S3110, the device 1000 may acquire storage locations of files associated with the windows of a plurality of applications. The storage locations may denote software storage locations such as folders, physical storage locations such as a universal serial bus (USB), or geometrical locations where the device 1000 writes or corrects files.

A folder used herein is a box which stores a program or a file on a GUI, and thus may denote an object displayed on the screen as an icon having the same shape as an actual file folder. For example, a folder may be used to schematically manage several programs or files stored in a memory and thus may perform the function of a directory. When a certain folder is selected, the selected folder is opened, and a file list contained in the folder may be displayed.

For example, the device 1000 may acquire information about a folder that stores a currently-written file, from a window of a document writing application.

In another example, the device 1000 may acquire information about a geometrical location where an image file being displayed has been written or corrected (e.g., a location on a map of the device 1000 when a file is written or a relative location, such as a house, an office, or a library, when a file is written), on a window of an image-display application.

In operation S3120, the device 1000 may classify windows that are highly relevant to one another in terms of storage location from among the windows of the plurality of applications, into an identical work group, based on the acquired storage locations of the files.

For example, the device 1000 may classify windows that have executed files stored in an identical folder from among currently-executed windows, into a certain group.

In another example, the device 1000 may classify windows that have executed files stored in a USB drive from among currently-executed windows, into a certain group.

In another example, the device 1000 may classify windows corresponding to files written or corrected at close geometrical locations from among files associated with currently-executed windows, into a certain group.

Figure 32A:
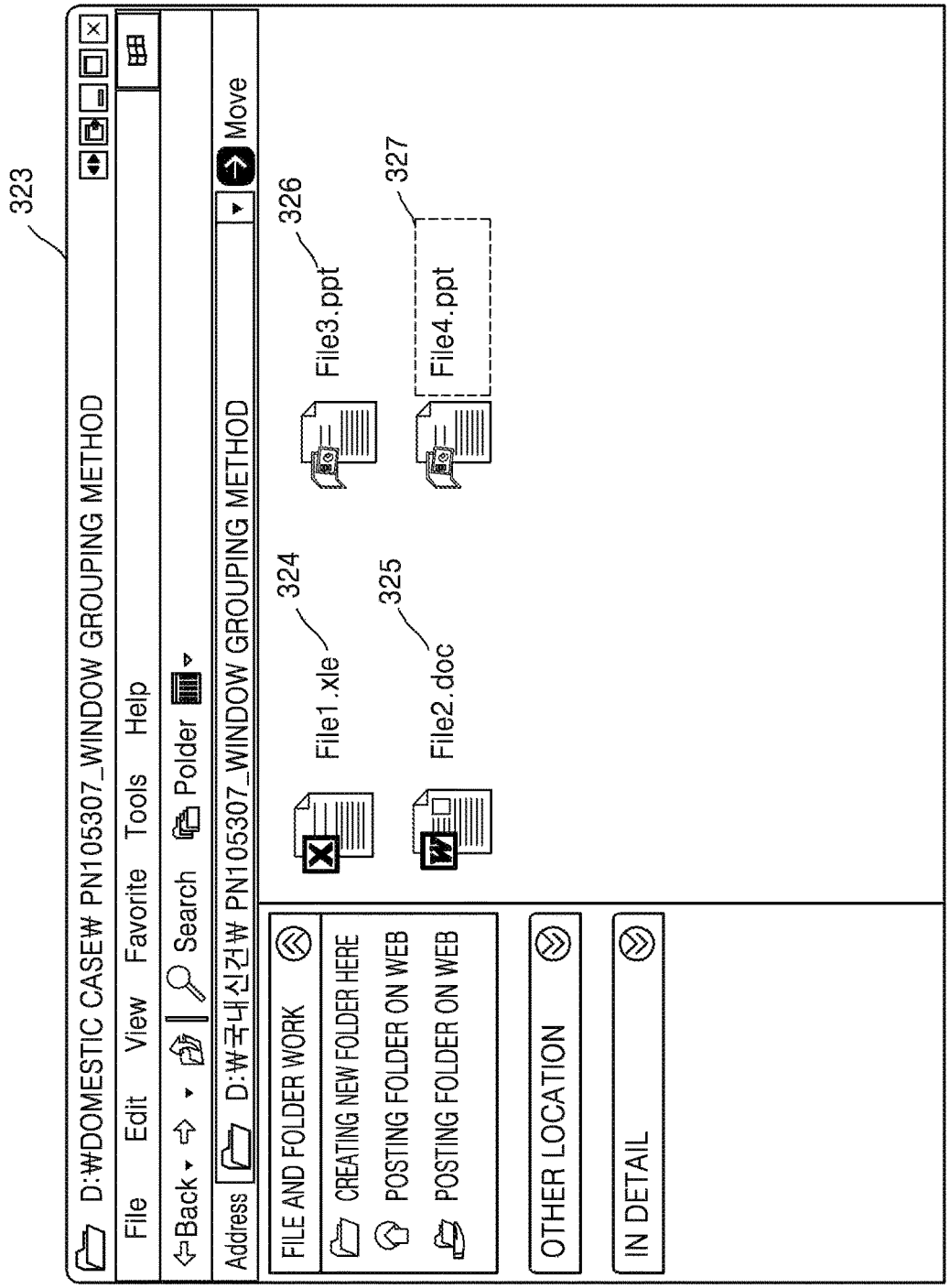
FIG. 32A shows an example of a method of determining a work group based on storage locations of files associated with windows, according to an exemplary embodiment.

FIG. 32A shows an example of a method of determining a work group based on storage locations of files associated with windows, according to an exemplary embodiment.

As shown in FIG. 32A, a single folder 323 may include a plurality of files 324, 325, 326, and 327, each of which may be executed via at least one application. For example, the file 324 may be executed via a spreadsheet application, the file 325 may be executed via a word processor application, and the files 326 and 327 may be executed via a presentation application. Since a folder is generally produced in units of works, files included in an identical folder are highly likely to be relevant to one another.

The device 1000 may determine windows respectively corresponding to the files 324, 325, 326, and 327 included in the single folder 323, as one work group.

For example, when the window of a work in which the file 327 included in the folder 323 is executed is included in a certain work group, the device 1000 may add the windows corresponding to the files 324, 325, and 326 included in the folder 323 to the work group.

In another example, when the file 327 included in the folder 323 is executed and a window corresponding to the executed file 327 is displayed, the device 1000 may add the other files 324, 325, and 326 included in the folder 323 and not yet executed to a work group. In other words, a work group may be determined even before the windows associated with the other files 324, 325, and 326 included in the folder 323 are executed.

Figure 32B:
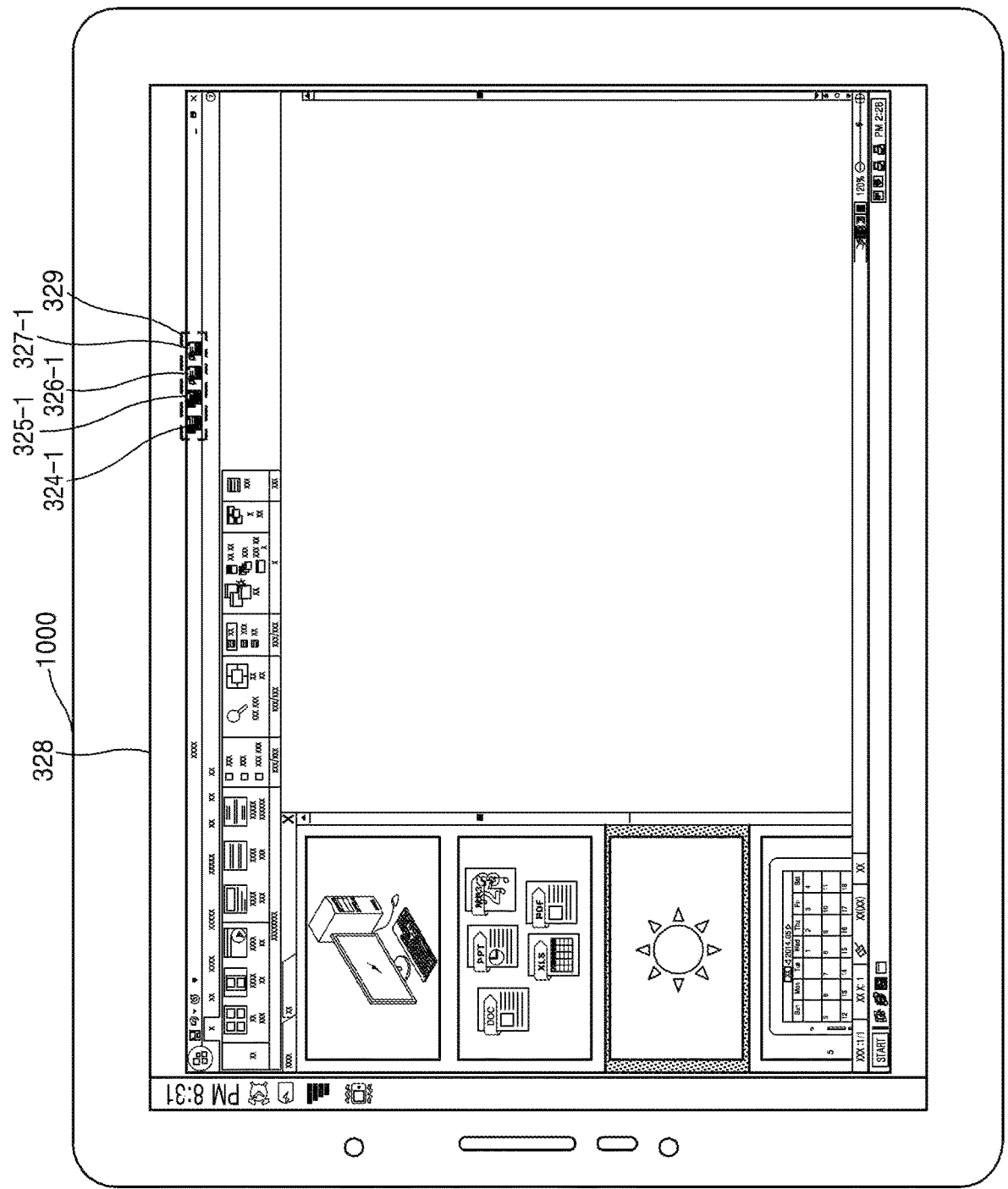
FIG. 32B illustrates an example in which objects representing windows corresponding to files included in a single folder are determined as a work group.

FIG. 32B illustrates an example in which objects representing windows corresponding to the files 324, 325, 326, and 327 included in the single folder 323 are determined as a work group 329.

According to an exemplary embodiment, the device 1000 may simultaneously display objects 324-1, 325-1, 326-1, and 327-1 representing the files 324, 325, 326 and 327 included in the folder 323, within a window 328 displayed since the file 327 included in the folder 323 is executed. In this case, the objects 324-1, 325-1, and 326-1 representing the files 324, 325, and 326 included in the folder 323 may represent not-yet-executed works.

Figure 33:
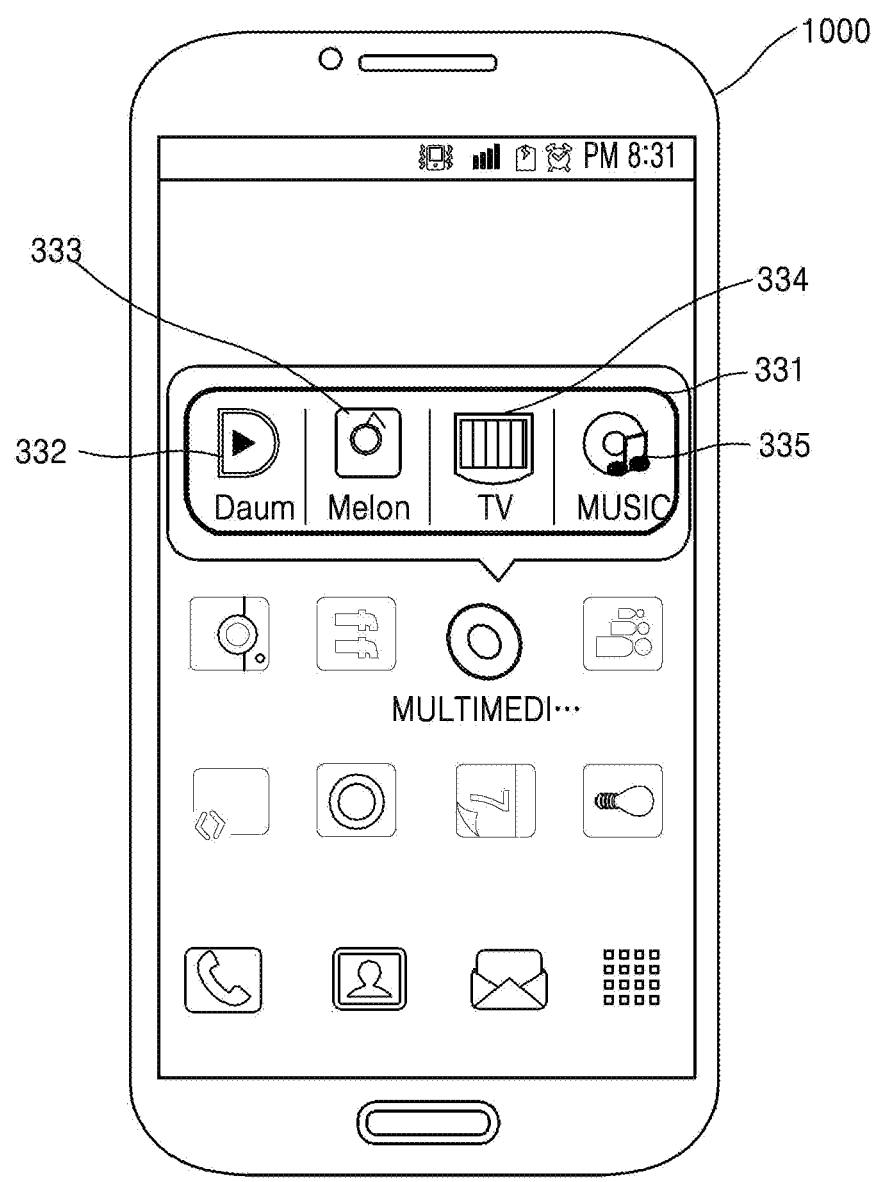
FIG. 33 shows another example of a method of determining a work group based on storage locations of files associated with windows, according to an exemplary embodiment.

In this case, when the objects 324-1, 325-1, and 326-1 are selected, files corresponding to the selected objects 324-1, 325-1, and 326-1 may be executed, and windows corresponding to the executed files may be displayed on the device 1000. FIG. 33 shows another example of a method of determining a work group based on storage locations of files associated with windows, according to an exemplary embodiment.

Referring to FIG. 33, when the device 1000 is a mobile terminal, the method described above with reference to FIGS. 32A and 32B may also be applied.

When applications 332, 333, 334, and 335 provided in the device 1000 are added to a folder 331 based on an input of a user, the device 1000 may determine the applications 332, 333, 334, and 335 included in the folder 331 as a work group.

For example, when the application 332 from among the applications 332, 333, 334, and 335 included in the folder 331 is executed and a window corresponding to the application 332 is displayed, the device 1000 may display on the displayed window an object for displaying the other applications 333, 334, and 335 included in the folder 331. In another example, the device 1000 may execute all of the applications 332, 333, 334, and 335 included in the folder 331 at one time and display a window corresponding to each application on the screen thereof.

In another example, when the application 332 from among the applications 332, 333, 334, and 335 included in the folder 331 is executed, the device 1000 may upload all the other applications 333, 334, and 335 to memory in advance, and thus the time taken to execute the applications 333, 334, and 335 within the folder 331 may be reduced. The memory may denote a high-speed storage unit which temporarily stores some data of a currently-executed application in order to reduce a transmission speed difference or a transmission time difference corresponding to when a controller and a storage unit transmit and receive data to or from each other. For example, the memory may be random access memory (RAM) or cache.

Figure 34:
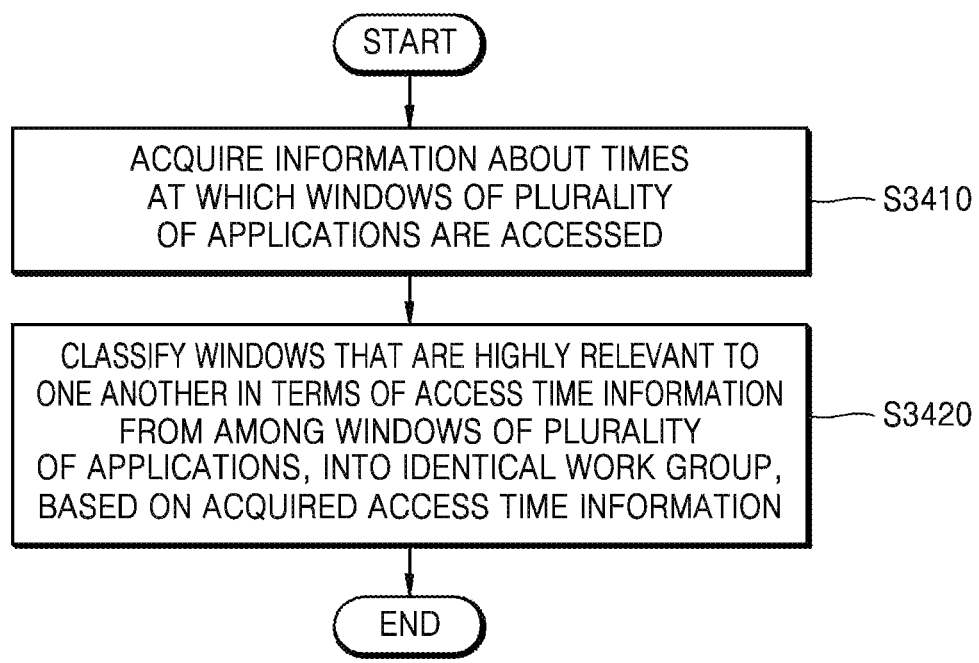
FIG. 34 is a flowchart of a method of determining a work group based on times at which windows are accessed, according to an exemplary embodiment.

FIG. 34 is a flowchart of a method of determining a work group based on times at which windows are accessed, according to an exemplary embodiment.

Referring to FIG. 34, in operation S3410, the device 1000 may acquire information about times at which the windows of a plurality of applications are accessed. For example, the access time information may include information about the time when a currently-executed window is activated, and information about the time when the currently-executed window is deactivated.

In operation S3420, the device 1000 may classify windows that are highly relevant to one another in terms of access time information from among the windows of the plurality of applications, into an identical work group, based on the acquired access time information. This is because windows for performing relevant works are highly likely to be executed or activated within similar time zones.

For example, the device 1000 may classify windows that have been accessed within a certain time period (e.g., 10 minutes) from among the windows of a plurality of currently-executed applications, into an identical work group.

Figure 35:
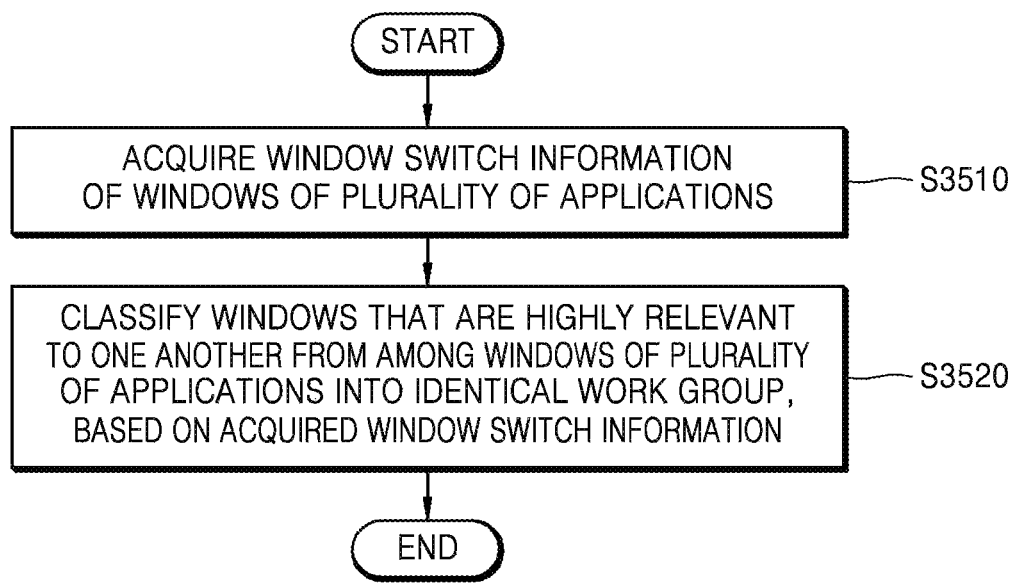
FIG. 35 is a flowchart of a method of determining a work group based on window switch information of windows, according to an exemplary embodiment.

FIG. 35 is a flowchart of a method of determining a work group based on window switch information of windows, according to an exemplary embodiment.

Referring to FIG. 35, in operation S3510, the device 1000 may acquire window switch information of the windows of a plurality of applications. For example, the window switch information may include the number of times a window is used, a period of time during which a window is used, and clipboard usage information.

In operation S3520, the device 1000 may classify windows that are highly relevant to one another from among the windows of the plurality of applications into an identical work group, based on the acquired window switch information. For example, the device 1000 may classify windows that are frequently switched into an identical work group. In another example, the device 1000 may classify windows on which data switches using clipboards are frequently performed, into an identical work group.

In another example, the device 1000 may determine the order in which objects representing the windows of a plurality of applications already included in a work group are displayed, based on the acquired window switch information. For example, when the device 1000 displays objects representing the windows included in a work group, the device 1000 may display the objects representing the windows, in a descending order of the number of times a window is switched. Accordingly, a user may conveniently perform a switch between windows that are frequently used.

Figure 36:
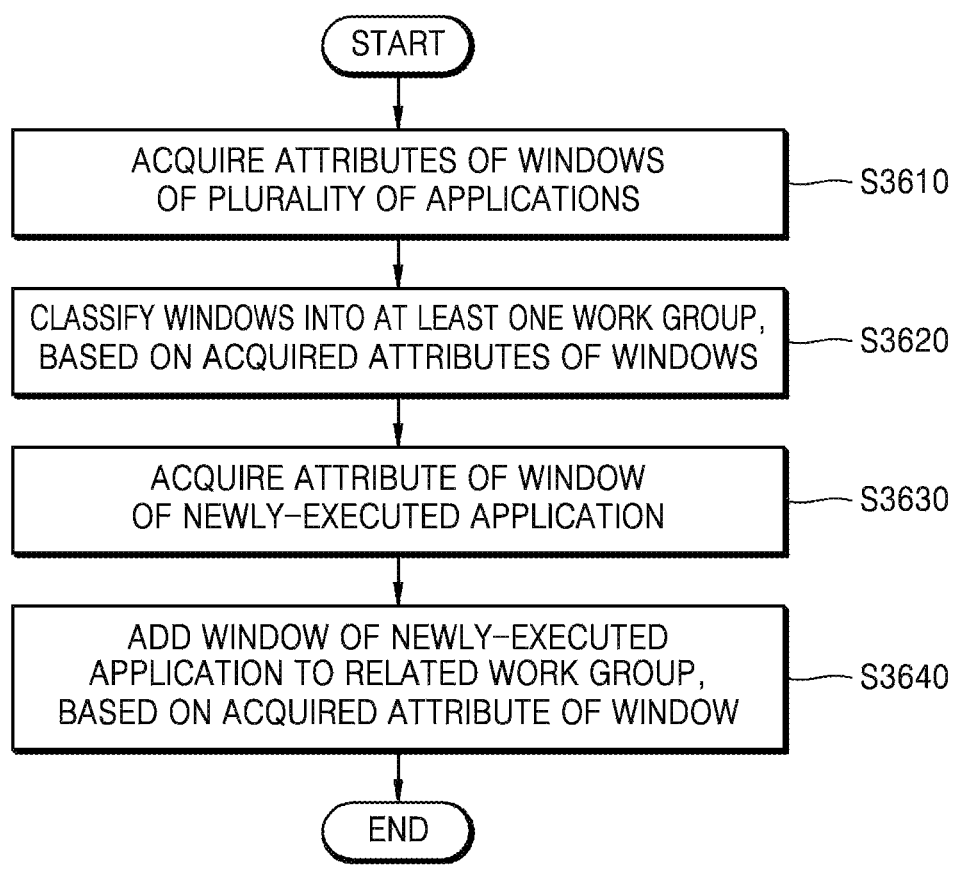
FIG. 36 is a flowchart of a method of adding, to a work group, a window of an application that is newly executed, according to an exemplary embodiment.

FIG. 36 is a flowchart of a method of adding, to a work group, a window of an application that is newly executed, according to an exemplary embodiment.

In operation S3610, the device 1000 may acquire attributes of the windows of a plurality of applications. The attributes of the windows may include file names, writing times, file-written devices, or storage locations of files associated with the windows. Alternatively, the attributes of the windows may include a window access time or the number of times a window switch is performed.

In operation S3620, the device 1000 may classify the windows into at least one work group, based on the acquired attributes of the windows. The device 1000 may also acquire an attribute serving as a basis for classifying the windows, in units of work groups.

In operation S3630, the device 1000 may acquire an attribute of a window of a newly-executed application.

In operation S3640, the device 1000 may add the window of the newly-executed application to a related work group, based on the acquired attribute of the window. For example, the device 1000 may classify windows related with at least one file stored in an identical folder into a work group related with the folder. Thereafter, when a window related with the file within the folder is newly executed, the device 1000 may add the newly-executed window to the work group related with the folder.

Figure 37:
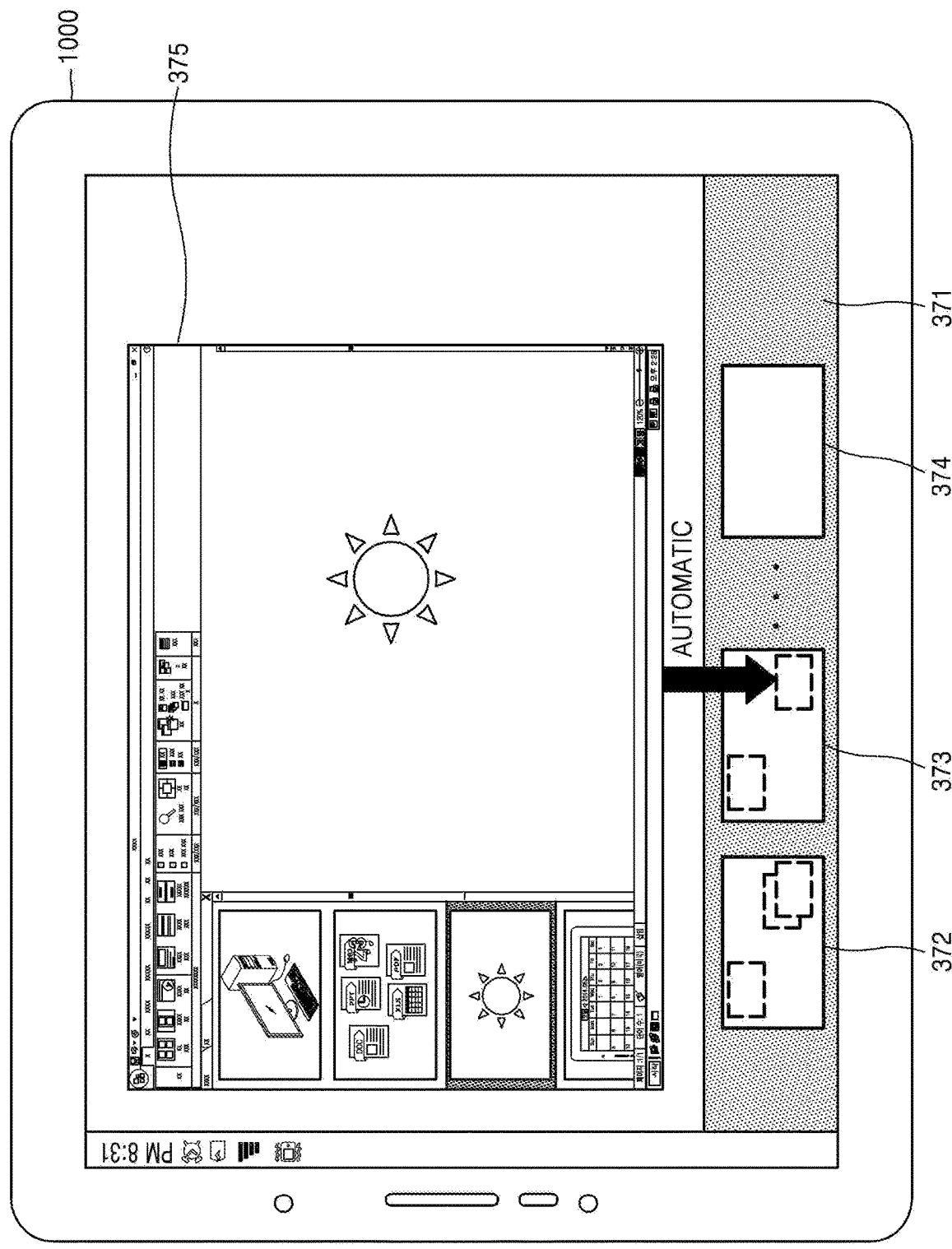
FIG. 37 is a flowchart of a method of adding, to a work group, a window of an application that is newly executed, according to an exemplary embodiment.

FIG. 37 shows an example of a flowchart of a method of adding, to a work group, a window of an application that is newly executed, according to an exemplary embodiment.

Referring to FIG. 37, the device 1000 may display objects 372, 373, and 374 representing work groups, on an area 371 of the screen thereof. The objects 372, 373, and 374 representing working groups may include objects representing applications included in the work groups.

The device 1000 may acquire an attribute serving as a basis for classifying windows, in units of work groups. When a window 375 of a new application is executed, the device 1000 may acquire an attribute of the executed window. Accordingly, when the acquired attribute of the window 375 of the new application is related with at least one of the acquired attributes of the work groups, the device 1000 may add the window of the newly-executed application to the work group 373 related with the newly-executed application.

Figure 38:
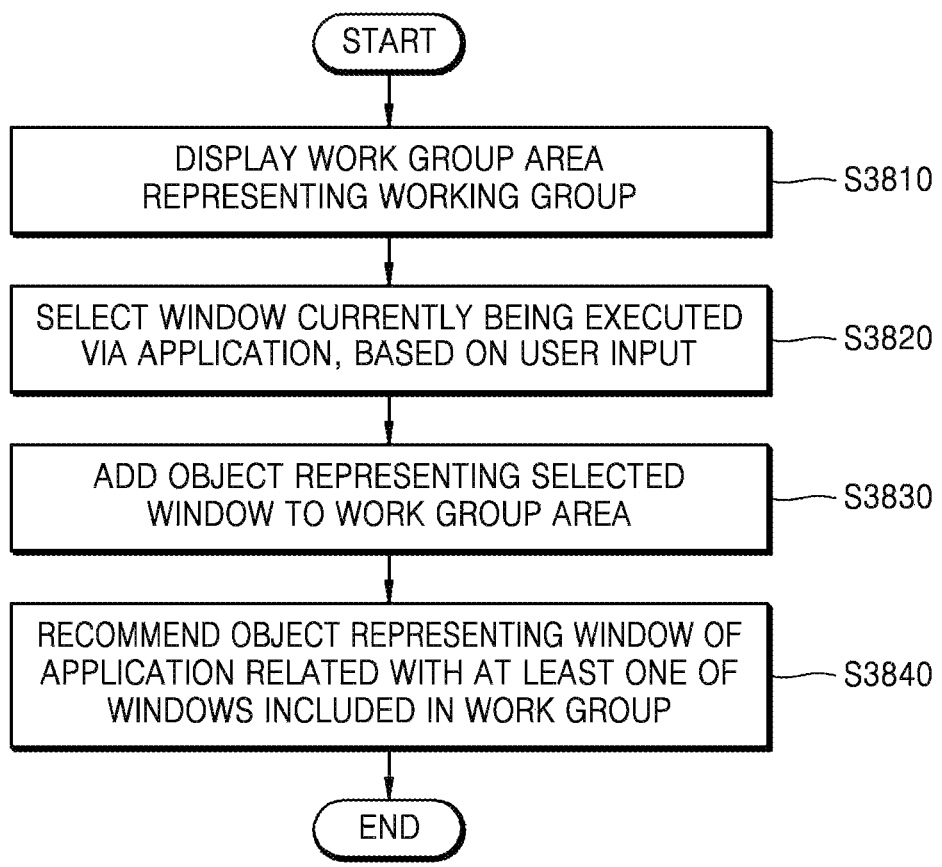
FIG. 38 is a flowchart of a method of adding, to a work group, a window of an application that is not included in the work group, according to an exemplary embodiment.

FIG. 38 is a flowchart of a method of adding, to a work group, a window of an application that is not included in the work group, according to an exemplary embodiment.

Operations S3810 through S3830 of FIG. 38 are similar to operations S1910 through S1930 of FIG. 19, and thus a detailed description thereof will be omitted.

In operation S3810, the device 1000 may display a work group area representing a working group.

In operation S3820, the device 1000 may select a window based on a user input.

In operation S3830, the device 1000 may add an object representing the selected window to the work group area.

In operation S3940, the device 1000 may recommend an object representing a window of an application related with at least one of the windows included in the work group.

For example, when at least one work group is determined based on a user input (manually), the device 1000 may acquire attribute information of at least one of the windows included in the work group. The device 1000 may also acquire attribute information of windows that are not included in the work group.

The device 1000 may recommend an object representing a window of an application related with the work group from among the windows of another application, based on the attribute information of the windows.

Figure 39:
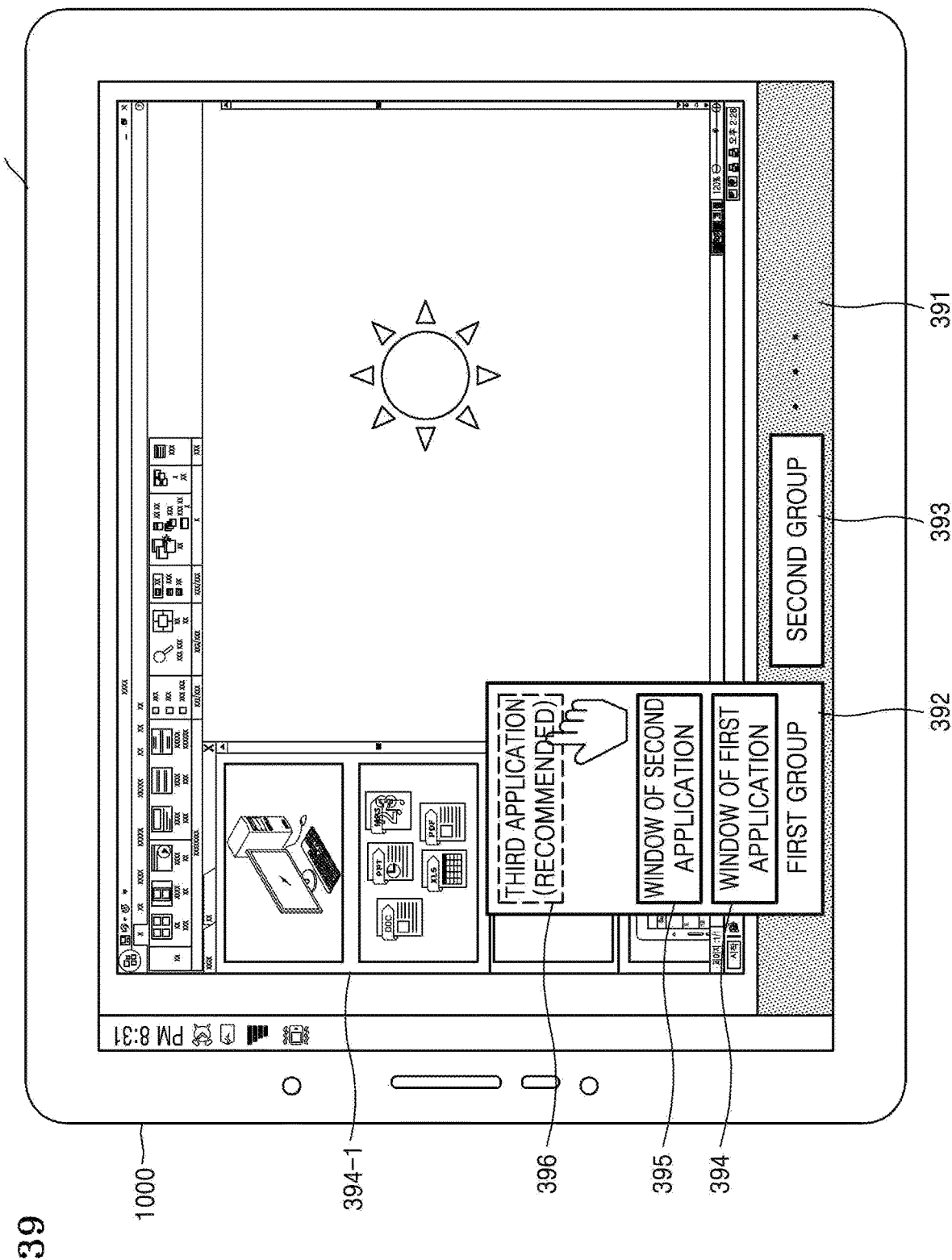
FIG. 39 shows a method of adding, to a work group, a window of an application that is not included in the work group, according to an exemplary embodiment.

For example, FIG. 39 shows a method of adding, to a work group, a window of an application that is not included in the work group, according to an exemplary embodiment.

Referring to FIG. 39, the device 1000 may display objects 392 and 393 representing work groups, on an area 391 of the screen thereof. The object 392 representing a work group may include objects 394, 395, and 396 representing applications such as application 394-1 included in the work group. The device 1000 may display a window corresponding to the object 394 from among the objects 394, 395, and 396 representing the applications included in the work group, on the screen thereof.

The device 1000 may acquire attribute information of at least one window from among windows of the applications included in the work group. The device 1000 may also acquire attribute information of windows of applications that are not included in the work group.

The device 1000 may recommend the object 396 representing the window of an application not included in the work group, based on the acquired attribute information of the windows.

Accordingly, when the recommended object 396 representing the window of the application not included in the work group is selected based on a user input, the recommended object 396 may be applied to the work group. The recommended object 396 may represent an application that is not executed.

Figure 40:
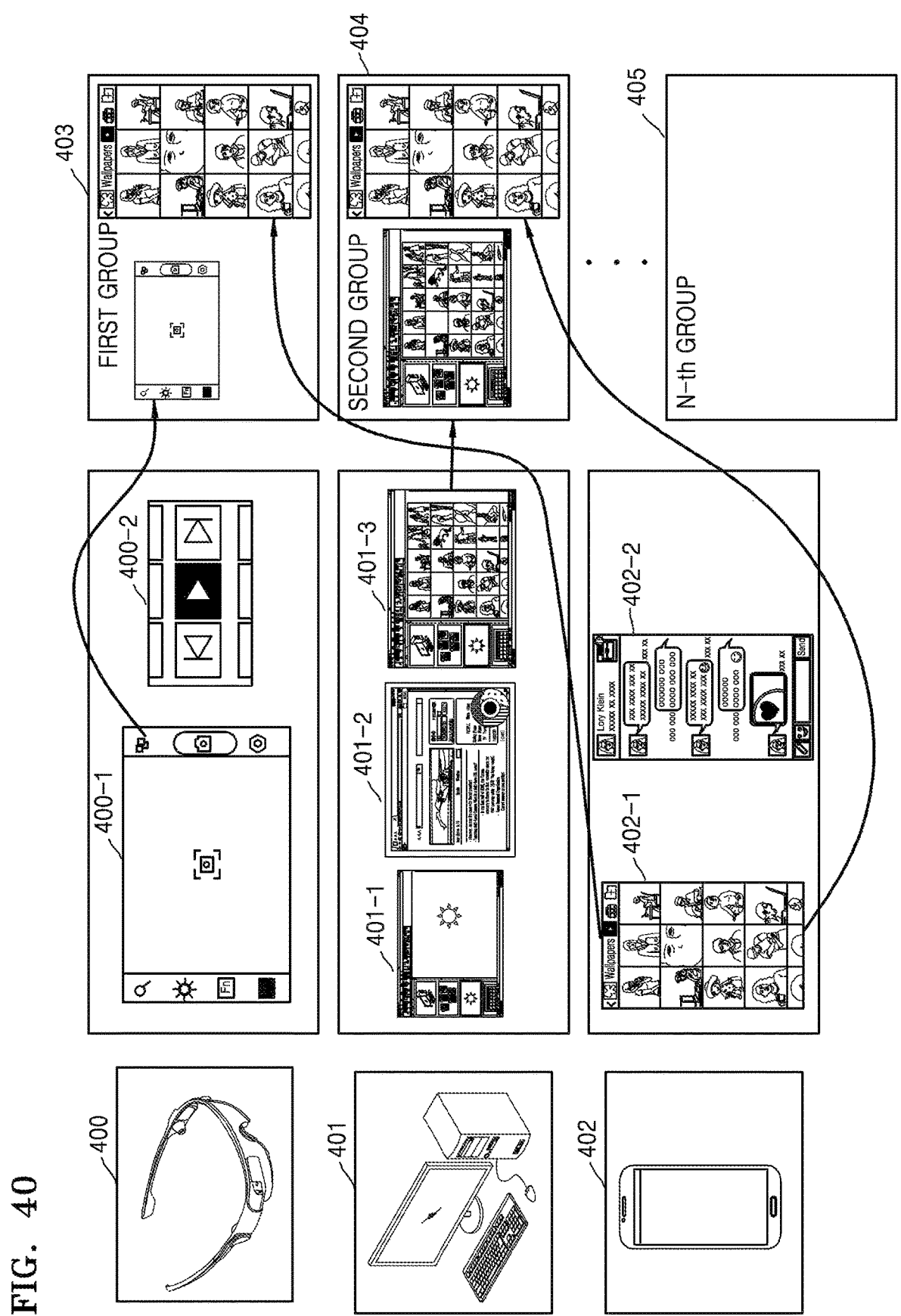
FIG. 40 illustrates an example of a method of adding, to work groups, windows of applications that are executed by a plurality of devices, according to an exemplary embodiment.

FIG. 40 illustrates an example of a method of adding, to work groups, windows of applications that are executed by a plurality of devices 1000, according to an exemplary embodiment.

Referring to FIG. 40, a first device 400 may be executing windows 400-1 and 400-2 of a plurality of applications, a second device 401 may be executing windows 401-1, 401-2, and 401-3 of a plurality of applications, and a third device 402 may be executing windows 402-1 and 402-2 of a plurality of applications.

According to an exemplary embodiment, when the first, second, and third devices 400, 401, and 402 are connected to one another, any one of the first, second, and third devices 400, 401, and 402 may check the windows of applications that are being executed by the other devices connected thereto, and the windows of the applications that are executed by the first, second, and third devices 400, 401, and 402 may be classified into at least one work group, namely, work groups 403, 404, and 405. In other words, the windows of the applications that are being executed by the first, second, and third devices 400, 401, and 402 may be classified into at least one work group. It will be easily understood by one of ordinary skill in the art to which the disclosure pertains that the methods described above with reference to FIGS. 1-39 are applicable to a method of grouping windows that are executed by a plurality of devices.

When the first device 400 from among the first, second, and third devices 400, 401, and 402 displays the work window 400-1 included in the work group 403, the first device 400 may display an object representing the work group 403 on the displayed work window 400-1.

When an object, which is included in a window or an object representing the work group 403, is selected in the first device 400, the window 402-1 corresponding to the selected object may be displayed on the third device 402.

When the object representing the work group 403 is selected in the first device 400, the windows 400-1 and 402-1 included in the selected work group 403 may be displayed on the first and third devices 400 and 402, respectively.

Even when the second device 401 or the third device 402 displays a work window included in the work group 403, the second or third device 401 or 402 may display the object representing the work group 403 on the displayed work window.

A device that is currently being used by a user may be determined from among the first, second, and third devices 400, 401, and 402, and the object representing the work group 403 may be displayed only on the device determined to be currently being used by the user.

A method in which a plurality of devices display windows by using a work group will now be described in detail with reference to FIGS. 41A-45.

Figure 41A:
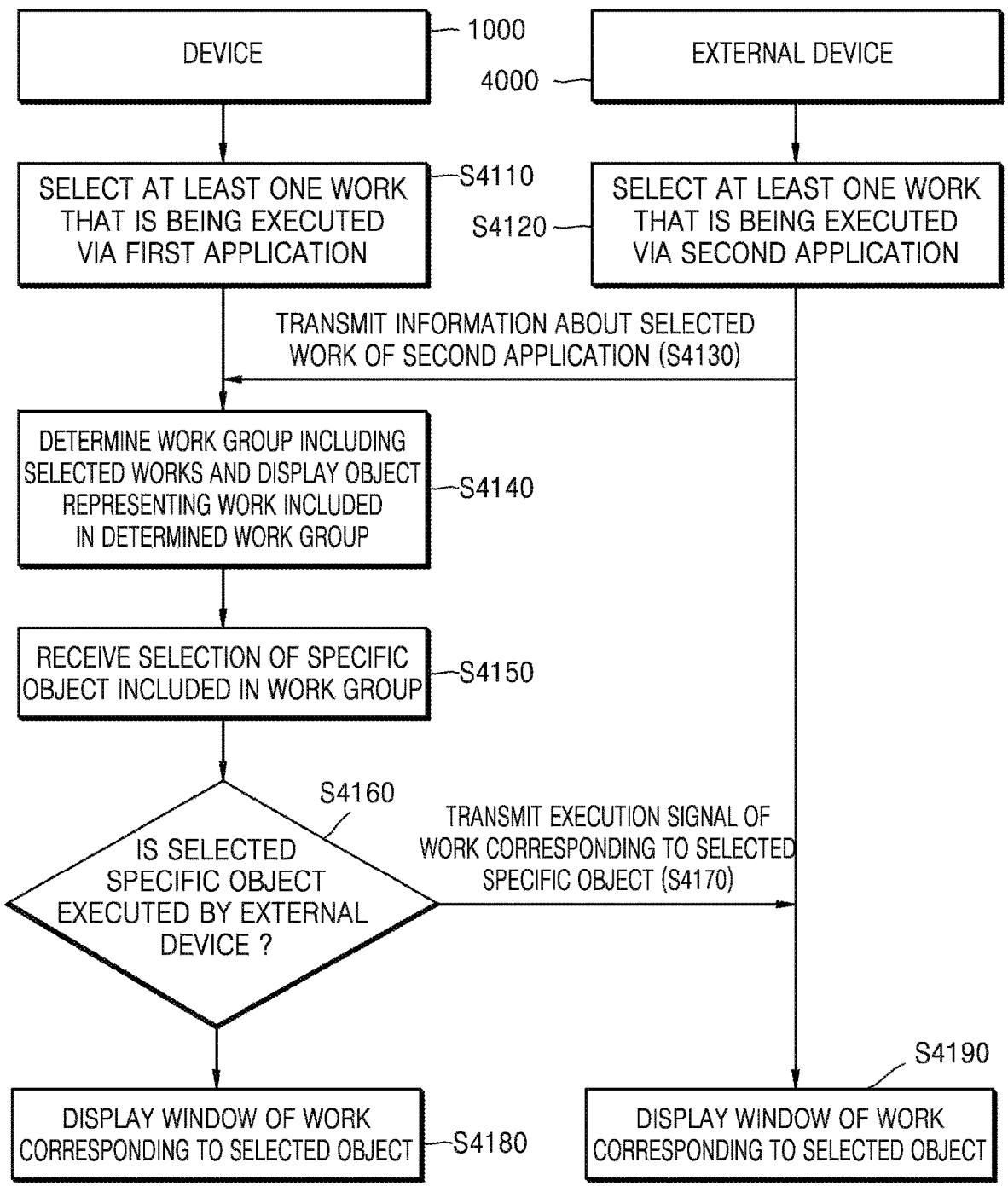
FIG. 41A is a flowchart of an example of a method in which a plurality of devices display windows by using a work group, according to an exemplary embodiment.

FIG. 41A is a flowchart of an example of a method in which a plurality of devices display windows by using a work group, according to an exemplary embodiment.

In operation S4110, the device 1000 may select at least one work that is being executed via a first application.

In operation S4120, an external device 4000 may select at least one work that is being executed via a second application.

Operations S4110 and S4120 of selecting the works that are respectively being executed via the first application and the second application may be performed based on inputs of a user to the device 1000 and/or the external device 4000.

In operation S4130, the external device 4000 may transmit information about the selected work of the second application to the device 1000.

In operation S4140, the device 1000 may determine a work group including the selected works and display an object representing a work included in the determined work group. The device 1000 may add not only a work that is being executed in the work group, but also an application work that is not executed to the work group. In this case, an object representing the not-executed application work may also be displayed.

When a window corresponding to a work included in a work group is displayed on the device 1000, an object representing the work included in the work group may also be displayed on an area of the window.

In operation S4150, the device 1000 may receive a selection of a specific object included in the work group.

In operation S4160, the device 1000 may determine whether the selected specific object is executed by the external device 4000. Based on a result of the determination, the device 1000 may transmit an execution signal of a work corresponding to the selected specific object to the external device 4000 (operation S4170), or the device 1000 may display a window of the work corresponding to the selected object (operation S4180).

In operation S4190, in response to the execution signal of the work corresponding to the selected object, the external device 4000 may display the window corresponding to the selected object.

Figure 41B:
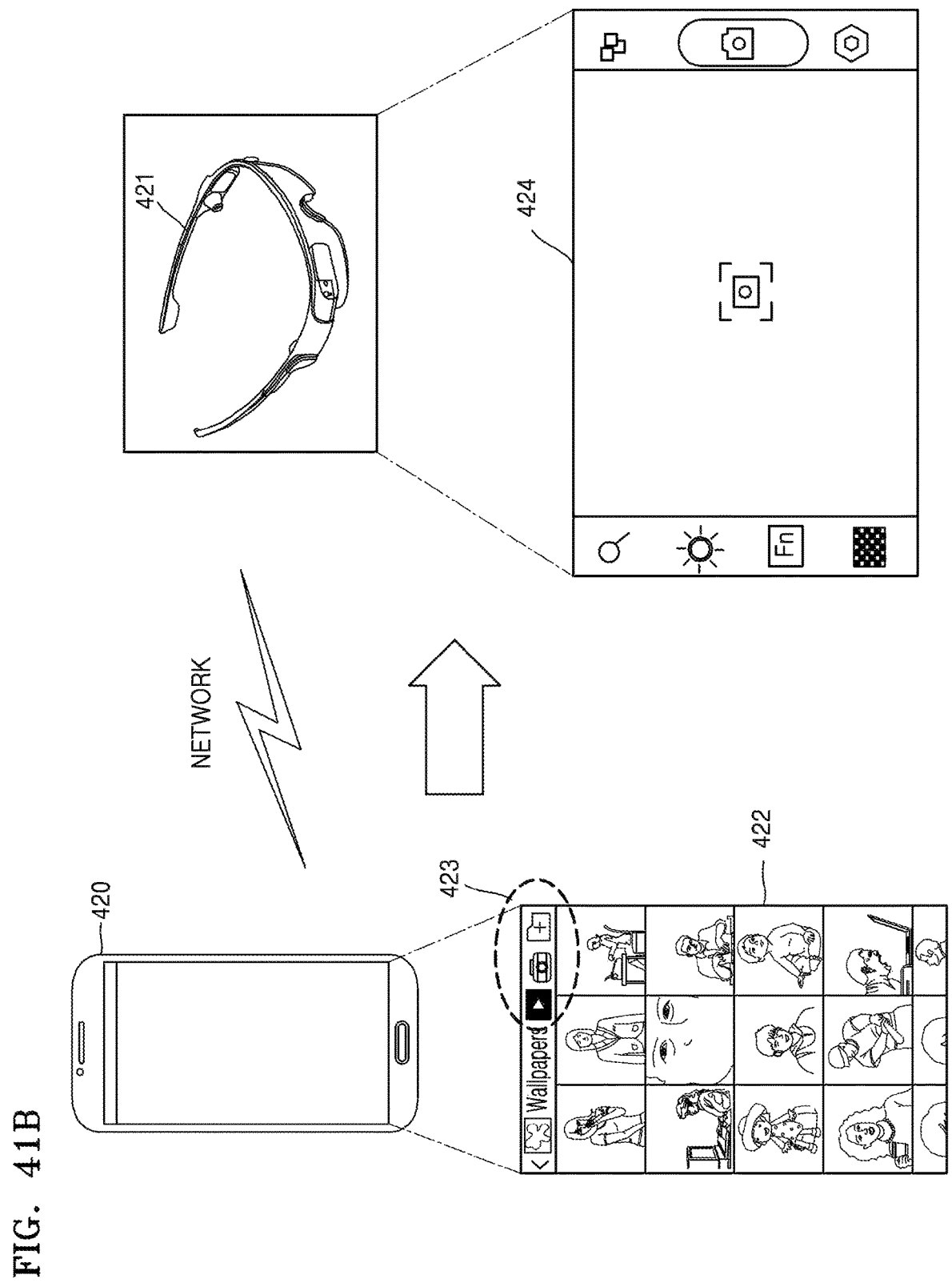
FIG. 41B illustrates a method in which a plurality of devices display windows by using a work group, according to an exemplary embodiment.

For example, FIG. 41B illustrates a method in which a plurality of devices display windows by using a work group, according to an exemplary embodiment.

Referring to FIG. 41B, the device 1000 may be a mobile device 420, and the external device 4000 may be a glass-type wearable device 421.

When a certain window 422 is displayed on the mobile device 420, objects 423 representing the other windows included in a work group to which the window 422 belongs may be display together.

When a certain object is selected from the objects 423 representing the other windows included in the work group, the mobile device 420 may determine whether a window corresponding to the selected object is executed by the glass-type wearable device 421. Based on a result of the determination, the mobile device 420 may transmit an execution signal of the window corresponding to the selected object to the glass-type wearable device 421. Accordingly, the glass-type wearable device 421 may display a window 424 corresponding to the selected object.

Figure 42:
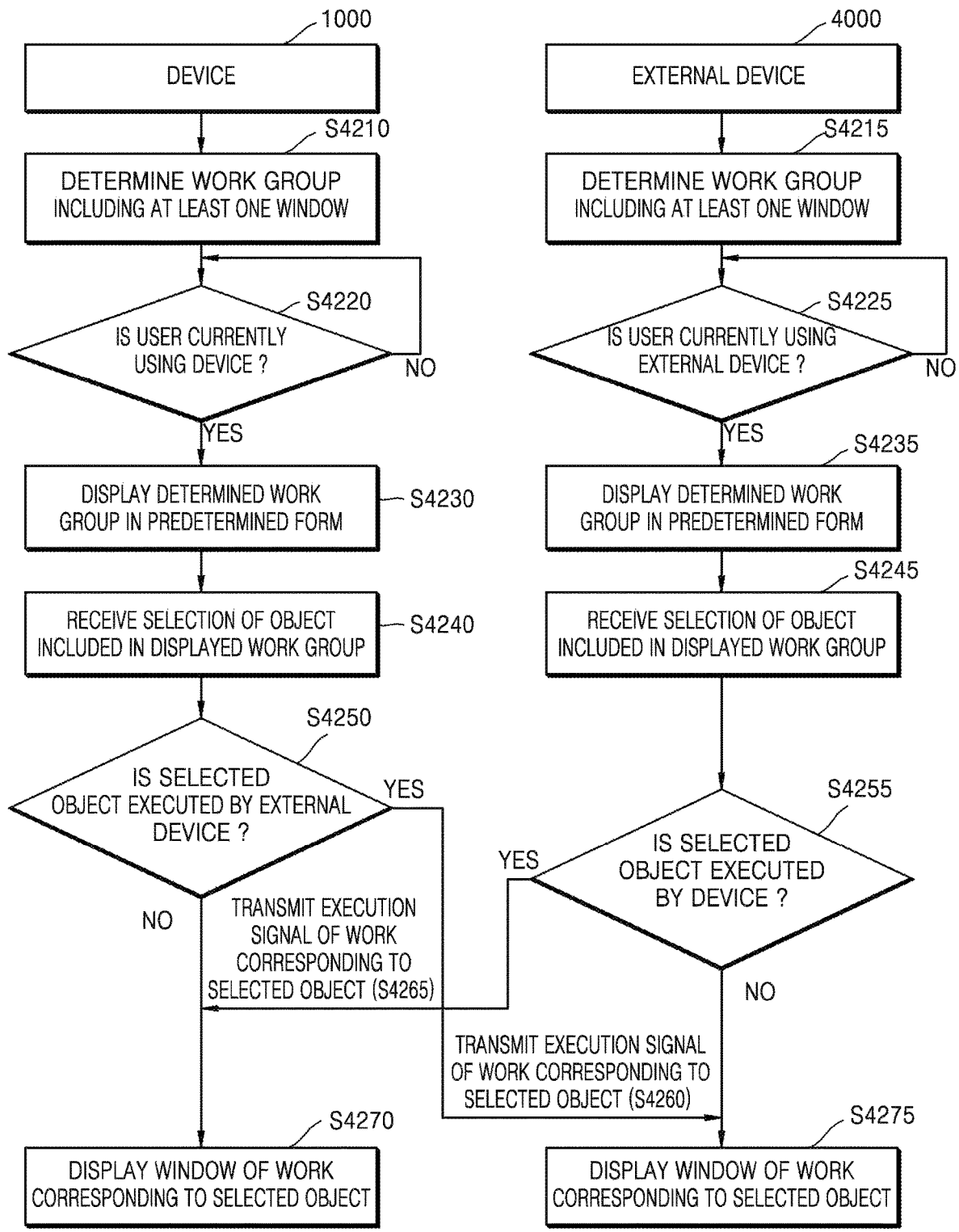
FIG. 42 is a flowchart of another example of a method in which a plurality of devices display windows by using a work group, according to an exemplary embodiment.

FIG. 42 is a flowchart of another example of a method in which a plurality of devices display windows by using a work group, according to an exemplary embodiment.

In operation S4210, the device 1000 may determine a work group including at least one window, based on a selection of a user or an automatic classification. A method of determining a work group has already been described above with reference to FIGS. 1-41B, and thus a detailed description thereof will be omitted here.

In operation S4220, the device 1000 may determine whether a user is currently using the device 1000. For example, when the device 1000 includes a display, the device 1000 may determine whether the user looks at the display of the device 1000, to thereby determine whether the user is using the device 1000. Based on whether the device 1000 is manipulated and whether the device 1000 moves, the device 1000 may determine whether the user is using the device 1000. If the device 1000 is being used by the user, the method proceeds to operation S4230. Otherwise, the determination as to whether the device 1000 is being used by a user may repeat.

In operation S4230, the device 1000 may display the determined work group in a predetermined form. For example, when a window corresponding to a work included the work group is displayed on the device 1000, an object representing the work included in the work group may also be displayed on an area of the window.

In operation S4240, the device 1000 may receive a selection of an object included in the displayed work group.

In operation S4250, the device 1000 may determine whether the selected object is executed by the external device 4000. Based on a result of the determination, the device 1000 may transmit an execution signal of a work corresponding to the selected object to the external device 4000 (operation S4260), or the device 1000 may display a window of the work corresponding to the selected object (operation S4270).

In response to the execution signal of the work corresponding to the selected object, the external device 4000 may display the window corresponding to the selected object, in operation S4275.

The external device 4000 may also display a work group according to whether the external device 4000 is being used by a user.

In operation S4215, the external device 4000 may determine a work group including at least one window, based on a selection of a user or an automatic classification. Alternatively, the external device 4000 may receive information about the work group determined by the device 1000.

In operation S4225, the external device 4000 may determine whether a user is currently using the external device 4000. For example, when the external device 4000 includes a display, the external device 4000 may determine whether the user looks at the display of the external device 4000, to thereby determine whether the user is using the external device 4000. Based on whether the external device 4000 is manipulated and whether the external device 4000 moves, the external device 4000 may determine whether the user is using the external device 4000.

In operation S4235, the external device 4000 may display the determined work group in a predetermined form. For example, when a window corresponding to a work included in the work group is displayed on the external device 4000, an object representing the work included in the work group may also be displayed on an area of the window.

In operation S4245, the external device 4000 may receive a selection of an object included in the displayed work group.

In operation S4255, the external device 4000 may determine whether the selected object is executed by the external device 4000. Based on a result of the determination, the external device 4000 may transmit an execution signal of the work corresponding to the selected object to the device 1000 (operation S4265), or the external device 4000 may display a window of the work corresponding to the selected object (operation S4275).

In response to the execution signal of the work corresponding to the selected object, the device 1000 may display the window corresponding to the selected object, in operation S4270.

Figure 43:
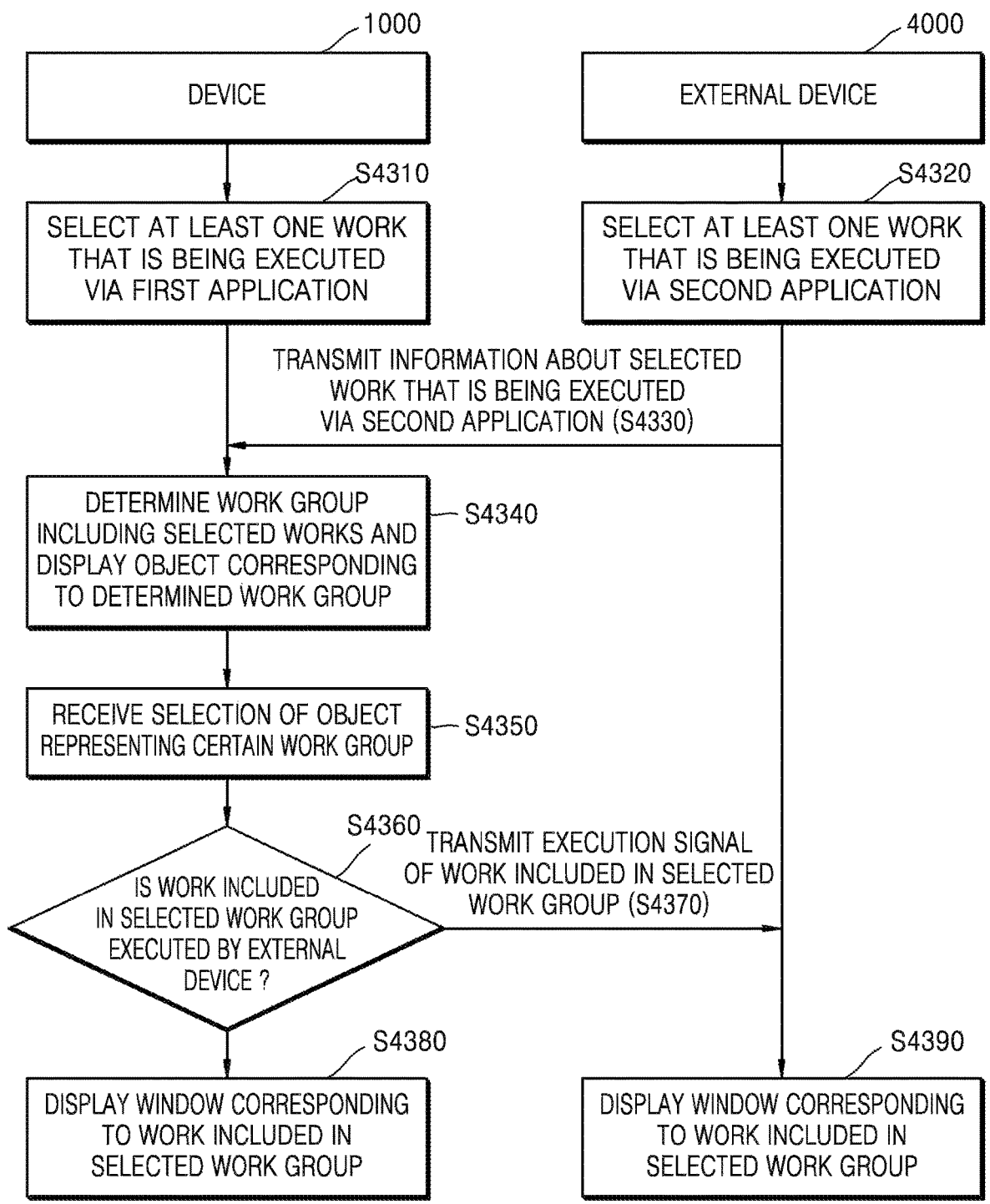
FIG. 43 is a flowchart of another example of a method in which a plurality of devices display windows by using a work group, according to an exemplary embodiment.

FIG. 43 is a flowchart of another example of a method in which a plurality of devices display windows by using a work group, according to an exemplary embodiment.

In operation S4310, the device 1000 may select at least one work that is being executed via a first application.

In operation S4320, an external device 4000 may select at least one work that is being executed via a second application.

Operations S4310 and S4320 of selecting the works that are respectively being executed via the first application and the second application may be performed based on inputs of a user to the device 1000 and the external device 4000.

In operation S4330, the external device 4000 may transmit information about the selected work that is being executed via the second application, to the device 1000.

In operation S4340, the device 1000 may determine a work group including the selected works and display an object corresponding to the determined work group.

In operation S4350, the device 1000 may receive a selection of an object representing a certain work group.

In operation S4360, the device 1000 may determine whether a work included in the selected work group is executed by the external device 4000. When it is determined that the work included in the selected work group is executed by the external device 4000, the device 1000 may transmit an execution signal of the work included in the selected work group to the external device 4000, in operation S4370.

Accordingly, in operation S4380, the device 1000 may display a window corresponding to the work included in the selected work group. In operation S4890, the external device 4000 may display the window corresponding to the work included in the selected work group, simultaneously while the device 1000 displays the window corresponding to the work included in the selected work group in operation S4380.

Figure 44:
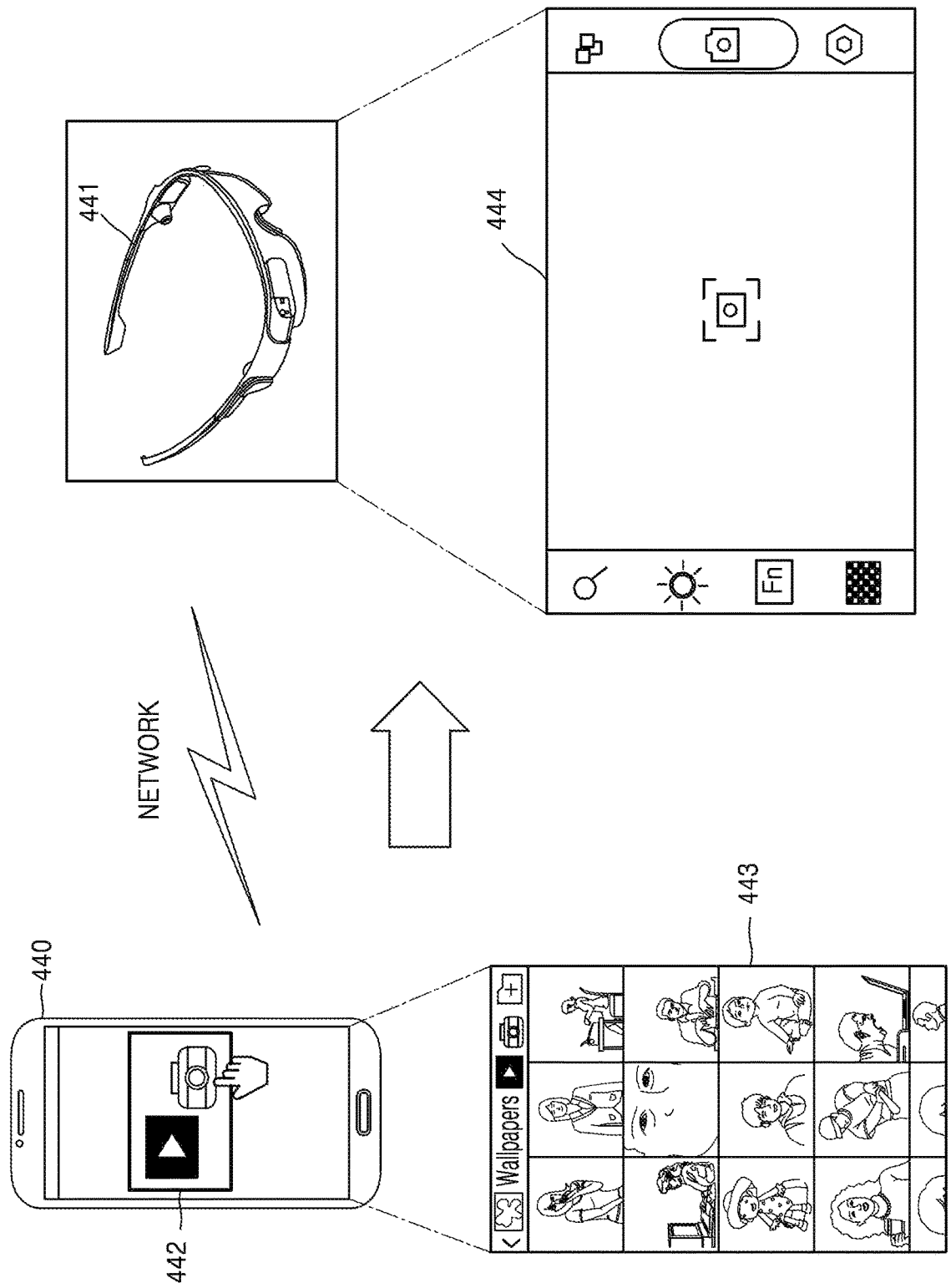
FIG. 44 also illustrates another example of a method in which a plurality of devices display windows by using a work group, according to an exemplary embodiment.

For example, FIG. 44 illustrates another example of a method in which a plurality of devices display windows by using a work group, according to an exemplary embodiment.

Referring to FIG. 44, the device 1000 may be a mobile device 440, and the external device 4000 may be a glass-type wearable device 441.

The mobile device 440 may display a window 443 of a currently-executed application and an object 442 representing a work group including a window 444 of an application that is executed by the glass-type wearable device 441.

For example, the work group may include the window 443 of a gallery application and the window 444 of a camera application. Accordingly, when the object 442 representing the work group is selected, the mobile device 440 may display the window 443 of the gallery application, and at the same time the glass-type wearable device 441 may display the window 444 of the camera application. Exemplary embodiments of the disclosure are not limited thereto, and the object 442 representing the work group may be displayed on the glass-type wearable device 441.

Figure 45:
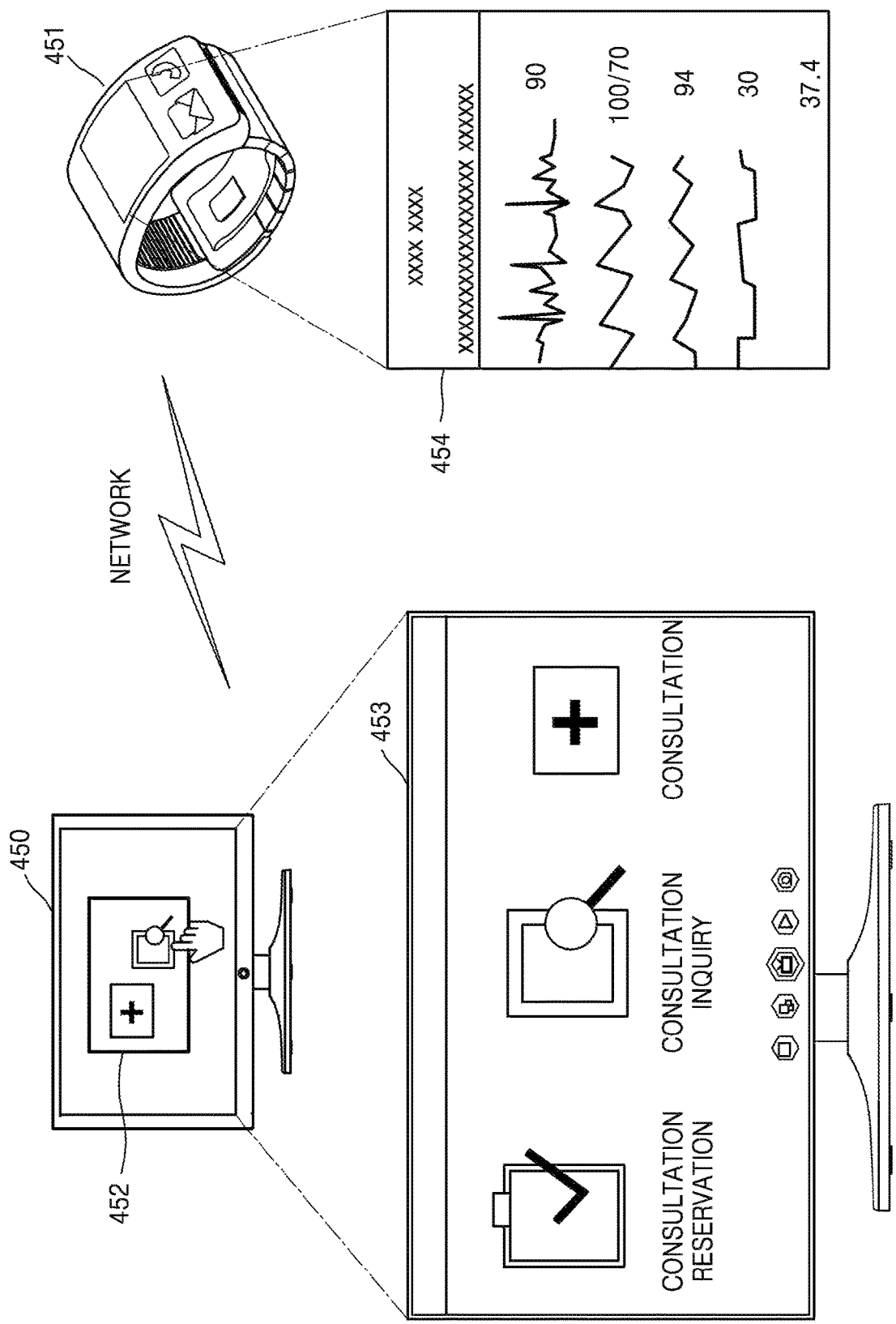
FIG. 45 also illustrates another example of a method in which a plurality of devices display windows by using a work group, according to an exemplary embodiment.

FIG. 45 also illustrates another example of a method in which a plurality of devices display windows by using a work group, according to an exemplary embodiment.

Referring to FIG. 45, the device 1000 may be a home device 450, and the external device 4000 may be a wrist-type wearable device 451.

The home device 450 may display a window 453 of an application that is executed by the home device 450, and an object 452 representing a work group including a window 452 of an application that is executed by the wrist-type wearable device 451.

For example, the work group may include the window 453 of a remote medical service application and the window 454 of a blood pressure measuring application. Accordingly, when the object 452 representing the work group is selected, the home device 450 may display the window 453 of the remote medial service application, and the wrist-type wearable device 451 may display the window 454 of the blood pressure measuring application. Exemplary embodiments of the disclosure are not limited thereto, and the object 452 representing the work group may be displayed on the wrist-type wearable device 451.

Figure 46:
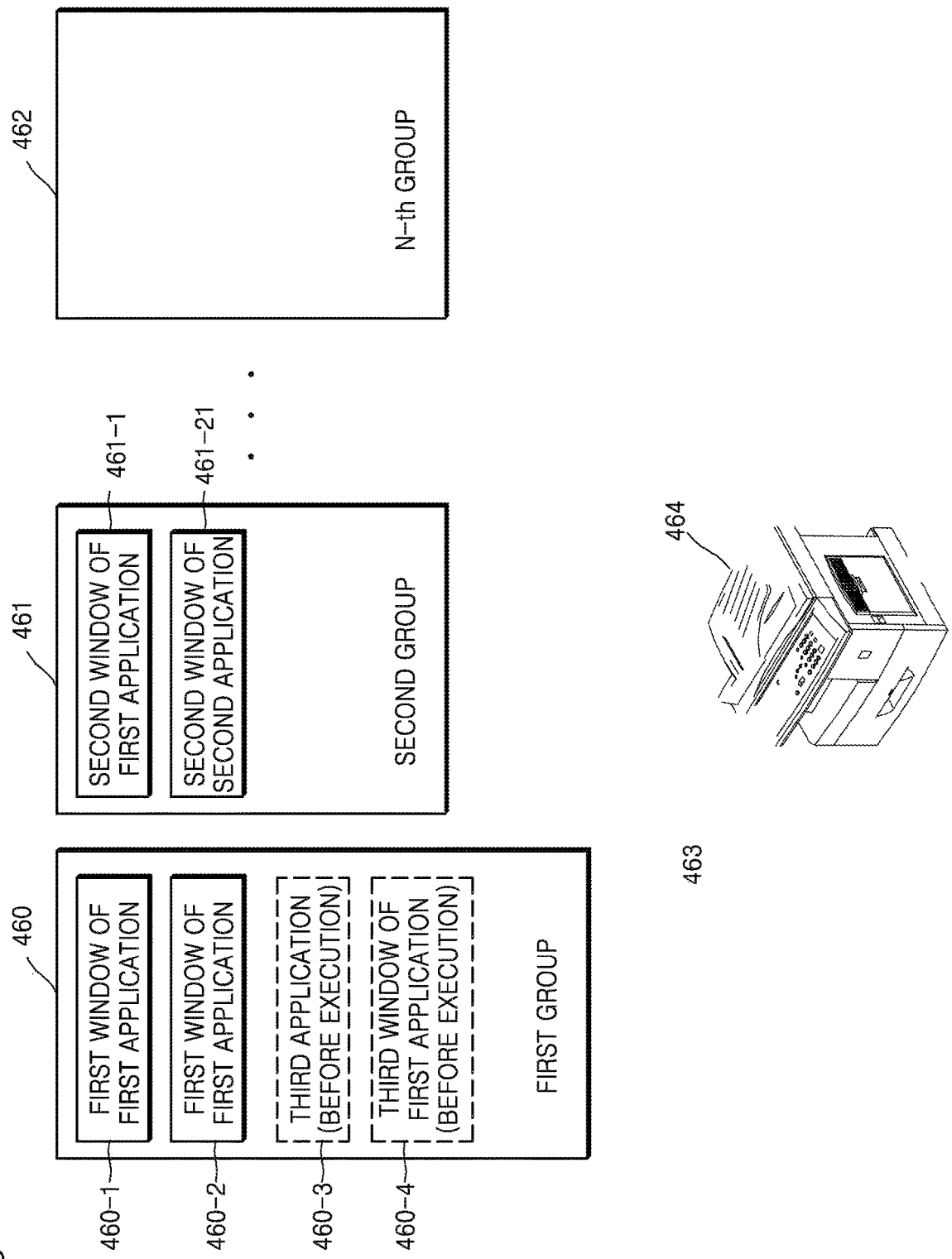
FIG. 46 is a schematic view for explaining a method of setting different attributes for different work groups, according to an exemplary embodiment.

FIG. 46 is a schematic view for explaining a method of setting different attributes for different work groups, according to an exemplary embodiment.

The device 1000 may set an attribute that is common to the windows included in each determined work group. For example, a special clip board may be used for each work group. Alternatively, different external devices may be connected for different work groups.

For example, as illustrated in FIG. 46, when the device 1000 determines a plurality of first through N-th work groups 460, 461, and 462, different printers, namely, first and second printers 463 and 464, may be connected to the first and second work groups 460 and 461, respectively. Accordingly, when a printout is performed with respect to a first window 460-1 of a first application included in the first work group 460, the first printer 463 is used. However, when a printout is performed with respect to a second window 461-1 of the first application included in the second work group 461, the second printer 464 may be used.

In another example, a first monitor (not shown) may be connected to the first group 460 and a second monitor (not shown) may be connected to the second group 461, and thus windows may be displayed on different screens.

Thus, a user may differently apply a connection setting of an external device to each work group, leading to an increase in work efficiency.

Figure 47:
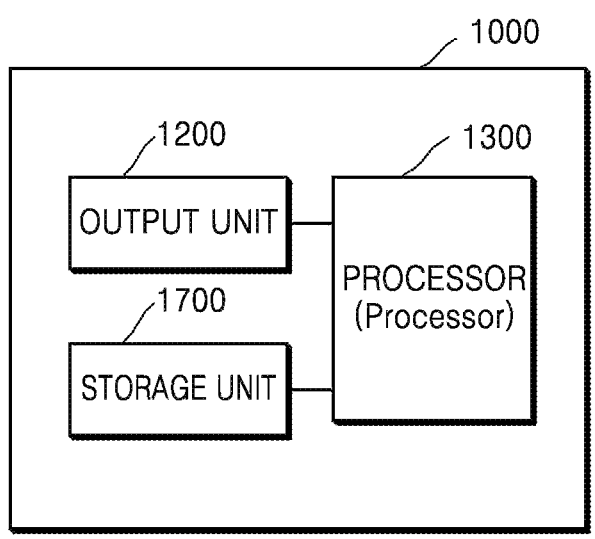
FIGS. 47 and 48 are block diagrams of devices related to an exemplary embodiment.
Figure 48:
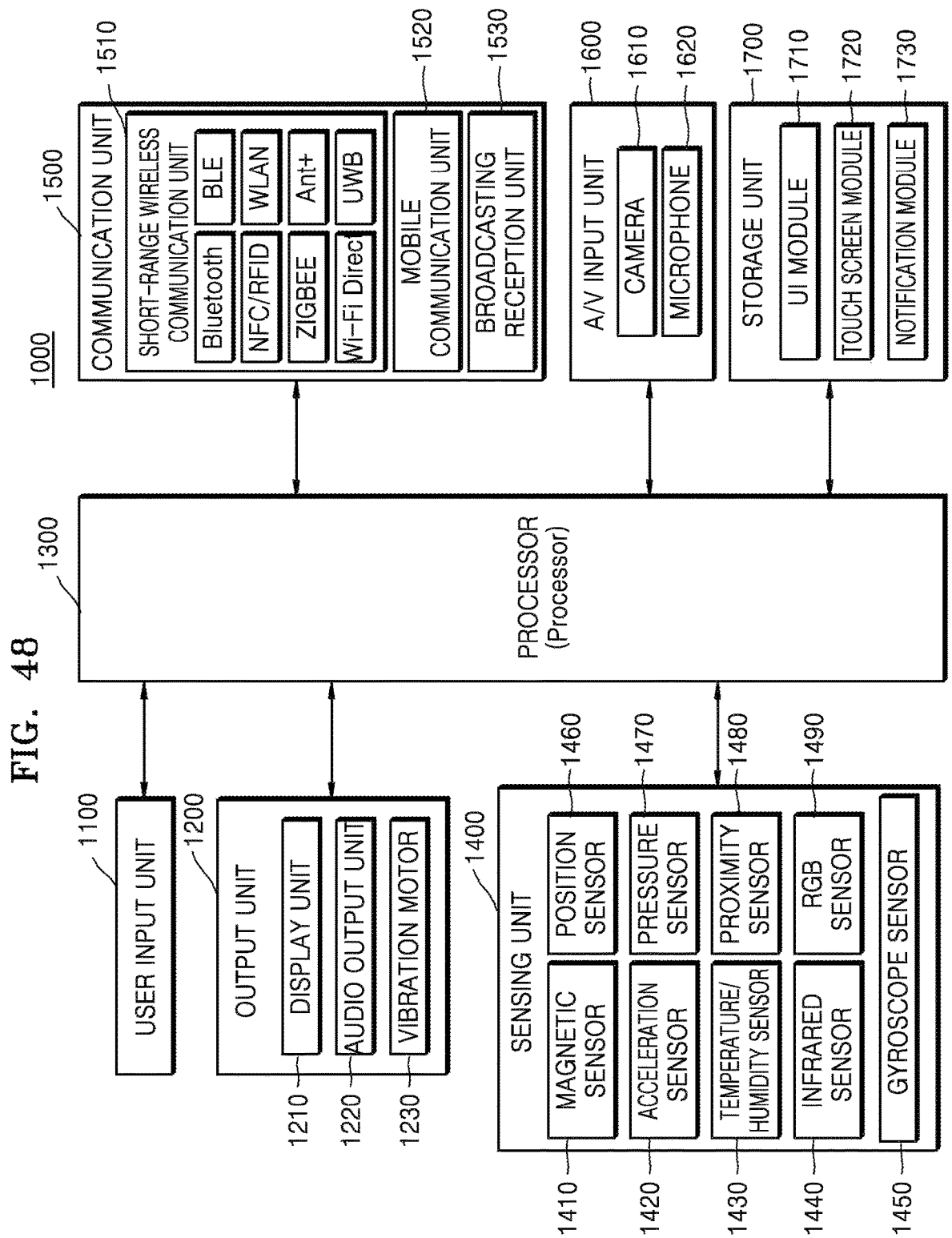
Figure 49:
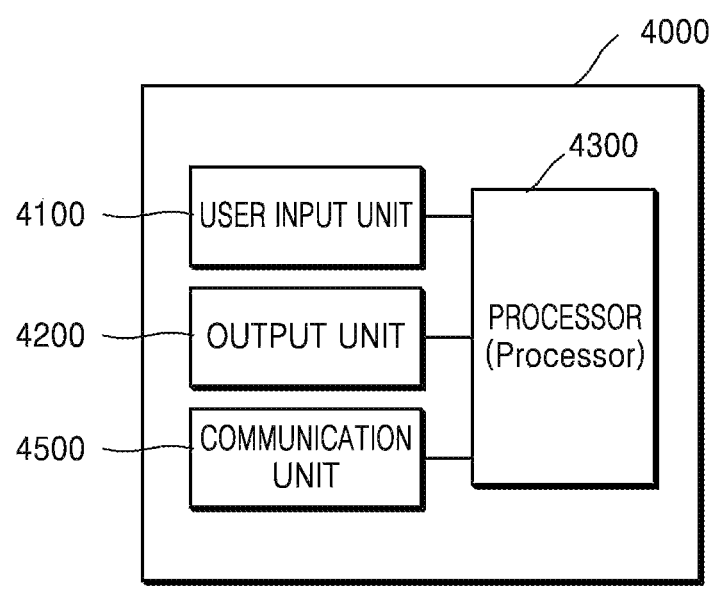
FIG. 49 is a block diagram of an external device related to an exemplary embodiment.

FIGS. 47-49 are block diagrams of the device 1000 and the external device 4000 related with an exemplary embodiment. The device 1000 and the external device 4000 are capable of performing the above-described window displaying methods using work groups, and thus the device 1000 and the external device 4000 may implement all exemplary embodiments for performing the above-described window displaying methods using work groups. Thus, although omitted, the matters described above with reference to FIGS. 1-46 may be performed via the device 1000 and the external device 4000 illustrated in FIGS. 47-49.

FIG. 47 is a block diagram of a device 1000 according to an exemplary embodiment.

Referring to FIG. 47, the device 1000 may include an output unit 1200 (e.g., a display, etc.), a processor 1300 (e.g., a controller, etc.), and a storage unit 1700 (e.g., a storage). All of the components illustrated in FIG. 47 are not essential components of the device 1000. More or less components than those illustrated in FIG. 47 may constitute the device 1000.

For example, as illustrated in FIG. 47, the device 1000 may include the output unit 1700, the processor 1300, and the storage unit 1700. As illustrated in FIG. 48, the device 1000 may further include a user input unit 1100, a sensing unit 1400, a communication unit 1500, and an audio/video (A/V) input unit 1600, in addition to the output unit 1700, the processor 1300, and the storage unit 1700.

The user input unit 1100 denotes a unit via which a user inputs data for controlling the device 1000. For example, the user input unit 1100 may be, but not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input unit 1100 may receive a user input of selecting a virtual image that is to be displayed. The user input unit 1100 may also receive a user input for setting an operation of the virtual image and a user input for purchasing an item associated with the virtual image.

The output unit 1200 may output an audio signal, a video signal, or a vibration signal, and may include a display 1210, an audio output unit 1220, and a vibration motor 1230. The output unit 1200 may display a window of an application and an object representing the windows included in a work group.

The display 1210 displays information that is processed by the device 1000. For example, the display 1210 may display a user interface for selecting a virtual image, a user interface for setting an operation of the virtual image, and a user interface for purchasing an item of the virtual image.

When the display 1210 forms a layer structure together with a touch pad to construct a touch screen, the display 1210 may be used as an input device as well as an output device. The display 1210 may include at least one of a liquid crystal display (LCD), a thin film transistor-liquid crystal display (TFT-LCD), an organic light-emitting diode (OLED), a flexible display, a 3D display, and an electrophoretic display. According to exemplary embodiments of the device 1000, the device 1000 may include at least two displays 1210. The at least two displays 1210 may be disposed to face each other by using a hinge.

The audio output unit 1220 may output audio data that is received from the communication unit 1500 or stored in the storage unit 1700. The audio output unit 1220 may also output an audio signal (for example, a call signal receiving sound, a message receiving sound, a notification sound) related with a function of the device 1000. The audio output unit 1220 may include a speaker, a buzzer, and the like.

The vibration motor 1230 may output a vibration signal. For example, the vibration motor 1230 may output a vibration signal corresponding to an output of audio data or video data (for example, a call signal receiving sound or a message receiving sound). The vibration motor 1230 may also output a vibration signal when the touch screen is touched.

The processor 1300 typically controls all operations of the device 1000. For example, the processor 1300 may control the user input unit 1100, the output unit 1200, the sensing unit 1400, the communication unit 1500, the A/V input unit 1600, and the like by executing programs stored in the storage unit 1700.

In detail, the processor 1300 may determine a work group including windows of a plurality of applications. When at least one of the windows included in the work group is displayed on the output unit 1200, the processor 1300 may control at least one object representing the windows included in the work group to be displayed on the displayed window.

The processor 1300 may control the object representing the windows included in the work group to be displayed on a frame of the displayed window.

The processor 1300 may control objects representing the windows other than the displayed window from among the windows included in the work group to be displayed.

As a certain text within a window is copied, the processor 1300 may control an object, which represents at least one window to which the copied text is to be pasted, to be displayed.

As a specific object displayed within the window is selected, the processor 1300 may control the device 1300 to display a window corresponding to the selected object.

When a work group area representing a work group is displayed on the output unit 1200, the processor 1300 may select a window that is being executed via an application, based on a user input, and add an object representing the selected window to the work group area.

The processor 1300 may set an attribute that is common to the windows included in a work group. The common attribute may include information about a connected external device.

The processor 1300 may select at least one application that is not being executed, and add the selected application to the work group.

The processor 1300 may acquire attribute information of at least one window from among the windows included in the work group, and add a window of at least one application currently being executed via another application to the work group, based on the acquired attribute information.

The sensing unit 1400 may sense the status of the device 1000 or the status of the surrounding of the device 1000 and may transmit information corresponding to the sensed status to the processor 1300.

The sensing unit 1400 may include, but is not limited thereto, at least one selected from a magnetic sensor 1410, an acceleration sensor 1420, a temperature/humidity sensor 1430, an infrared sensor 1440, a gyroscope sensor 1450, a position sensor (e.g., a GPS) 1460, a pressure sensor 1470, a proximity sensor 1480, and an RGB sensor 1490 (i.e., a luminance sensor). Functions of most of the sensors would be instinctively understood by one of ordinary skill in the art in view of their names and thus detailed descriptions thereof will be omitted herein.

The communication unit 1500 (e.g., a transceiver, etc.) may include at least one component that enables communication between the device 1000 and the external device 4000. For example, the communication unit 1500 may include a short-range wireless communication unit 1510, a mobile communication unit 1520, and a broadcasting reception unit 1530.

The short-range wireless communication unit 1510 may include, but is not limited to, a Bluetooth communicator, a Bluetooth Low Energy (BLE) communicator, a near field communication (NFC) unit, a wireless local area network (WLAN) (e.g., Wi-Fi) communicator, a ZigBee communicator, an infrared Data Association (IrDA) communicator, a Wi-Fi direct (WFD) communicator, an ultra wideband (UWB) communicator, an Ant+ communicator, and the like.

The mobile communication unit 1520 may exchange a wireless signal with at least one selected from a base station, an external terminal, and a server on a mobile communication network. Examples of the wireless signal may include a voice call signal, a video call signal, and various types of data generated during a short message service (SMS)/multimedia messaging service (MMS).

The broadcasting reception unit 1530 receives a broadcasting signal and/or broadcasting-related information from an external source via a broadcasting channel. The broadcasting channel may be a satellite channel, a ground wave channel, or the like. According to exemplary embodiments, the device 1000 may not include the broadcasting reception unit 1530.

The communication unit 1500 may communicate with the external device 4000 in order to display the windows included in a work group.

The A/V input unit 1600 inputs an audio signal or a video signal, and may include a camera 1610 and a microphone 1620. The camera 1610 may acquire an image frame, such as a still image or a moving picture, via an image sensor in a video call mode or a photography mode. An image captured via the image sensor may be processed by the processor 1300 or a separate image processor (not shown).

The image frame obtained by the camera 1610 may be stored in the storage unit 1700 or transmitted to the outside via the communication unit 1500. At least two cameras 1610 may be included according to exemplary embodiments of the structure of a terminal.

The microphone 1620 receives an external audio signal and converts the external audio signal into electrical audio data. For example, the microphone 1620 may receive an audio signal from an external device or a speaking person. The microphone 1620 may use various noise removal algorithms in order to remove noise that is generated while receiving the external audio signal.

The storage unit 1700 may store a program used by the processor 1300 to perform processing and control, and may also store data that is input to or output from the device 1000.

The storage unit 1700 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the storage unit 1700 may be classified into a plurality of modules according to their functions, for example, a UI module 1710, a touch screen module 1720, and a notification module 1730.

The UI module 1710 may provide a UI, GUI, or the like that is specialized for each application and interoperates with the device 1000. The touch screen module 1720 may detect a touch gesture on a touch screen of a user and transmit information regarding the touch gesture to the processor 1300. The touch screen module 1720 according to an exemplary embodiment may recognize and analyze a touch code. The touch screen module 1720 may be configured by separate hardware including a controller.

In order to detect the actual touch or the proximate touch on the touch pad, the touch screen may internally or externally have various sensors. An example of a sensor used to detect the real touch or the proximity touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, the temperature of a touched point, and the like.

Another example of a sensor used to detect the real touch or the proximity touch on the touch screen is a proximity sensor.

The proximity sensor is a sensor that detects the existence of an object that approaches a predetermined detection surface or that exists nearby, by using an electromagnetic force or infrared rays, without using any mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. Examples of the touch gesture of the user may include tap, touch and hold, double tap, drag, panning, flick, drag and drop, swipe, and the like.

The notification module 1730 may generate a signal for notifying that an event has been generated in the device 1000. Examples of the event generated in the device 1000 may include call signal receiving, message receiving, a key signal input, schedule notification, and the like. The notification module 1730 may output a notification signal in the form of a video signal via the display 1210), in the form of an audio signal via the audio output unit 1220, or in the form of a vibration signal via the vibration motor 1230.

FIG. 49 is a block diagram of an external device 4000 according to an exemplary embodiment.

Referring to FIG. 49, the external device 4000 may include a user input unit 4100 (e.g., a user input, etc.), an output unit 4200, a processor 4300, and a communication unit 4500.

The processor 4300 may select a window of an application based on a user input received via the user input unit 4100. The processor 4300 may transmit information about the selected window to the device 1000 via the communication unit 4500 so that the selected window may be added to a work group.

When receiving an execution signal of a certain work window from the device 1000 via the communication unit 4500, the processor 4300 may control a window corresponding to the received signal to be displayed on the output unit 4200.

The user input unit 4100, the output unit 4200, the processor 4300, and the communication unit 4500 are the same as the user input unit 1100, the output unit 1200, the processor 1300, and the communication unit 1500 of the device 1000, respectively, and thus detailed description thereof will be omitted.

The inventive concept may also be embodied as a storage medium including instruction codes executable by a computer such as a program module executed by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

The terminology "unit" used herein may be a hardware component such as a processor or a circuit, and/or a software component that is executed by a hardware component such as a processor.

Although the exemplary embodiments of the disclosure have been disclosed for illustrative purposes, one of ordinary skill in the art will appreciate that diverse variations and modifications are possible, without departing from the spirit and scope of the inventive concept. Thus, the above exemplary embodiments should be understood not to be restrictive but to be illustrative, in all aspects. For example, respective elements described in an integrated form may be dividedly used, and the divided elements may be used in a state of being combined.

The exemplary embodiments should be considered in descriptive sense only and not for purposes of limitation. Descriptions of features or aspects within each exemplary embodiment should typically be considered as available for other similar features or aspects in other exemplary embodiments.

While the disclosure has been particularly shown and described with reference to exemplary embodiments thereof, it will be understood by those of ordinary skill in the art that various changes in form and details may be made therein without departing from the spirit and scope of the disclosure as defined by the following claims.

What is claimed is:

1. A device comprising:
    a display;
    a storage configured to store a plurality of work groups including a plurality of jobs; and
    a controller configured to:
        control the display to display, in a work group object area of a screen of the display, a plurality of work group objects including a first work group object and a second work group object, wherein the first work group object and the second work group object represent a first work group and a second work group, respectively,
        based on a selection for the first work group object among the displayed plurality of work group objects, control the display to display a window corresponding to at least one job included in the first work group and display at least one object representing another job included in the first work group on the displayed window, and to display, in a bar region of the screen, a first plurality of window objects respectively representing windows of jobs included in the first work group,
        based on a selection for the second work group object among the displayed plurality of work group objects, control to display, in the bar region of the screen, a second plurality of window objects respectively representing windows of jobs included in the second work group,
        based on a selection of a first window object among the second plurality of window objects in the bar region of the screen, control to display a corresponding first window represented by the first window object, and
        in response to an input while displaying the first window, control to display, simultaneously and overlapping with the first window, another object representing windows corresponding to currently-executing jobs and all of the first plurality of window objects and the second plurality of window objects, while controlling to display the second plurality of window objects associated with the selected second work group,
    wherein the other object comprises a plurality of selectable thumbnail items respectively representing the windows corresponding to all of the first plurality of window objects and the second plurality of window objects, each of the plurality of selectable thumbnail items being selectable to display a corresponding window.

2. The device of claim 1, further comprising:
    a user input configured to receive an input of a user,
    in response to an object from among the at least one object displayed within the window being selected by the input of the user, the controller controls the display to display a window corresponding to the selected object.

3. The device of claim 1, wherein the controller controls the display to display the at least one object representing the other job included in the first work group on a frame of the displayed window.

4. The device of claim 1, wherein, in response to a certain text within the window being copied, the controller controls the display to display an object representing at least one window to which the copied text is to be pasted.

5. The device of claim 1, wherein the controller is further configured to set an attribute that is common to windows corresponding to the at least one job included in the first work group.

6. The device of claim 5, wherein the common attribute comprises information about a connected external device.

7. The device of claim 1, wherein the controller is further configured to select a job of an application that is not being executed, and add the selected job to the first work group.

8. The device of claim 1, wherein the controller is further configured to acquire attribute information of at least one job from among the plurality of j obs included in the first work group, and to add at least one job currently being executed via another application to the first work group, based on the acquired attribute information.

9. The device of claim 1, wherein each of the plurality of selectable thumbnail items includes a thumbnail image of a current execution state of the corresponding window.

10. A window displaying method using a work group, the method comprising:
    determining a plurality of work groups including a plurality of jobs;
    displaying, in a work group object area of a screen of a display, a plurality of work group objects including a first work group object and a second work group object, wherein the first work group object and the second work group object represent a first work group and a second work group, respectively;
    based on a selection for the first work group object among the displayed plurality of work group objects, displaying a window corresponding to at least one job included in the first work group, displaying at least one object representing another job included in the first work group on the displayed window, and displaying, in a bar region of the screen, a first plurality of window objects respectively representing windows of jobs included in the first work group;
    based on a selection for the second work group object among the displayed plurality of work group objects, displaying, in the bar region of the screen, a second plurality of window objects respectively representing windows of jobs included in the second work group; and based on a selection of a first window object among the second plurality of window objects in the bar region of the screen, displaying a corresponding first window represented by the first window object;

wherein in response to an input while displaying the first window, displaying, simultaneously and overlapping with the first window, another object representing windows corresponding to currently-executing jobs and all of the first plurality of window objects and the second plurality of window objects, while providing the second plurality of window objects associated with the selected second work group, and wherein the other object comprises a plurality of selectable thumbnail items respectively representing of the windows corresponding to all of the first plurality of window objects and the second plurality of window objects, each of the plurality of selectable thumbnail items being selectable to display a corresponding window.

11. The method of claim 10, further comprising: in response to an object from among the at least one object displayed within the window being selected, displaying a window corresponding to the selected object.

12. The method of claim 10, wherein the displaying of the at least one object comprises displaying the at least one object representing the other job included in the first work group on a frame of the displayed window.

13. The method of claim 10, wherein the displaying of the at least one object comprises, in response to a certain text within the window being copied, displaying an object representing at least one window to which the copied text is to be pasted.

14. The method of claim 10, further comprising setting an attribute that is common to windows corresponding to the at least one job included in the first work group.

15. The method of claim 10, wherein the determining of the plurality of work groups comprises selecting a job of an application that is not being executed, and adding the selected job to the work group.

16. The method of claim 10, wherein the determining of the plurality of work groups comprises:
  acquiring attribute information of at least one job from among the plurality of jobs included in the first work group; and
  adding at least one job that is being executed via another application to the first work group, based on the acquired attribute information.

17. The method of claim 10, wherein each of the plurality of selectable thumbnail items includes a thumbnail image of a current execution state of the corresponding window.

18. A non-transitory computer-readable recording medium having recorded thereon a computer program, which, when executed by a computer, performs the method comprising:
  determining a plurality of work groups including a plurality of jobs;
  displaying, in a work group object area of a screen of a display, a plurality of work group objects including a first work group object and a second work group object, wherein the first work group object and the second work group object represent a first work group and a second work group, respectively;
  based on a selection for the first work group object among the displayed plurality of work group objects, displaying a window corresponding to at least one job included in the first work group, displaying at least one object representing another job included in the first work group on the displayed window, and displaying, in a bar region of the screen, a first plurality of window objects respectively representing windows of jobs included in the first work group;
  based on a selection for the second work group object among the displayed plurality of work group objects, displaying, in the bar region of the screen, a second plurality of window objects respectively representing windows of jobs included in the second work group; and based on a selection of a first window object among the second plurality of window objects in the bar region of the screen, displaying a corresponding first window represented by the first window object;
  wherein in response to an input while displaying the first window, displaying, simultaneously and overlapping with the first window, another object representing windows corresponding to currently-executing jobs and all of the first plurality of window objects and the second plurality of window objects, while providing the second plurality of window objects associated with the selected second work group, and
  wherein the other object comprises a plurality of selectable thumbnail items respectively representing the windows corresponding to all of the first plurality of window objects and the second plurality of window objects, each of the plurality of selectable thumbnail items being selectable to display a corresponding window.

* * * * *